(12) United States Patent
Kitamura et al.

(10) Patent No.: US 8,177,210 B2
(45) Date of Patent: May 15, 2012

(54) WORK POSITIONING METHOD, AND POSITIONING DEVICE

(75) Inventors: Takahiro Kitamura, Toyota (JP); Koichi Sugiura, Toyota (JP); Takayuki Kawakami, Takarazuka (JP); Takayuki Kuroda, Itami (JP)

(73) Assignees: Toyota Jidosha Kabushiki Kaisha, Toyota-shi (JP); Pascal Engineering Corporation, Itami-shi (JP)

( * ) Notice: Subject to any disclaimer, the term of this patent is extended or adjusted under 35 U.S.C. 154(b) by 465 days.

(21) Appl. No.: 12/513,679

(22) PCT Filed: Jun. 16, 2008

(86) PCT No.: PCT/JP2008/061372
§ 371 (c)(1),
(2), (4) Date: May 6, 2009

(87) PCT Pub. No.: WO2008/156181
PCT Pub. Date: Dec. 24, 2008

(65) Prior Publication Data
US 2009/0267281 A1  Oct. 29, 2009

(30) Foreign Application Priority Data
Jun. 19, 2007 (JP) ................ 2007-160945

(51) Int. Cl.
*B23Q 3/06* (2006.01)
(52) U.S. Cl. ............................................. 269/309
(58) Field of Classification Search .......... 269/309–311, 269/30; 29/559
See application file for complete search history.

(56) References Cited

U.S. PATENT DOCUMENTS

| | | | |
|---|---|---|---|
| 6,095,509 A | 8/2000 | Yonezawa | |
| 6,905,117 B2 * | 6/2005 | Bernhard et al. | 269/309 |
| 6,988,720 B2 * | 1/2006 | Kawakami | 269/309 |
| 7,758,030 B2 * | 7/2010 | Yonezawa et al. | 269/309 |
| 7,758,031 B2 * | 7/2010 | Yonezawa et al. | 269/309 |
| 7,793,924 B2 * | 9/2010 | Yonezawa et al. | 269/309 |
| 7,819,392 B2 * | 10/2010 | Kuroda et al. | 269/309 |

(Continued)

FOREIGN PATENT DOCUMENTS

EP  1 669 161 A1  6/2006

(Continued)

OTHER PUBLICATIONS

Extended European Search Report issued Feb. 23, 2011, in Patent Application No. 08790559.2.

*Primary Examiner* — David B Thomas
(74) *Attorney, Agent, or Firm* — Oblon, Spivak, McClelland, Maier & Neustadt, L.L.P.

(57) ABSTRACT

A method for positioning a work, which is adapted for a knock hole of a small diameter and which can absorb a pitch error between a main positioning hole and an auxiliary positioning hole of the work is disclosed. An insert shaft of a main positioning device is inserted into the main positioning hole. An auxiliary positioning device includes a base lower block having a parallel slide holding surface, a sliding flange having a sliding surface, and an insert shaft disposed above the sliding flange. The sliding flange of the auxiliary positioning device is guided and moved by the slide holding surface, and is inserted, while absorbing the pitch error, into the auxiliary positioning hole, thereby to position the work.

14 Claims, 18 Drawing Sheets

U.S. PATENT DOCUMENTS

| | | | |
|---|---|---|---|
| 2005/0121846 A1* | 6/2005 | Kawakami | 269/309 |
| 2006/0033255 A1* | 2/2006 | Yonezawa et al. | 269/309 |
| 2006/0049568 A1* | 3/2006 | Yonezawa et al. | 269/309 |
| 2006/0049569 A1* | 3/2006 | Yonezawa | 269/309 |
| 2006/0261534 A1* | 11/2006 | Yonezawa et al. | 269/309 |
| 2006/0273504 A1* | 12/2006 | Yonezawa et al. | 269/309 |
| 2006/0279034 A1* | 12/2006 | Yonezawa et al. | 269/309 |
| 2006/0289709 A1 | 12/2006 | Yonezawa et al. | |
| 2007/0138725 A1 | 6/2007 | Yonezawa et al. | |
| 2007/0262508 A1* | 11/2007 | Haruna | 269/309 |
| 2008/0157451 A1 | 7/2008 | Yonezawa et al. | |

FOREIGN PATENT DOCUMENTS

| | | |
|---|---|---|
| EP | 1 679 151 A1 | 7/2006 |
| JP | 4 20739 | 4/1992 |
| JP | 6 44586 | 11/1994 |
| JP | 9 103928 | 4/1997 |
| JP | 11 188551 | 7/1999 |
| JP | 2002 263977 | 9/2002 |
| JP | 2007 21598 | 2/2007 |
| KR | 2003-0030855 | 4/2003 |
| KR | 10-2006-0118480 | 11/2006 |
| WO | 2005 037485 | 4/2005 |

* cited by examiner

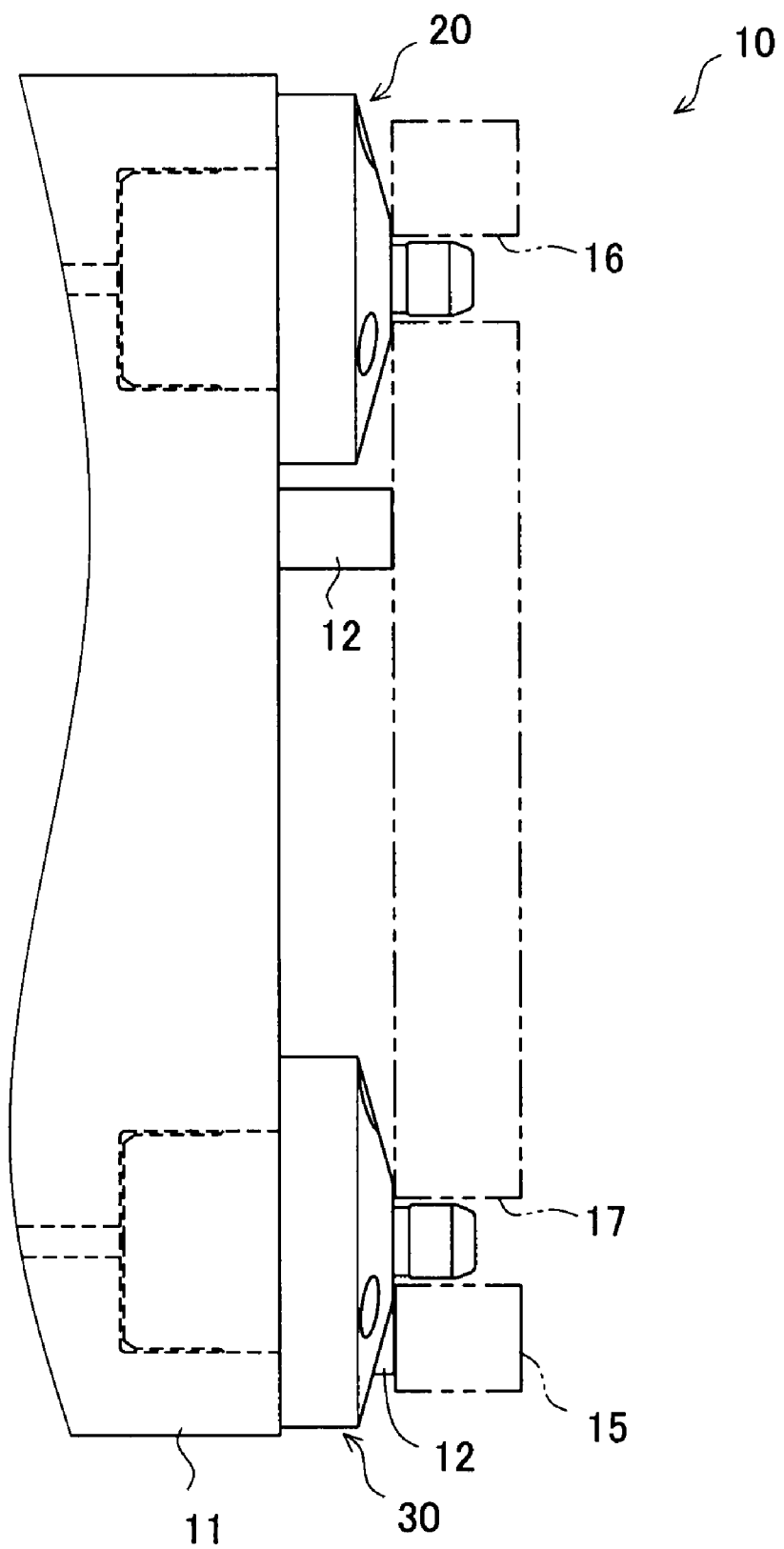

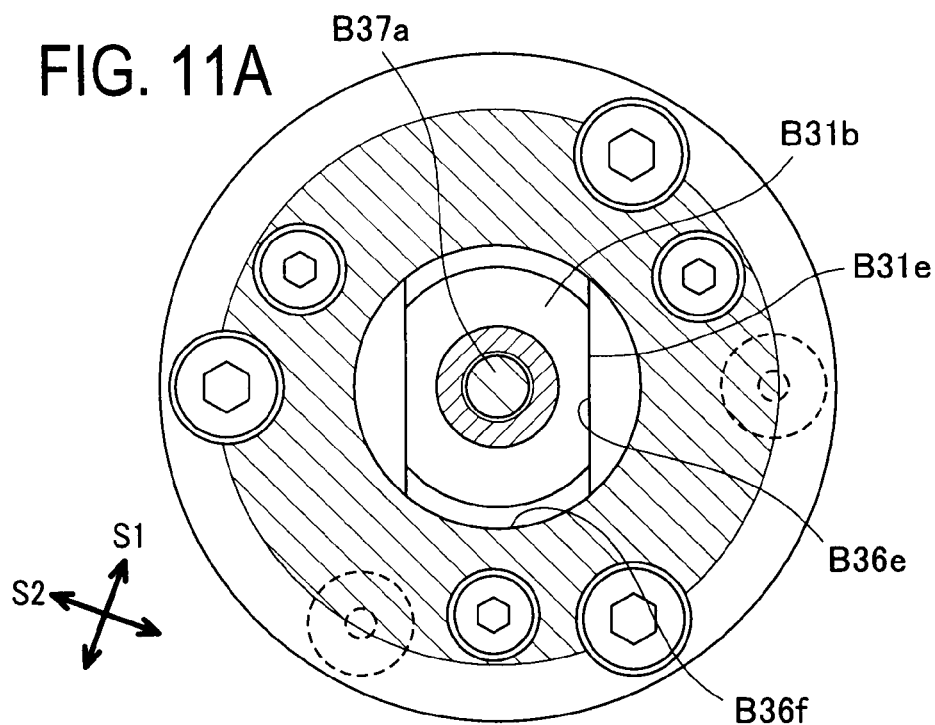
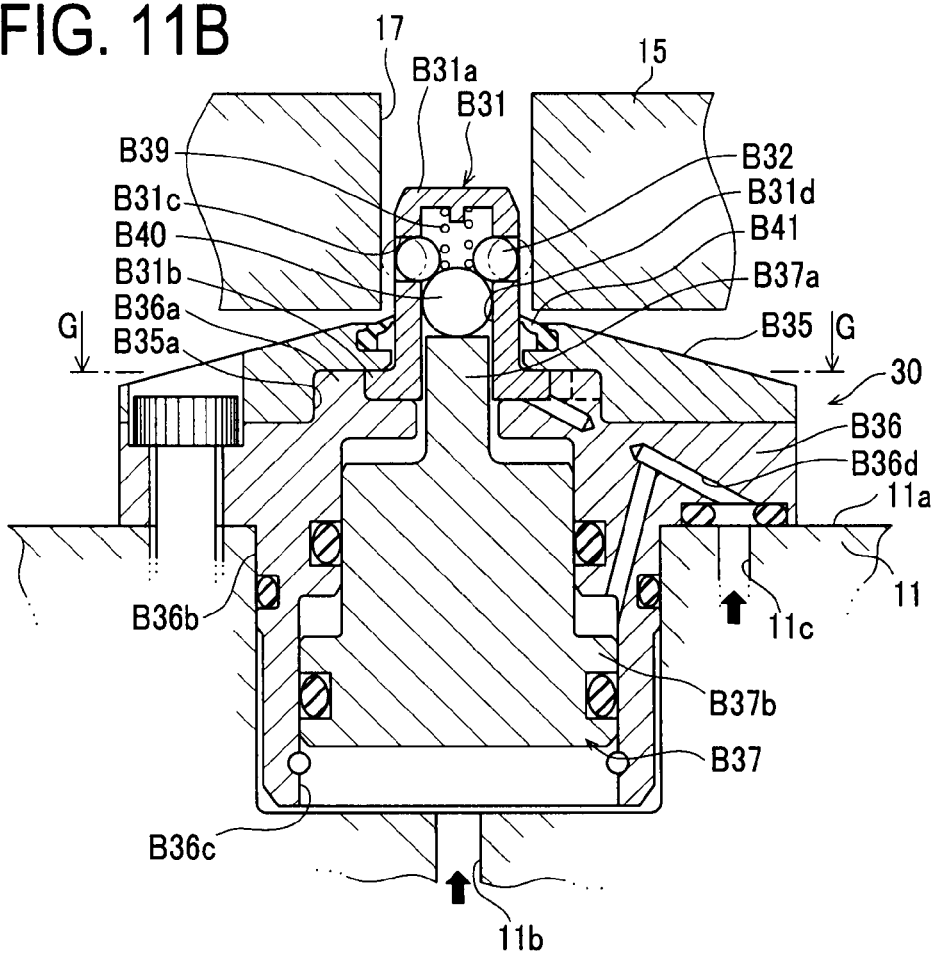

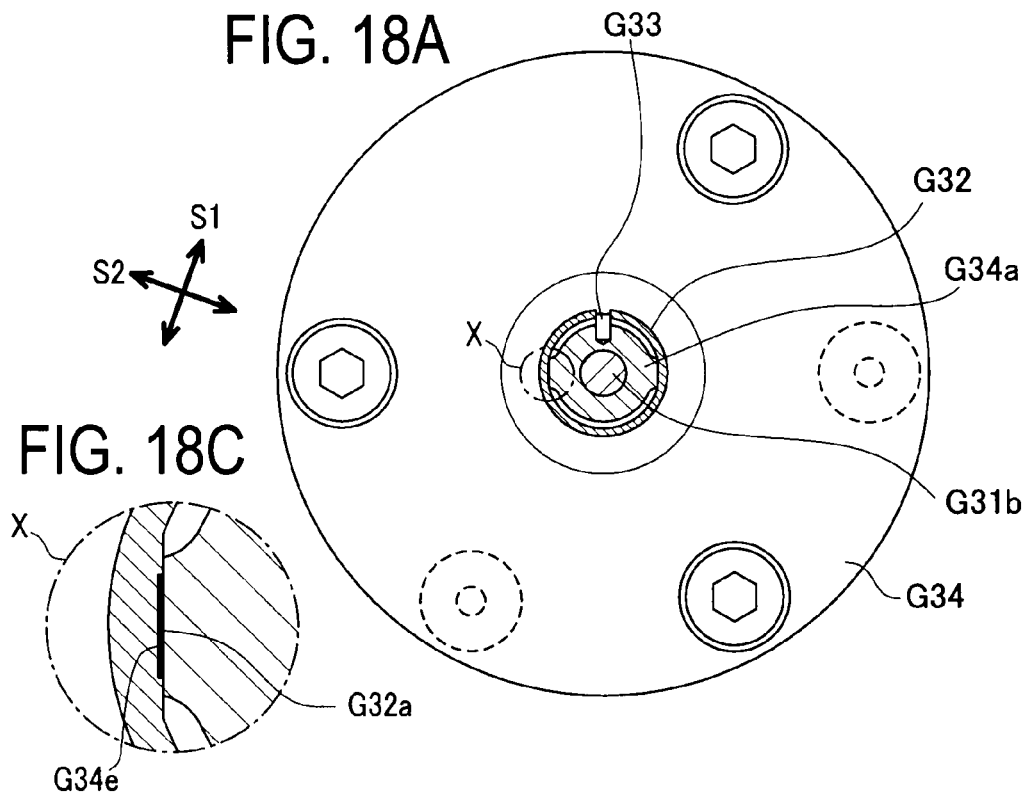
FIG. 18A
FIG. 18C
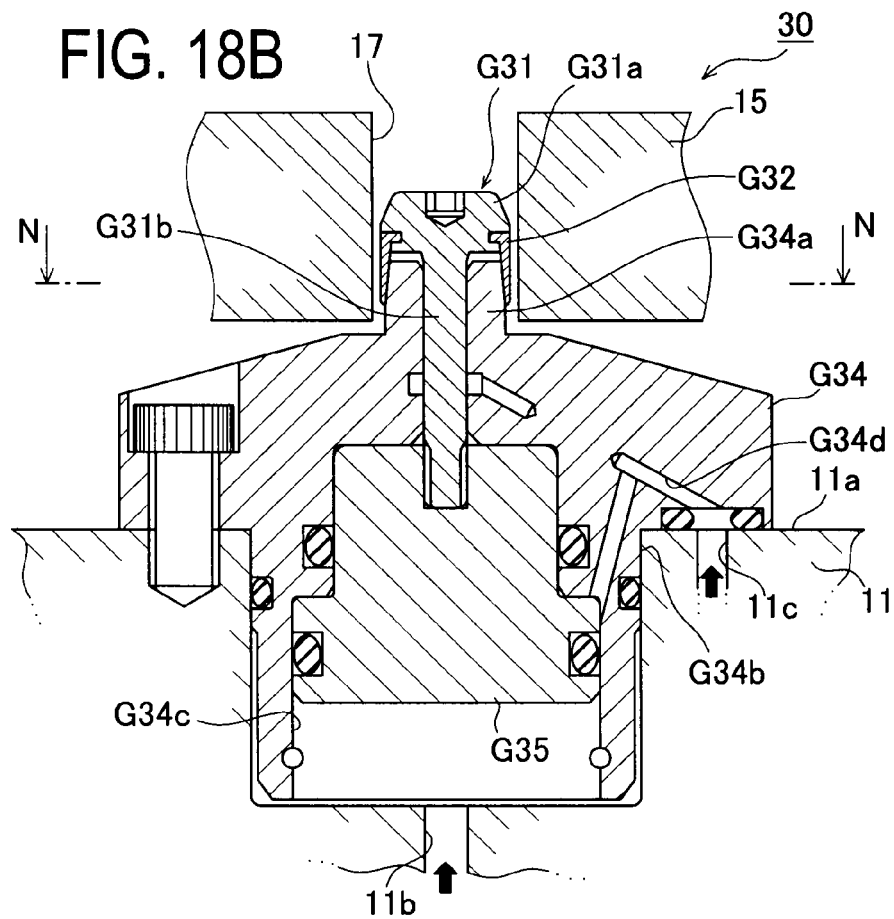
FIG. 18B

WORK POSITIONING METHOD, AND POSITIONING DEVICE

CROSS-REFERENCE TO RELATED APPLICATIONS

This is a national phase application filed under 35 U.S.C 371 of PCT/JP2008/061372 filed on Jun. 16, 2008, which claims the benefit of priority from the prior Japanese Patent Application No. 2007-160945 filed on Jun. 19, 2007, the entire contents of all of which are incorporated herein by reference.

TECHNICAL FIELD

The present invention relates to a technique of positioning a work or workpiece and more particularly to a technique of accurately positioning a work by absorbing a machining error of a positioning hole formed in the work.

BACKGROUND ART

For machining process, machine assembling, etc., it is very important to position a work or workpiece which will be processed or assembled.

In an automatic machining process of a work, if a reference point of the work to be processed is not accurately grasped relative to an origin point of a machine tool, the work could not be accurately machine-processed. In automatic machine assembling, on the other hand, it is technically possible to provide a work to be assembled a reference plane or the like so that an assembling device detects this point and also provide a position adjusting mechanism for adjusting an assembling position. However, it requires costs and detection time, resulting in a long lead time.

In view of such problems, techniques as described in Patent Literatures 1 to 4 have been proposed.

Patent Literature 1 discloses a technique of automatically changing the position of a knock pin.

Some process lines would be used to feed a plurality of kinds of works to be processed. It is ideal to provide a machining line per kind of work; however, it does not worth the cost for a small number of lots, and therefore one line is sometimes used for processing a plurality of kinds of works. In this case, positioning has to be changed according to the kinds of works.

In Patent Literature 1, two works of different kinds are formed respectively with knock holes to be used for positioning. Assuming that one of knock pins provided in a positioning device is referred to as a main knock pin and the other is referred to as an auxiliary knock pin, the position of the auxiliary knock pin is slidable with respect to the main knock pin according to the work. Since the auxiliary knock pin is moveable to two positions, it can correspond to a knock hole of each work.

Patent Literature 2 discloses a technique related to a jig plate of a reference base.

The jig plate is formed with a plurality of knock pin holes and vertical and lateral grooves and provided with a block that is slidable in the grooves and has a knock pin hole. In this technique, one knock pin inserted into one knock hole formed in the work is inserted into one of the knock pin holes of the jig plate and the other knock pin inserted into the other knock hole of the work is inserted into the knock pin hole of the block to determine the position of a work.

When the kind of a work is changed, having a different pitch between one knock hole and the other knock hole, the knock pin is slid to move within the grooves of the jig plate, thereby changing a pitch between one knock pin and the other knock pin to correspond to a hole-to-hole pitch of the work.

Thus, the positioning of works having different pitches can be performed.

Patent Literature 3 discloses a technique related to a temporary work clamping device.

A clamping system is arranged such that a main clamp and an auxiliary clamp are coupled with a connecting rod to clamp a work with a time lag. The main clamp and the auxiliary clamp are coupled with the connecting rod and a single drive source is secured in a position off the center of the connecting rod. It is therefore possible to fix a work by the main clamp first and then by the auxiliary clamp so that the location of the work is fixed by the main clamp. Thus, clamping can be achieved without causing displacement of the work.

Patent Literature 4 discloses a technique related to a positioning and fixing device for a knock pin.

This technique is to position a work with two knock pins. Depending on different works, one knock pin is slidable in a long hole and is positioned in place by a clamping mechanism utilizing the principle of leverage and the other knock pin is slidable in a long hole formed at an angle so that its extension line intersects with that of the former long hole and is positioned in place by the clamping mechanism.

This configuration allows the positioning of works of which positioning holes are arranged at different pitches.

However, the techniques disclosed in Patent Literatures 1 to 4 may have a problem with difficulty in improving the positioning accuracy.

In the case where two knock pins are basically used for positioning, the knock holes formed in each work are designed with some degree of clearance.

As to the knock holes to be formed in a work, if using a technique of processing a block material, the diameter of each knock hole and a hole-to-hole pitch can be determined with significant accuracy. However, works made of steel plate or cast metal have large accuracy tolerances in the knock hole diameter and the hole-to-hole pitch. Furthermore, even machining process needs much time for accurate process and can only provide accuracy in line with costs.

Such work positioning requires determination of the position and the kind of knock pins to absorb errors in knock hole diameter and hole-to-hole-to-hole pitch.

Even when the diameter and the hole-to-hole pitch of the knock holes formed in the work can be formed with high machining accuracy, some degree of clearance is needed to facilitate insertion/removal of the work with respect to the knock pin.

When the work is inserted on the knock pin, conceivably, the work could be inclined. Unless the clearance between the knock pin and the knock hole is determined not to allow this inclination, it is very difficult to insert/remove the work with respect to the knock pin.

From such reason, the diameter of the knock pin is determined to be narrower to some extent than the diameter of the knock hole formed in the work. Thus, the positioning accuracy will lower by just that much.

According to the positioning method using the knock pin and the clamp in Patent Literatures 1 to 4 in which the auxiliary positioning means is moved with respect to the main positioning means, it is conceivable that the hole-to-hole pitch can be determined roughly. However, as long as it is configured to insert the knock pin in the knock hole, the clearance has to be provided as ever for insertion.

However, providing the clearance in the diameter of the knock pin with respect to the diameter of the knock hole indicates that a work positioning error is permitted by the clearance. By just this clearance, positional displacement is caused in a direction that rotates about the main knock pin.

To solve such problem, Patent Literature 5 discloses a technique related to a positioning device and a clamping system including it.

FIG. 19 is a vertical sectional view of an auxiliary knock pin 100 in Patent Literature 5. FIG. 20 is a horizontal sectional view of the auxiliary knock pin 100 in Patent Literature 5.

The auxiliary knock pin 100 includes a plug member 110 at a leading end of a housing 109. The plug member 110 is formed with a slide outer surface 110a. A slide part 111 formed with a slide surface 111a which contacts with the slide outer surface 110a is placed in contact with the inner surface of a cylindrical wedge member 113. The wedge member 113 contacts with the inner surface of an engagement member 114 held in a cap member 112.

The auxiliary knock pin 100 is configured as above. Accordingly, when the cap member 112 is inserted into an auxiliary knock hole of a work, the slide surface 111a of the slide part 111 and the slide outer surface 110a of the plug member 110 are slid and moved in parallel to move the cap member 112 with respect to the housing 109. This corrects a pitch error between the main knock hole and the auxiliary knock hole formed in the work.

Furthermore, the cap member 112 is connected to a piston 115. When the piston 115 is moved down from a state in FIG. 19 by hydraulic pressure, the engagement member 114 is expanded in diameter because of the wedge shape of the wedge member 113, thereby eliminating the clearance between the auxiliary knock hole and the cap member 112.

This Patent Literature 5 is also a technique of basically positioning a work with two knock pins and having a function of absorbing the pitch error between the main knock hole and the auxiliary knock hole.

According to a processing machine using such positioning device, therefore, it is possible to accurately process a work with reference to the main knock hole.

Patent Literature 1: JP examined patent publication No. 4(1992)-20739
Patent Literature 2: JP examined utility model publication No. 6(1994)-44586
Patent Literature 3: JP unexamined patent publication No. 9(1997)-103928
Patent Literature 4: JP unexamined patent publication No. 2002-263977
Patent Literature 5: Pamphlet of WO2005/037485A1

SUMMARY OF INVENTION

Technical Problem

However, Patent Literature 5 may have a problem that could not downsize the knock pin itself in structure.

The positioning device in Patent Literature 5 includes, as shown in FIG. 20, the plug member 110, slide part 111, and wedge member 113 inside the leading end of the auxiliary knock pin 100 so that they are surrounded by the engagement member 114 engageable in the auxiliary knock hole. This sliding mechanism allows the auxiliary knock pin 100 to move in parallel to correct the pitch error between the main knock hole and the auxiliary knock hole.

Accordingly, the sliding mechanism needs rigidity enough to receive corresponding stress such as horizontal stress occurring in absorbing the pitch error and vertical stress by own weight of a work.

To enhance the rigidity of the sliding mechanism of the auxiliary knock pin 100, the sliding mechanism needs to be increased in size and hence the cap member 112 has to have an increased diameter. To improve the accuracy of parts or components used in the sliding mechanism, each part or component needs to be formed in a certain degree of size. This is because it is more difficult to improve the accuracy of each part or component as each part or component is smaller.

However, the necessity of increasing the diameter of the auxiliary knock pin 100 leads to the necessity of increasing the diameter of the auxiliary knock hole in the work.

On the other hand, since the main knock hole and the auxiliary knock hole must be formed in the work, the work needing a large main knock hole and a large auxiliary knock hole has low freedom of design. In many cases, the knock hole itself is not used after the work is completed into a finished product. Thus, those who design a work have demanded for a minimum diameter of a knock hole.

In other words, it is preferable that a knock pin is adaptable to a knock hole having a small diameter.

The present invention has been made to solve the above problems and has a purpose to provide a work positioning method and a positioning device adaptable to a knock hole having a small diameter and capable of absorbing a pitch error between a main knock hole and an auxiliary knock hole formed in a work.

Solution to Problem

To achieve the above object, the work positioning method according to the present invention has the following features and provides operations and effects.

(1) An aspect is a work positioning method comprising a main positioning means and an auxiliary positioning means placed to protrude on a reference plane to determine a position of a work by inserting the main positioning means into a main positioning hole formed in the work and inserting the auxiliary positioning means into an auxiliary positioning hole formed in the work, wherein the main positioning means includes a main positioning insert part having a circular outer peripheral shape to be inserted in the main positioning hole, the auxiliary positioning means includes: a base block member formed with at least two first smooth surfaces opposing each other and parallel with a straight line joining the main positioning means and the auxiliary positioning means; a sliding part formed with second smooth surfaces in parallel with the straight line and in correspondence with the first smooth surfaces of the base block; and an auxiliary positioning insert part provided above the sliding part, the auxiliary positioning insert part having a circular outer peripheral shape to be inserted into the auxiliary positioning hole, wherein when the work is to be positioned, the main positioning insert part of the main positioning means is inserted into the main positioning hole, and the sliding part of the auxiliary positioning means is guided by the first smooth surfaces to move on the straight line to absorb a pitch error between the main positioning hole and the auxiliary positioning hole, and the auxiliary positioning insert part is inserted into the auxiliary positioning hole.

According to the invention disclosed in (1), in the a work positioning method comprising a main positioning means and an auxiliary positioning means placed to protrude on a reference plane to determine a position of a work by inserting the main positioning means into a main positioning hole formed in the work and inserting the auxiliary positioning means into an auxiliary positioning hole formed in the work, the main positioning means includes a main positioning insert part having a circular outer peripheral shape to be inserted in the main positioning hole, the auxiliary positioning means includes: a base block member formed with at least two first smooth surfaces opposing each other and parallel with a straight line joining the main positioning means and the auxiliary positioning means; a sliding part formed with second smooth surfaces in parallel with the straight line and in correspondence with the first smooth surfaces of the base block; and an auxiliary positioning insert part provided above the sliding part, the auxiliary positioning insert part having a circular outer peripheral shape to be inserted into the auxiliary positioning hole, wherein when the work is to be positioned, the main positioning insert part of the main positioning means is inserted into the main positioning hole, and the sliding part of the auxiliary positioning means is guided by the first smooth surfaces to move on the straight line to absorb a pitch error between the main positioning hole and the auxiliary positioning hole, and the auxiliary positioning insert part is inserted into the auxiliary positioning hole.

Accordingly, the auxiliary positioning means is allowed to move on a straight line passing through the main positioning means. It is therefore possible to absorb the pitch error between the main positioning hole and the auxiliary positioning hole in the work without imposing an unnecessary burden on the main positioning means.

A size of a portion to be machined is determined relative to the main positioning means. No unnecessary burden is therefore applied to the main positioning means, allowing accurately determining the position of the main positioning hole. This can contribute to improved machining accuracy.

The auxiliary positioning insert part may receive a load in a thrust direction due to the weight or load of the work. It is therefore preferable to design the first and second smooth surfaces to be large to improve rigidity. Furthermore, since the accuracy of components constituting the sliding part has an influence on the work positioning accuracy, those components need to be manufactured with high accuracy. However, a smaller component could not be manufactured with high accuracy and thus the sliding part is required to be larger. On the other hand, in many cases, the main positioning hole and the auxiliary positioning hole of the work become unnecessary after the work is attached to a product. This is a reason that a hole having an excessive diameter could not be provided.

The sliding part including the second smooth surfaces corresponding to the first smooth surfaces of the base block member is provided below the auxiliary positioning insert part. As in the technique disclosed in Patent Literature 5, the auxiliary positioning insert part can be made small as compared with the case where the sliding part is provided in the auxiliary positioning insert part. For instance, the auxiliary positioning insert part can be adapted to a knock hole having a diameter of 6 mm or 8 mm. Furthermore, there is no need to downsize the sliding part, which contributes to enhanced accuracy.

According to the invention described in (1), consequently, it is possible to provide the work positioning method adapted for a small-diameter knock hole and configured to absorb the pitch error between a main knock hole and an auxiliary hole formed in a work.

It is to be noted that, the term "circular outer shape" used herein includes a configuration that an inner-diameter holding member mentioned later is provided on an outer periphery of the main positioning insert part and the auxiliary positioning insert part to hold, at three or more points, the inner surface of each of the main positioning hole and the auxiliary positioning hole formed in the work, as well as a configuration actually having a circular outer peripheral shape. By three or more holding points or by a surface to hold the inner diameter, it is possible to eliminate a clearance between the positioning hole and the insert part.

(2) In the work positioning method described in (1), it is characterized that the auxiliary positioning means comprises: an inner-diameter holding member which will contact with an inner surface of the auxiliary positioning hole; and a diameter adjusting part provided with a tapered surface contacting with the inner-diameter holding member, wherein while the auxiliary positioning insert part is inserted in the auxiliary positioning hole of the work, the diameter adjusting part or the inner-diameter holding member is moved in parallel in an axis direction of the auxiliary positioning means to cause the inner-diameter holding member to contact with and press against the inner surface of the auxiliary positioning hole.

According to the invention described in (2), in the work positioning method set forth in (1), the auxiliary positioning means comprises: an inner-diameter holding member which will contact with an inner surface of the auxiliary positioning hole; and a diameter adjusting part provided with a tapered surface contacting with the inner-diameter holding member, wherein while the auxiliary positioning insert part is inserted in the auxiliary positioning hole of the work, the diameter adjusting part or the inner-diameter holding member is moved in parallel in an axis direction of the auxiliary positioning means to cause the inner-diameter holding member to contact with and press against the inner surface of the auxiliary positioning hole. Accordingly, the auxiliary positioning means can additionally have an inner-diameter holding function for the auxiliary positioning hole.

The main positioning means and the auxiliary positioning means are additionally provided with the inner-diameter holding function with respect to each positioning hole, thereby enhancing the positioning accuracy.

Usually, a positioning hole is provided with a clearance by increasing a gap from a positioning pin in order to achieve good workability. Accordingly, even a hole having a diameter of about 10 mm is provided with a clearance of about several tens of micrometers. This clearance makes it easy to insert/remove the positioning pin with respect to the positioning hole formed in the work.

However, this clearance may cause backlash which will deteriorate positioning accuracy. Therefore, a positioning pin is given an expanding and contracting function as disclosed in Patent Literature 5 to eliminate the clearance. It is expected from such configuration to enhance the positioning accuracy.

However, if this complicated function is added to the positioning means, the inside of the positioning insert part of the positioning means is complicated, resulting in low rigidity of the positioning insert part. To prevent such defect, it is necessary to increase the diameter of the positioning insert part. In the case where the sliding part movable along a straight line joining to the main positioning means is provided, as in the auxiliary positioning means mentioned in (1), the structure is further complicated.

Even in the case where such expanding and contracting function is added to the auxiliary positioning means, it is effective to place the sliding part below the auxiliary positioning means.

(3) In the work positioning method described in (2), the diameter adjusting part is provided with a spherical surface instead of the tapered surface, and the spherical surface contacts with the inner-diameter holding member.

Even by the diameter adjusting part provided with the spherical surface instead of the tapered surface and the spherical surface contacts with the inner-diameter holding member, as the invention set forth in (3), the work positioning accuracy can also be enhanced as in (2).

(4) In the work positioning method described in (2), the inner-diameter holding member will contact the inner surface of the auxiliary positioning hole at three or more points.

According to the invention described in (4), in the work positioning method set forth in (2), the inner-diameter holding member will contact with the inner surface of the auxiliary positioning hole at three or more points. Accordingly, the center axis of the auxiliary positioning hole can be aligned with the center axis of the auxiliary positioning insert part to accurately position the work.

(5) In the work positioning method described in one of (1) to (4), the sliding part including the second smooth surfaces is formed in a slide block placed in the base block member, and the slide block holds an insert part block including the auxiliary positioning insert part.

According to the invention described in (5), in the work positioning method set forth in one of (1) to (4), the sliding part including the second smooth surfaces is formed in a slide block placed in the base block member, and the slide block holds an insert part block including the auxiliary positioning insert part. Accordingly, the sliding part is not needed to be directly provided in the insert part block. This leads to an advantage that the main positioning means and the insert part block can use common components.

Since the sliding part is provided below the auxiliary positioning insert part, needless to say, it also can contribute to downsizing of the auxiliary positioning insert part.

(6) In the work positioning method described in (1), an air supply passage is connected to the sliding part to prevent foreign substances between the first smooth surface and the second smooth surface.

According to the invention described in (6), in the work positioning method set forth in (1), the air supply passage is connected to the sliding part to prevent foreign substances between the first smooth surface and the second smooth surface. Constant supply of air through the air supply passage makes it possible to prevent rusts or oil from entering between the first smooth surface and the second smooth surface. In the case where the surfaces slide on one another, it is conceivable that foreign substances enter and are caught in, and hence the positioning device cannot move smoothly. However, such situation can be avoided by air supply.

(7) Another aspect is a positioning method comprising a main positioning means and an auxiliary positioning means placed to protrude on a reference plane to determine a position of the work by inserting the main positioning means into a main positioning hole formed in the work and inserting the auxiliary positioning means into an auxiliary positioning hole formed in the work, wherein the main positioning means includes a main positioning insert part having a circular outer peripheral shape to be inserted in the main positioning hole, the auxiliary positioning means includes: a base block member formed with at least two first smooth surfaces opposing each other and parallel with a straight line joining the main positioning means and the auxiliary positioning means; and an auxiliary positioning insert part provided, in an inner surface, with second smooth surfaces contacting with the first smooth surfaces of the base block member, the auxiliary positioning insert part having a circular outer peripheral shape to be inserted into the auxiliary positioning hole, wherein when the work is to be positioned, the main positioning insert part of the main positioning means is inserted into the main positioning hole, and the auxiliary positioning insert part of the auxiliary positioning means is guided by the first smooth surfaces to move on the straight line to absorb a pitch error between the main positioning hole and the auxiliary positioning hole, and the auxiliary positioning insert part is inserted into the auxiliary positioning hole.

According the invention described in (7), in the work positioning method comprising a main positioning means and an auxiliary positioning means placed to protrude on a reference plane to determine a position of the work by inserting the main positioning means into a main positioning hole formed in the work and inserting the auxiliary positioning means into an auxiliary positioning hole formed in the work, the main positioning means includes a main positioning insert part having a circular outer peripheral shape to be inserted in the main positioning hole, the auxiliary positioning means includes: a base block member formed with at least two first smooth surfaces opposing each other and parallel with a straight line joining the main positioning means and the auxiliary positioning means; and an auxiliary positioning insert part provided, in an inner surface, with second smooth surfaces contacting with the first smooth surfaces of the base block member, the auxiliary positioning insert part having a circular outer peripheral shape to be inserted into the auxiliary positioning hole, wherein when the work is to be positioned, the main positioning insert part of the main positioning means is inserted into the main positioning hole, and the auxiliary positioning insert part of the auxiliary positioning means is guided by the first smooth surfaces to move on the straight line to absorb a pitch error between the main positioning hole and the auxiliary positioning hole, and the auxiliary positioning insert part is inserted into the auxiliary positioning hole.

Accordingly, the auxiliary positioning means can be moved on the straight line joining to the main positioning means to absorb the pitch error between the main positioning hole and the auxiliary positioning hole of the work without imposing an unnecessary burden on the main positioning means.

The invention described in this (7) is substantially the same as the invention set forth in (2) but different therefrom in that the second smooth surfaces are directly formed in an inner surface of the auxiliary positioning insert part.

In this case where the second smooth surfaces are formed in the inner surface of the auxiliary positioning insert part, the second smooth surfaces can be formed integral with the auxiliary positioning insert part, which can contribute to a reduction in the number of components and downsizing of the auxiliary positioning insert part.

Furthermore, to achieve the above object, the work positioning device according to the present invention has the following features.

(8) Another aspect is a work positioning device comprising, on a reference plane, a main positioning means to be inserted into a main positioning hole formed in a work and an auxiliary positioning means to be inserted into an auxiliary positioning hole formed in the work, wherein the main positioning means includes a main positioning insert part having a circular outer peripheral shape to be formed in the main positioning hole, the auxiliary positioning means includes: a base block member formed with at least two first smooth surfaces opposing each other and parallel with a straight line joining the main positioning means and the auxiliary positioning means; a sliding part provided with second smooth surfaces formed in correspondence with the first smooth surfaces of the base block member and in parallel with the straight line, the sliding part being guided by the first smooth surfaces to move on the straight line; and an auxiliary positioning insert part provided above the sliding part, the auxiliary positioning insert part having a circular outer peripheral shape to be inserted into the auxiliary positioning hole.

The invention described in (8) is the work positioning device configured as in (1). Accordingly, the auxiliary positioning means can be moved on the straight line joining to the main positioning means. It is therefore possible to absorb the pitch error between the main positioning hole and the auxiliary positioning hole in the work without imposing an unnecessary burden on the main positioning means. When the size of a portion to be machined is determined relative to the main positioning means, this also can contribute to improved machining accuracy as described in (1).

The sliding part including the second smooth surfaces corresponding to the first smooth surfaces of the base block member is provided below the auxiliary positioning insert part. Accordingly, the work positioning device can be provided with a downsized auxiliary positioning insert part to adapt to a small-diameter knock hole and capable of absorbing the pitch error between the main knock hole and the auxiliary knock hole formed in the work.

(9) In the work positioning device described in (8), the auxiliary positioning means comprises: an inner-diameter holding member which will contact with an inner surface of the auxiliary positioning hole; and a diameter adjusting part provided with a tapered surface contacting with the inner-diameter holding member, and wherein while the auxiliary positioning insert part is inserted in the auxiliary positioning hole of the work, the diameter adjusting part or the inner-diameter holding member is moved in parallel in an axis direction of the auxiliary positioning means to cause the inner-diameter holding member to contact with and press against the inner surface of the auxiliary positioning hole.

(10) In the work positioning device described in (9), the diameter adjusting part is provided with a spherical surface instead of the tapered surface, and the spherical surface contacts with the inner-diameter holding member.

The invention described in (9) is the work positioning device having the same configuration as in (2). Thus, the auxiliary positioning means can be additionally provided with the inner-diameter holding function with respect to the auxiliary positioning hole. The main positioning means and the auxiliary positioning means are additionally provided with the inner-diameter holding function with respect to respective positioning holes, so that positioning accuracy can be enhanced.

Even in the configuration described in (10), as with (3), when the diameter adjusting part is provided with the spherical surface instead of the tapered surface and the spherical surface contacts with the inner-diameter holding member, the work positioning accuracy can be enhanced as with (7).

Furthermore, the configuration described in 10 can improve the accuracy of the positioning device as with the positioning means set forth in (4).

(11) In the work positioning device (9), the inner-diameter holding member will contact with the inner surface of the auxiliary positioning hole at three or more points.

(12) In the work positioning device described in one of (8) to (11), the sliding part including the second smooth surfaces is formed in a slide block placed in the base block member, and the slide block holds the insert part block including the auxiliary positioning insert part.

The invention described in (12) is the work positioning device having the same configuration as in (5). Accordingly, the sliding part is not needed to be directly provided in the insert part block. This leads to an advantage that the main positioning means and the insert part block can use common components.

Since the sliding part is provided below the auxiliary positioning insert part, needless to say, it also can contribute to downsizing of the auxiliary positioning insert part.

(13) In the work positioning device (8), an air supply passage is connected to the sliding part to prevent foreign substances between the first smooth surface and the second smooth surface.

The invention described in (13) is the work positioning device as in (6). Accordingly, foreign substances can be prevented from entering between the first smooth surface and the second smooth surface of the sliding part, thereby avoiding the foreign substances from being caught therein, leading to nonsmooth movement.

(14) Another aspect is a work positioning device comprising, on a reference plane, a main positioning means to be inserted into a main positioning hole formed in a work and an auxiliary positioning means to be inserted into an auxiliary positioning hole formed in the work, wherein the main positioning means includes a main positioning insert part having a circular outer peripheral shape to be formed in the main positioning hole, the auxiliary positioning means includes: a base block member formed with at least two first smooth surfaces opposing each other and parallel with a straight line joining the main positioning means and the auxiliary positioning means; and an auxiliary positioning insert part having a circular outer peripheral shape and formed, in an inner surface, with second smooth surfaces contacting with the first smooth surfaces of the base block member so that the auxiliary positioning insert part can be guided by the first smooth surfaces to move on the straight line when the auxiliary positioning insert part is inserted into the auxiliary positioning hole.

The invention described in (14) is the work positioning device having the same configuration as in (7). Accordingly, when such second smooth surfaces are formed in the inner surface of the auxiliary positioning insert part, an integral component can be provided with reduced number of components and also the auxiliary positioning insert part can be downsized.

BRIEF DESCRIPTION OF DRAWINGS

FIG. 2 is a side view of the positioning device 10 in the first embodiment;

FIG. 11A is a sectional view of an auxiliary positioning unit 30 in a third embodiment, taken along a line G-G in FIG. 11B;

FIG. 11B is a sectional view of the auxiliary positioning unit 30 in the third embodiment, corresponding to a view taken along the line B-B in FIG. 1;

FIG. 18A is a sectional view of an auxiliary positioning unit 30 in an eighth embodiment, taken along a line N-N in FIG. 18B;

FIG. 18B is a sectional view of the auxiliary positioning unit 30 in the eighth embodiment, corresponding to a view taken along the line B-B in FIG. 1;

FIG. 18C is an enlarged view of a part X shown in FIG. 18A;

| Explanation of Reference Signs | |
| --- | --- |
| 10 | Positioning device |
| 11 | Reference block |
| 11a | Reference plane |
| 12 | Reference seat |
| 15 | Work |
| 16 | Main positioning hole |
| 17 | Auxiliary positioning hole |
| 18 | Machined hole |
| 20 | Main positioning unit |
| 21 | Insert shaft |
| 22 | Tapered ring |
| 23 | Pin |
| 24 | Base block |
| 25 | Piston |
| 30 | Auxiliary positioning unit |
| 31 | Insert shaft |
| 32 | Tapered ring |
| 33 | Pin |
| 34 | Tapered protruding member |
| 34a | Tapered protrusion |
| 34b | Sliding flange |
| 34c | Sliding surface |
| 35 | Base upper block |
| 36 | Base lower block |
| 36a | Fitting protrusion |
| 36b | Base fitting part |
| 36c | Cylindrical sliding surface |
| 36d | Oil feed passage |
| 36e | Slide holding surface |
| 36f | Holding groove |
| 37 | Piston |
| 38 | Piston plug |
| 39 | Pressure spring |
| 40 | Holding flange |
| 41 | Seal member |

DESCRIPTION OF EMBODIMENTS

A detailed description of a preferred embodiment of the present invention will now be given referring to the accompanying drawings.

First Embodiment

Firstly, the configuration of a first embodiment will be explained.

Figure 1:
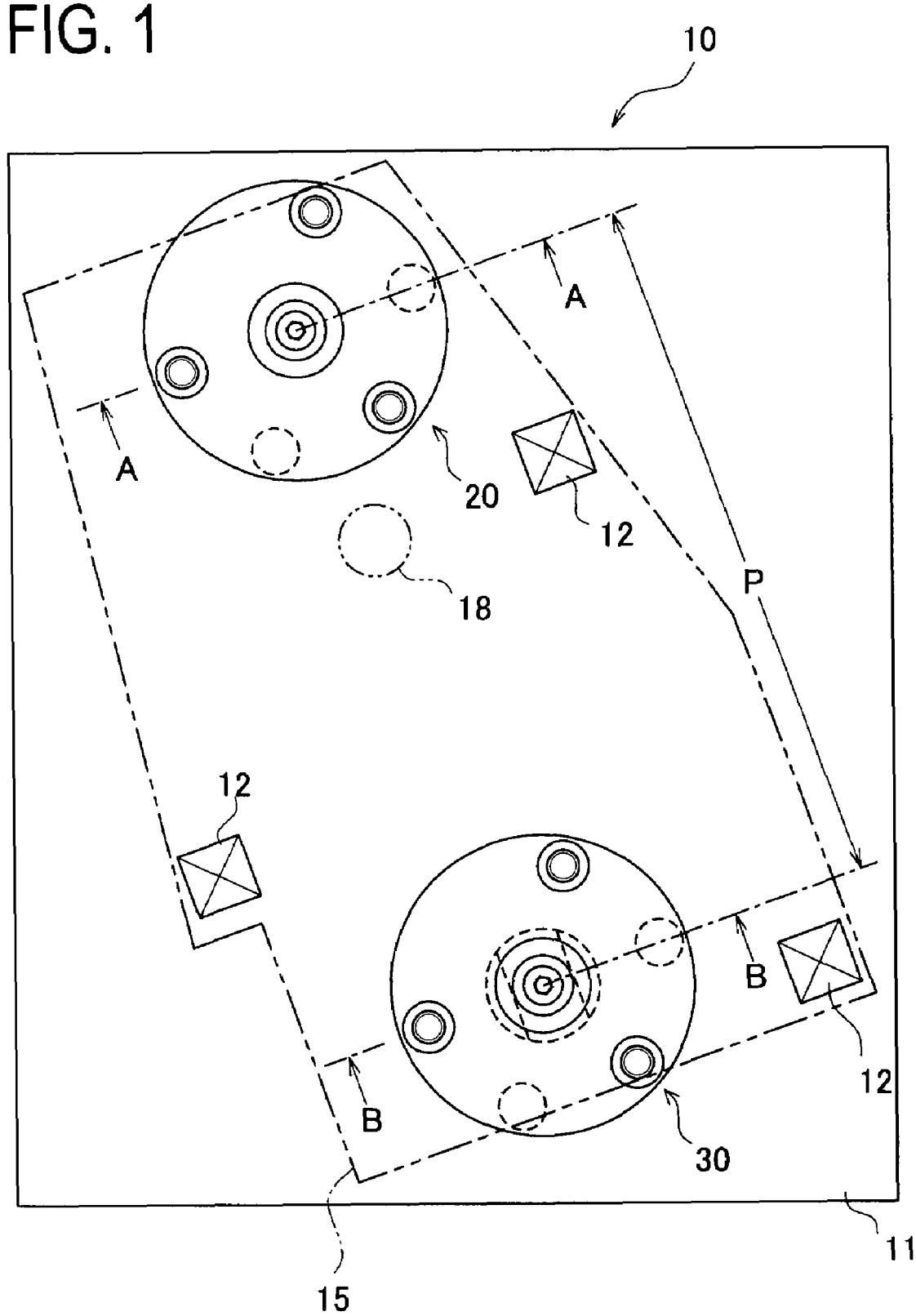
FIG. 1 is a top view of a positioning device 10 in a first embodiment.

FIG. 1 is a top view of a positioning device 10 in the first embodiment. FIG. 2 is a side view of the positioning device 10. The positioning device 10 includes a reference block 11, reference seats 12, a main positioning unit 20, and an auxiliary positioning unit 30 and is arranged to perform positioning of a work 15.

The main positioning unit 20 and the auxiliary positioning unit 30 are secured to the reference block 11 with bolts.

The reference block 11 is a block that has a reference plane 11a shown in FIG. 3 and other figures mentioned later and is formed with a plurality of oil feed passages such as a first oil feed passage 11b and a second oil feed passage 11c. These oil feed passages are coupled to an oil pump or the like so as to be supplied with pressurized oil.

Furthermore, an air supply passage may be formed to supply compressed air as needed. Air supplied through this air supply passage is blown to the leading ends of the main positioning unit 20 and auxiliary positioning unit 30 to purge them to keep away stains or the like from accumulating. This is effective for fine positioning.

The reference seats 12 are blocks serving as a reference of the level (vertical position) of the work 15 and are located at three places on the reference block 11. The work 15 is formed with seats not shown in positions corresponding to those reference seats 12 so that they come into contact with each other when the work 15 is mounted on the positioning device 10. Thus, the reference seats 12 restrict movement of the work 15 in a Z-axis direction. The positions of the reference seats 12 may be determined in correspondence with the positions of the seats formed in the work 15. More preferably, the reference seats 12 are fixed in positions as far away from one another as possible on the reference block 11.

As shown in FIG. 2, the work 15 is formed with a main positioning hole 16 and an auxiliary positioning hole 17. A distance between respective centers of the main positioning hole 16 and the auxiliary positioning hole 17 is referred to as a hole-to-hole pitch P.

Figure 3A:
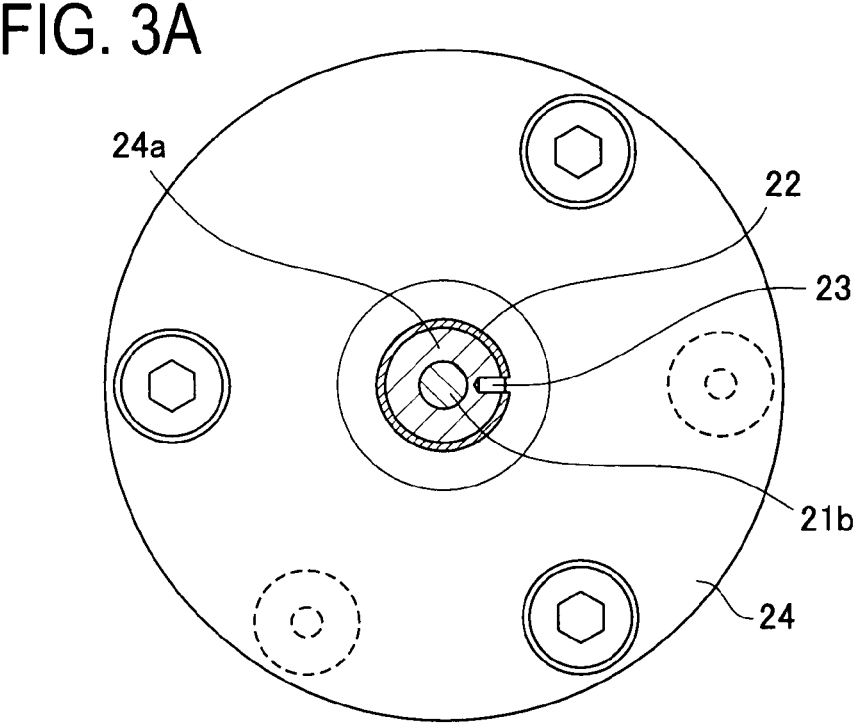
FIG. 3A is a sectional view of a main positioning unit 20 in the first embodiment, taken along a line C-C in FIG. 3B.
Figure 3B:
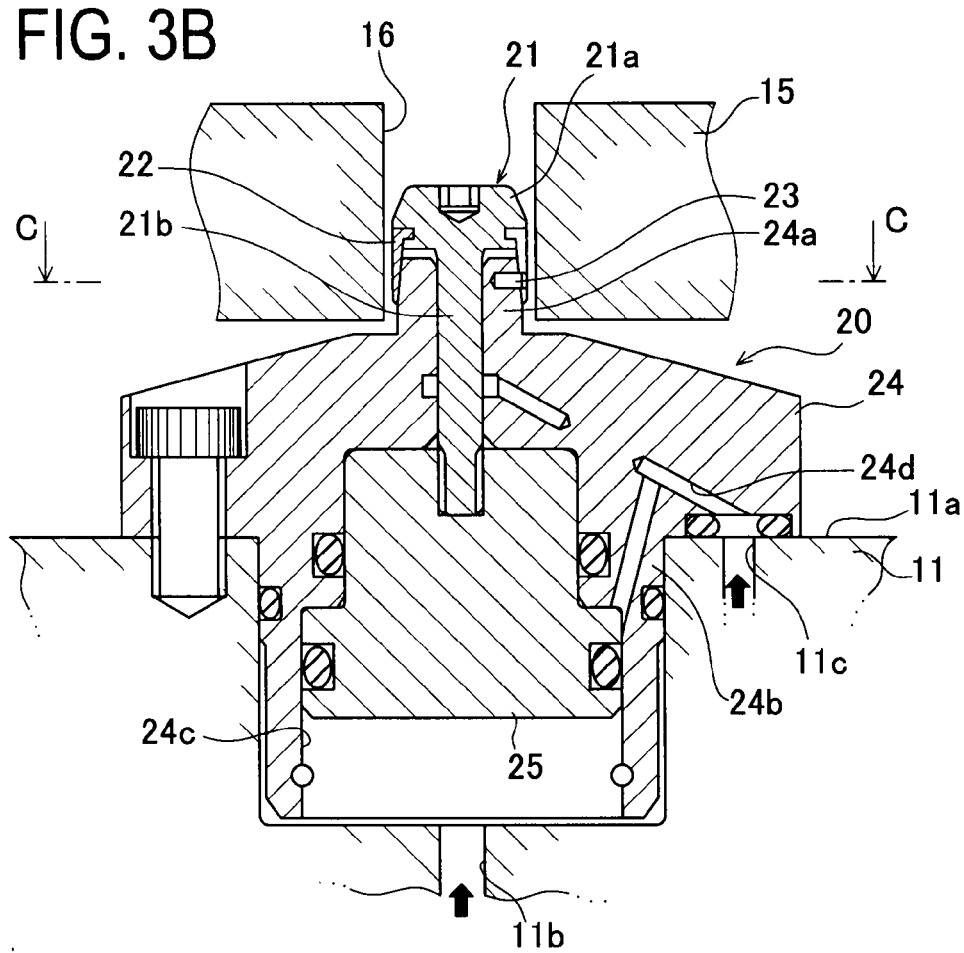
FIG. 3B is a sectional view of the main positioning unit 20 in the first embodiment, taken along a line A-A in FIG. 1.

FIG. 3A is a sectional view of the main positioning unit 20 taken along a line C-C in FIG. 3B. FIG. 3B is a sectional view of the main positioning unit 20 taken along the line A-A in FIG. 1.

The main positioning unit 20 includes an insert shaft 21, a tapered ring 22, a base block 24, a piston 25, and others. Of them, the insert shaft 21 and the tapered ring 22 correspond to a main positioning insertion part.

The insert shaft 21 is constituted of a leading end part 21*a* and a shaft part 21*b* which is coaxial with the leading end part 21*a* having a trapezoidal vertical section.

The tapered ring 22 is a circular tapered component having a C-shaped cross section and is attached to a lower portion of the leading end part 21*a* of the insert shaft 21. Thus, the tapered ring 22 can be expanded and contracted radially.

The base block 24 is formed with a tapered protrusion 24*a* and a base fitting part 24*b* whereby the base block 24 is fitted and positioned in a fitting hole formed in the reference block 11. The tapered protrusion 24*a* is formed so that an outer periphery contacting with an inner surface of the tapered ring 22 is tapered and the tapered protrusion 24*a* is centrally formed with a through hole through which the shaft part 21*b* passes. The tapered protrusion 24*a* is provided with a pin 23 for holding the tapered ring 22 against rotation.

In the outer periphery of the base fitting part 24*b*, an O-ring is placed to prevent leakage of oil supplied in the first oil feed passage 11*b* of the reference block 11. The base fitting part 24*b* of the base block 24A is internally formed with a cylindrical sliding surface 24*c* on which the piston 25 slides. An O-ring is provided in the outer periphery of the piston 25 for the purpose of sliding and sealing.

An upper portion of the piston 25 is threadedly connected to the shaft part 21*b* of the insert shaft 21.

When oil is supplied to an oil feed passage 24*d* formed in the base block 24 through the second supply passage 11*c* of the reference block 11, applying oil pressure to the passage 24*d*, the piston 25 is moved downward along the cylindrical sliding surface 24*c*. When oil pressure is applied on the underside of the main positioning unit 20, the piston 25 is moved upward along the cylindrical sliding surface 24*c*. In association therewith, the insert shaft 21 connected to the piston 25 is also moved downward or upward.

When the main positioning unit 20 configured as above is supplied with oil through the second supply passage 11*c* of the reference block 11 and oil pressure is applied to the oil feed passage 24*d*, the piston 25 is moved downward from a position shown in FIG. 3B. The insert shaft 21 connected to the piston 25 is also moved downward, thereby causing the tapered ring 22 of the insert shaft 21 to expand the diameter along the outer peripheral surface of the tapered protrusion 24*a*.

When the tapered ring 22 is expanded in diameter, the outer surface of the tapered ring 22 comes to hold or press against the inner surface of the main positioning hole 16 formed in the work 15. The tapered protrusion 24*a* has a conical outer peripheral shape to uniformly press the inner surface of the tapered ring 22 radially outward. By outwardly expanding the diameter, the tapered ring 22 can eliminate the clearance between the main positioning hole 16 and the main positioning unit 20.

Figure 4A:
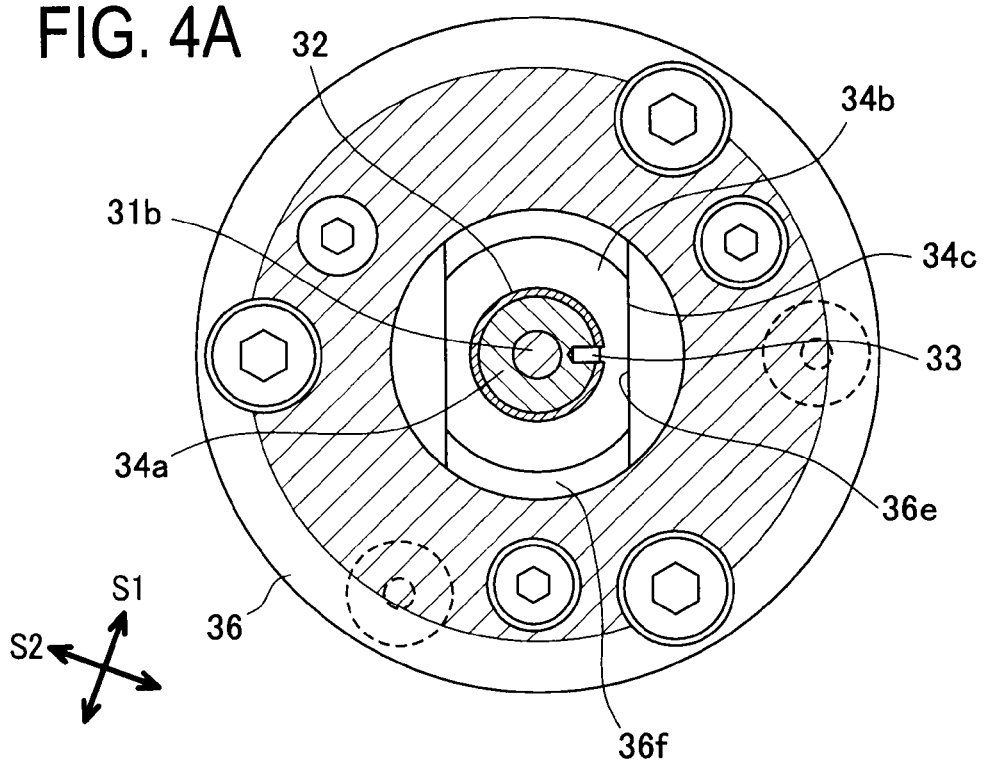
FIG. 4A is a sectional view of an auxiliary positioning unit 30 in the first embodiment, taken along a line D-E in FIG. 4B.
Figure 4B:
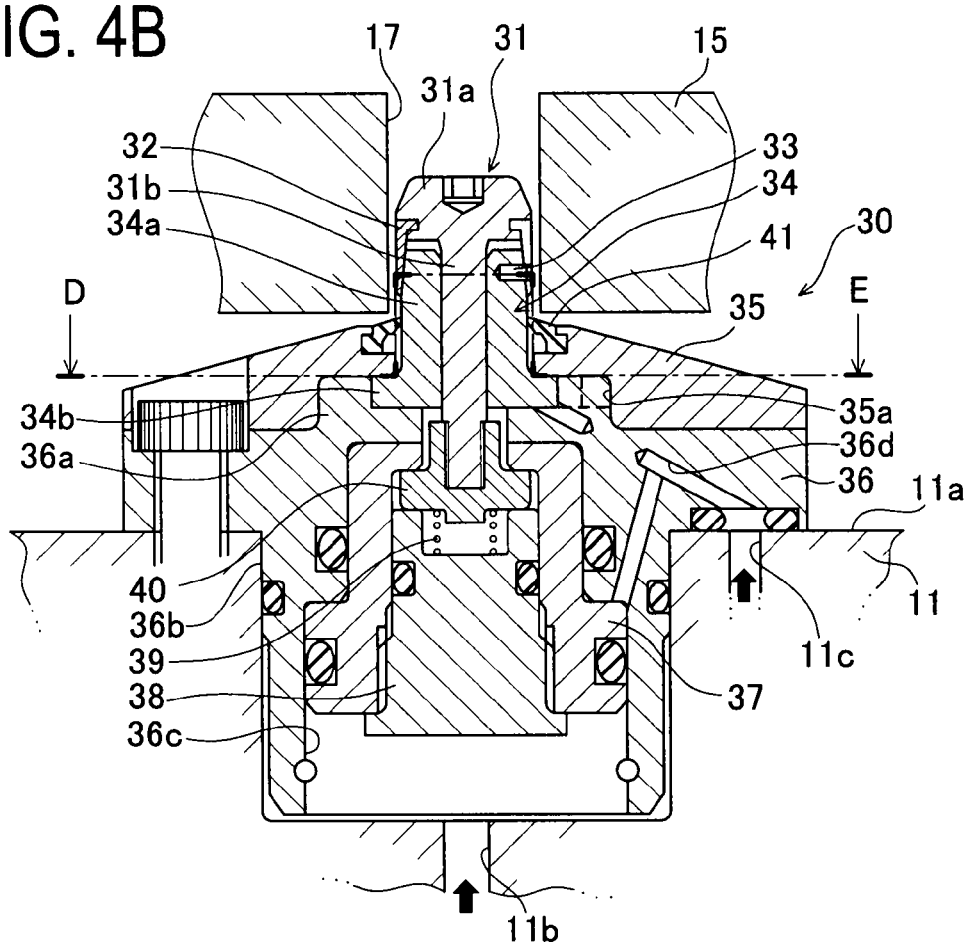
FIG. 4B is a sectional view of the auxiliary positioning unit 30 in the first embodiment, taken along a line B-B in FIG. 1.

FIG. 4A is a sectional view of the auxiliary positioning unit 30 taken along a line D-E in FIG. 4B. FIG. 4B is a sectional view of the auxiliary positioning unit 30 taken along the line B-B in FIG. 1.

The auxiliary positioning unit 30 includes an insert shaft 31, a tapered ring 32, a tapered protruding member 34, a base upper block 35, a base lower block 36, a piston 37, and others. The auxiliary positioning unit 30 has a similar structure to the main positioning unit 20; however, even the same parts or components are assigned different reference signs for distinction. The insert shaft 31 and the tapered ring 32 correspond to an auxiliary positioning insertion part.

The insert shaft 31 has almost the same shape as the insert shaft 21 and is constituted of a leading end part 31*a* and a shaft part 31*b*.

The tapered ring 32 has a similar function to the tapered ring 22 and is attached to the leading end part 31*a*.

The base upper block 35 and the base lower block 36 correspond to a base block member and correspond to a state where the base block 24 is split into separate components.

The base lower block 36 is formed with a base fitting part 36*b* which is fitted and positioned in a fitting hole formed in the reference block 11. A fitting protrusion 36*a* is fitted in a fitting recess 35*a* formed in the base upper block 35.

The base fitting part 36*b* of the base lower block 36 is internally formed with a cylindrical sliding surface 36*c* on which a piston 37 slides. An O-ring is provided in the outer periphery of the piston 37 for the purpose of sliding and sealing.

Furthermore, the fitting protrusion 36*a* of the base lower block 36 is formed with a holding groove 36*f* having two opposing slide holding surfaces 36*e*. The slide holding surfaces 36*e* correspond to a first smooth surface. These slide holding surfaces 36*e* are formed to be slidable with respect to sliding surfaces 34*c* of a sliding flange 34*b* of the tapered protruding member 34. The slide holding surfaces 36*e* are provided to be parallel with a center straight line CL.

The base lower block 36 is formed with an oil feed passage 36*d* into which the oil is supplied through the second supply passage 11*c*, applying oil pressure to the piston 37. Thus, the piston 37 is moved downward.

The tapered protruding member 34 is constituted of a tapered protrusion 34*a* and the sliding flange 34*b*. The tapered protruding member 34 held by being caught between the base upper block 35 and the base lower block 36 is a component corresponding to the tapered protrusion 24*a* of the base block 24.

The tapered protrusion 34*a* has an outer periphery tapered in a conical shape which contacts with the tapered ring 32 to expand or contract the diameter thereof. A pin 33 is placed in a portion of the outer peripheral surface of the tapered protrusion 34*a* in order to hold the tapered ring 32 against rotation. The sliding flange 34*b* is formed, on both side ends, with sliding surfaces 34*c* corresponding to a second smooth surface, which slides on the slid slide holding surfaces 36*e* of the base lower block 36. The sliding flange 34*b* corresponds to a sliding part.

The thickness of the sliding flange 34*b* is determined to be slightly thinner than the depth of the holding groove 36*f* formed in the fitting protrusion 36*a* of the base lower block 36 to allow the tapered protruding member 34 to smoothly slide. The holding groove 36f is connected to an air supply passage and is constantly purged to prevent dust or the like from entering. On an upper surface of the base upper block 35, a seal member 41 is provided to seal the outer periphery of the tapered protruding member 34.

The piston 37 is a component corresponding to the piston 25 but is threadedly connected to a piston plug 38 to hold a holding flange 40 engaged with the insert shaft 31. One end of a pressure spring 39 abuts on an upper surface of the piston plug 38 and the other end of the pressure spring 39 abuts on a lower surface of the holding flange 40. In the outer periphery of the piston plug 38, an O-ring is placed in a portion contacting with an inner surface of the piston 37 to prevent penetration of the oil supplied through the first oil feed passage 11b of the reference block 11.

The holding flange 40 is urged from below by the pressure spring 39 and pressed against a flange formed in the piston 37. Since a clearance is provided around the holding flange 40, the holding flange 40 can be moved in accordance with movement of the tapered protruding member 34.

When the auxiliary positioning unit 30 configured as above is supplied, as with the main positioning unit 20, with oil through the second supply passage 11c, applying oil pressure to the oil feed passage 36d, the piston 37 is moved downward from a position shown in FIG. 4B. The insert shaft 31 threadedly engaged in the holding flange 40 engaged with the piston 37 is moved downward in association with downward movement of the piston 37. As a result, the tapered ring 32 of the insert shaft 31 is expanded in diameter along the outer peripheral surface of the tapered protrusion 34a of the tapered protruding member 34.

Figure 5:
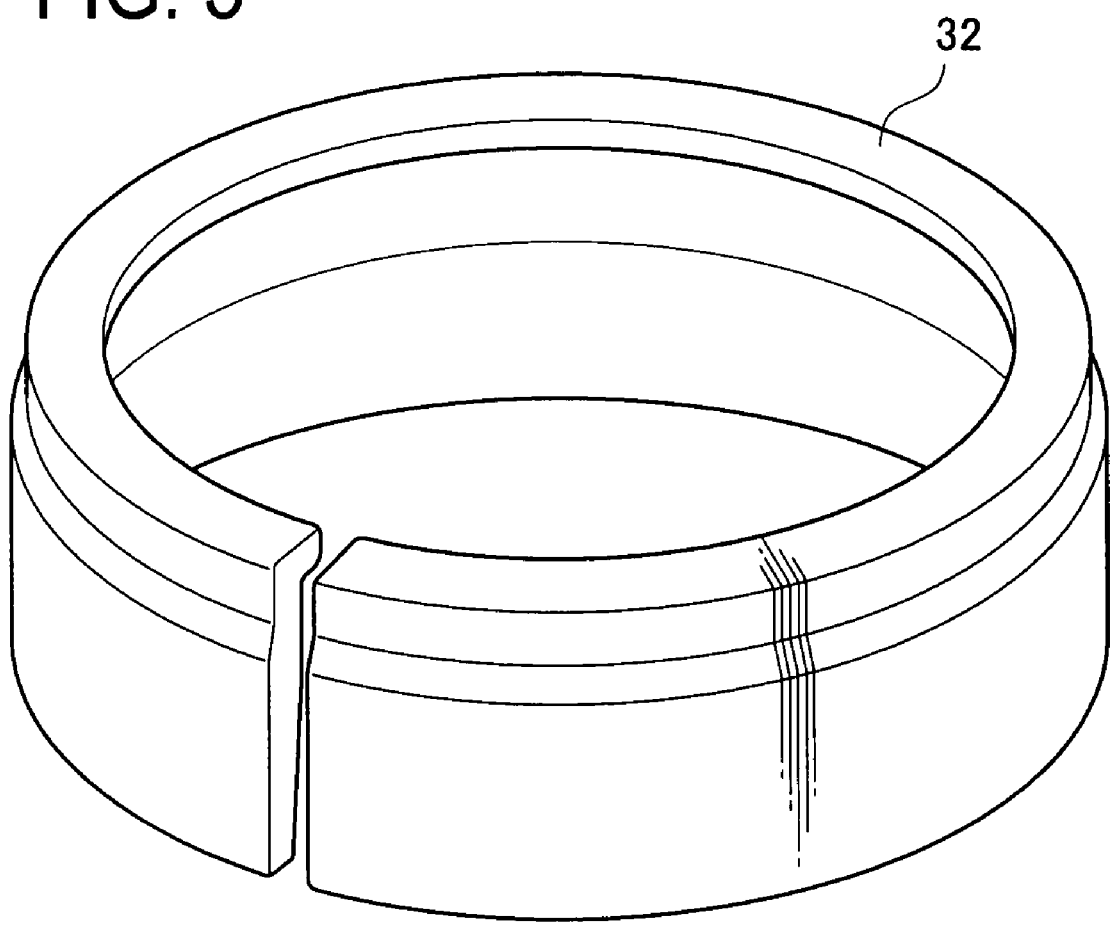
FIG. 5 is a stereographic perspective view of a tapered ring 32 in the first embodiment.

FIG. 5 is a stereographic perspective view of the tapered ring 32 in the first embodiment.

The tapered ring 32 that functions in the same manner as the tapered ring 22 is provided with a slit as shown in FIG. 5. Thus, the tapered ring 32 is expanded in diameter when the tapered protrusion 34a is inserted. When the tapered ring 22, 32 is expanded in diameter, the outer surface of the tapered ring 22, 32 holds the inner surface of the auxiliary positioning hole 17 formed in the work 15. The tapered protrusion 24a, 34a has a conical outer peripheral surface that uniformly presses the inner surface of the tapered ring 22, 32 outward. By outwardly expanding the diameter, the tapered ring 22, 32 can eliminate the clearance between the auxiliary positioning hole 17 and the auxiliary positioning unit 30.

Since the auxiliary positioning unit 30 is provided with the sliding surfaces 34c and the slide holding surfaces 36e, the tapered protruding member 34 serving as the auxiliary positioning insertion part of the auxiliary positioning unit 30 can be moved in parallel toward the main positioning unit 20.

The positioning device 10 in the first embodiment configured as above can provide the following operations and effects.

Figure 6:
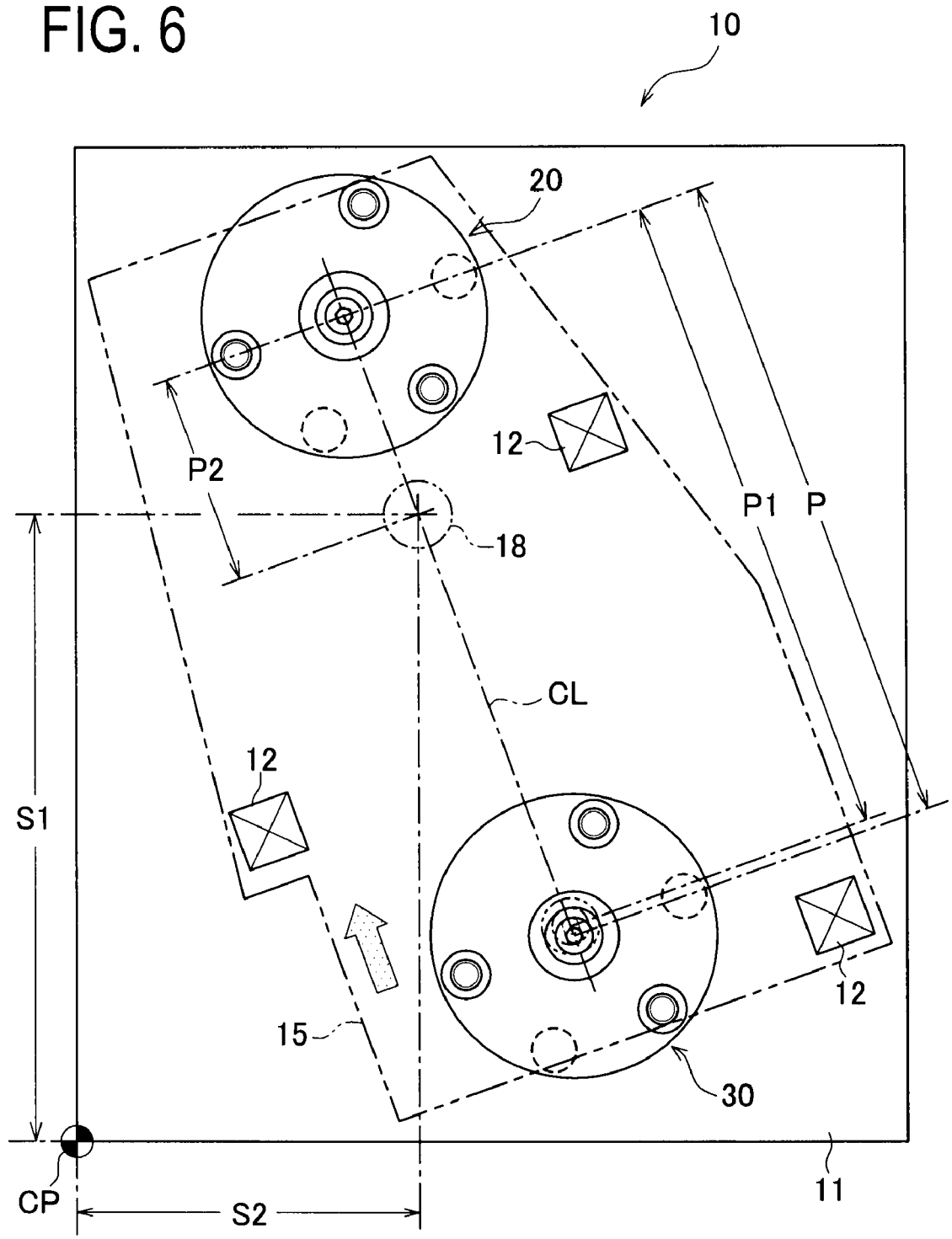
FIG. 6 schematically shows a state where a work 15 formed with holes at a deviated hole-to-hole pitch P is mounted in the positioning device 10 in the first embodiment.

FIG. 6 schematically shows a state in which the work 15 formed with holes at a deviated hole-to-hole pitch P is mounted in the positioning device 10. FIG. 6 corresponds to FIG. 1.

The auxiliary positioning unit 30 is provided with the tapered protruding member 34 that can slide in parallel with the slide holding surfaces 36e of the holding groove 36f. Accordingly, in the case where the work 15 to be mounted on the positioning device 10 has a deviated hole-to-hole pitch P, the leading end of the auxiliary positioning unit 30 to be inserted into the auxiliary positioning hole 17 of the work 15 is moved toward the main positioning unit 20.

At that time, movement in a direction perpendicular to the center straight line CL is restricted because the sliding surfaces 34c and the slide holding surfaces 36e are parallel with the center straight line CL.

By movement of the leading end of the auxiliary positioning unit 30, the reference pitch P1 defined as the distance between the center of the main positioning unit 20 and the center of the auxiliary positioning unit 30 which is not yet moved becomes equal to the hole-to-hole pitch P which is the distance between the center of the main positioning hole 16 and the auxiliary positioning hole 17.

In the case where the main positioning unit 20 and the auxiliary positioning unit 30 are fixed knock pins respectively, conventionally, a round pin is used as a positioning pin in the main positioning unit 20 and a diamond-shaped pin is used as a positioning pin in the auxiliary positioning unit 30.

In this case, when a pitch error occurs by the hole-to-hole pitch P longer or shorter than the reference pitch P1, an error also occurs in position of a machined hole 18 to in the work 15.

This is because the position of the machined hole 18 is deviated from a machining origin CP. In other words, if the distance from the machining origin CP is divided into a S1 component and a S2 component as shown in FIG. 6, the conventional methods cause a change in this distance. This is shown in FIGS. 7 and 8.

Figure 7:
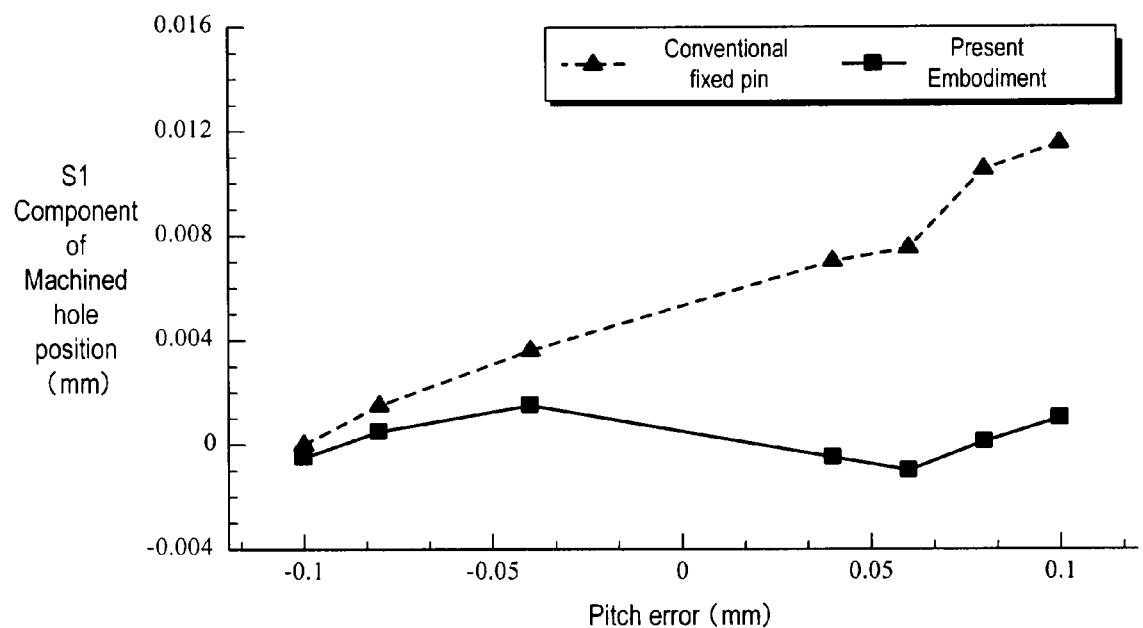
FIG. 7 is a graph showing comparison of pitch errors of machined holes in a direction S1 in the first embodiment.
Figure 8:
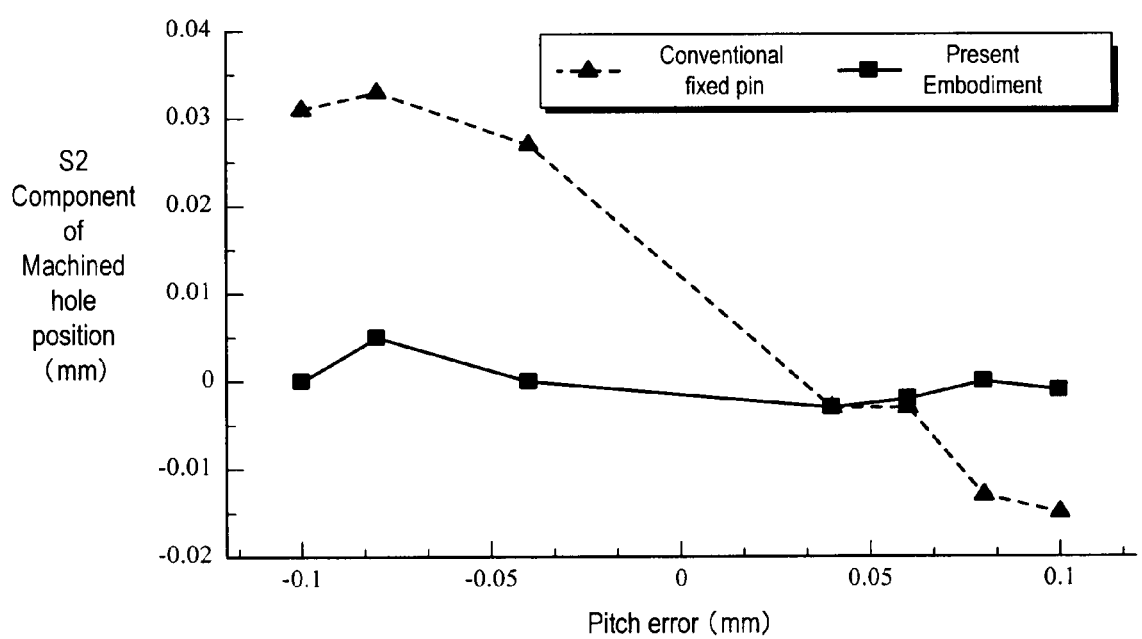
FIG. 8 is a graph showing comparison of pitch errors of machined holes in a direction S2 in the first embodiment.

FIG. 7 shows comparison of pitch errors in a S1 component between machined holes. FIG. 8 shows comparison of pitch errors in a S2 component between the machined holes.

A lateral axis indicates the pitch error. The pitch error was provided by intentionally changing the hole-to-hole pitches P in the works 15. A vertical axis indicates a change in position of a machined hole. FIG. 7 shows the S1 component and FIG. 8 shows the S2 component. It is to be noted that the numerals in the vertical axis represent deviation from a reference value.

A solid line shows data in the case of using the positioning device 10 in the first embodiment and is referred to as "Present embodiment". A broken line shows data in the case of positioning by use of a conventional fixed pin in which the reference pitch P1 is fixed, which is referred to as "Conventional fixed pin". In the "Conventional fixed pin" case, the positions of the machined holes 18 in the works 15 result in that the S1 components are larger and the S2 components are smaller as the hole-to-hole pitches P are longer as shown in FIGS. 7 and 8. Specifically, it is shown that rotational deviation occurs in a direction θ from the straight line passing the main positioning unit 20 and the auxiliary positioning unit 30.

In the "Present embodiment" case, on the other hand, the positions of the machined holes 18 in the works 15 result in almost approximate values to the reference value even though slight variations are found.

Specifically, FIGS. 7 and 8 show that high precise machining can be achieved when positioning of the work 15 is performed by the positioning device 10 in the first embodiment.

A machined hole 18 in the work 15 is designed with reference to the main positioning hole 16. The auxiliary positioning unit 30 can restrict deviation in the direction θ relative to the main positioning unit 20 of the positioning device 10. Accordingly, the hole 18 can be machined in the work 15 with high accuracy.

The main positioning hole 16 and the auxiliary positioning hole 17 in the work 15 are formed in a process prior to machining of the hole 18. If the hole-to-hole pitch P between the main positioning hole 16 and the auxiliary positioning hole 17 is provided accurately, it also may affect the machining accuracy of the machined hole 18. The positioning device 10 in the first embodiment can absorb the pitch error of such hole-to-hole pitch P and therefore ensure the machining accuracy of the machined hole 18 in the work 15 even when the hole-to-hole pitches P are different.

Furthermore, in the positioning device 10, because of its structure, a burden will be imposed on the main positioning unit 20 and the auxiliary positioning unit 30. They do not receive the entire weight of the work 15 because the work 15 is held by the reference seats 12 in the Z-axis direction. However, they support part of the work 15 and receive a force generated by a processing machine during machining of the hole 18.

From such reasons, the main positioning unit 20 and the auxiliary positioning unit 30 of the positioning device 10 need to have a fixed degree of rigidity. Low rigidity will result in a short life of the positioning device 10. Thus, the rigidity is preferably designed to be as high as possible.

To enhance the positioning accuracy, on the other hand, the main positioning unit 20 and the auxiliary positioning unit 30 include an expanding and contracting function. This is performed by applying oil pressure to the pistons 25 and 37 to cause the tapered protrusion 24a of the base block 24 and the tapered protrusion 34a of the tapered protruding member 34 to expand or contract the tapered rings 22 and 32, thereby holding or pressing against the inner surfaces of the main positioning hole 16 and auxiliary positioning hole 17 in the work 15. This can eliminate the clearance between the pin and the hole and hence improve positioning accuracy.

Because of such expanding and contracting function, the main positioning unit 20 and the auxiliary positioning unit 30 are complicated in structure. Furthermore, the auxiliary positioning unit 30 includes a function that moves in parallel toward the main positioning unit 20.

As shown in Patent Literature 5, in the case where this function is given to the pin, the internal structure of the auxiliary positioning unit 30 is complicated, resulting in an increase in the number of parts, leading to low rigidity. Thus, the outer diameter of the pin has to be increased.

However, in the first embodiment, the sliding flange 34b is located below the tapered ring 32. The sliding flange 34b can be designed to have a larger diameter than the tapered protrusion 34a, providing wide sliding surfaces 34c. This can enhance the rigidity. The auxiliary positioning unit 30 inserted into the auxiliary positioning hole 17 can be moved in parallel without decreasing the rigidity of the leading end part of the unit 30.

Consequently, it is possible to achieve a reduced diameter of a portion of the auxiliary positioning unit 30 to be inserted into the auxiliary positioning hole 17. Thus, the main positioning hole 16 and the auxiliary positioning hole 17 can be formed as knock holes having a small diameter such as 6 mm and 8 mm.

As explained above, the first embodiment can provide the following configurations, operations, and effects.

(1-1) In the positioning method of the work 15, corresponding to the invention described in (1), to determine the position of the work 15 by inserting the main positioning unit 20 and the auxiliary positioning unit 30 placed on the reference plane 11a into the main positioning hole 16 and the auxiliary positioning hole 17 formed in the work 15, the main positioning unit 20 includes the insert shaft 21 and the tapered ring 22 each having a circular outer periphery to be inserted into the main positioning hole 16, the auxiliary positioning unit 30 includes the base lower block 36 formed with at least two opposing holding surfaces 36e parallel with the center straight line CL joining the main positioning unit 20 and the auxiliary positioning unit 30, the sliding flange 34b having the sliding surfaces 34c that are formed in parallel with the center straight line CL and in correspondence with the slide holding surfaces 36e of the base lower block 36, and the insert shaft 31 and the tapered ring 32 that have the circular outer peripheral shape and are placed above the sliding flange 34b, the insert shaft 31 and the tapered ring 32 being to be inserted into the auxiliary positioning hole 17. When the work 15 is to be positioned, the insert shaft 21 and the tapered ring 22 of the main positioning unit 20 are inserted into the main positioning hole 16 and also the sliding flange 34b of the auxiliary positioning unit 30 is guided by the slide holding surfaces 36e to move on the center straight line CL, thereby absorbing a pitch error between the main positioning hole 16 and the auxiliary positioning hole 17, so that the insert shaft 31 and the tapered ring 32 are inserted into the auxiliary positioning hole 17.

Accordingly, the auxiliary positioning unit 30 can be moved on the center straight line CL joining the auxiliary positioning unit 30 and the main positioning unit 20. It is possible to absorb the pitch error of the hole-to-hole P between the main positioning hole 16 and the auxiliary positioning hole 17 of the work 15 without imposing an unnecessary burden on the main positioning unit 20.

Furthermore, an auxiliary positioning insertion part of the auxiliary positioning unit 30 internally includes no sliding mechanism and therefore can have a simple internal structure. Thus, the insertion part with a small diameter can be realized while maintaining rigidity.

(1-2) In the positioning method of the work 15 described in (1-1), corresponding to the invention described in (2), the auxiliary positioning unit 30 includes the tapered ring 32 which will contact with the inner surface of the auxiliary positioning hole 17 and the tapered protruding member 34 including the tapered protrusion 34a having the outer peripheral surface contacting the tapered ring 32. While the insert shaft 31 and the tapered ring 32 are inserted in the auxiliary positioning hole 17 of the work 15, the tapered protruding member 34 or the tapered ring 32 is moved in parallel in the axis direction of the auxiliary positioning unit 30. Since the tapered ring 32 contacts with and presses against the inner surface of the auxiliary positioning hole 17, the auxiliary positioning unit 30 can additionally have the inner-diameter holding function for the auxiliary positioning hole 17.

The main positioning unit 20 and the auxiliary positioning unit 30 are additionally provided with the inner-diameter holding function with respect to respective positioning holes, so that positioning accuracy can be enhanced.

Usually, a positioning hole is provided with a clearance by increasing a gap from a positioning pin in order to achieve good workability. Accordingly, even a hole having a diameter of about 10 mm is provided with a clearance of about several tens of micrometers. This clearance makes it easy to insert/remove the positioning pin with respect to the positioning hole formed in the work 15.

(1-3) In the work positioning method described in (1-1), corresponding to the invention described in (6), the air supply passage is connected to the sliding part, thereby preventing foreign substances from entering between the slide holding surface 36e and the sliding surface 34c. Constant supply of air through the air supply passage makes it possible to prevent rusts or oil from entering between the slid slide holding surface 36e and the sliding surface 34c. In the case where the surfaces slide on one another, it is conceivable that foreign substances having entered are caught in, and hence the positioning device 10 cannot be moved smoothly. However, such situation can be avoided by air supply.

(1-4) In the positioning device 10 of the work 15, corresponding to the invention described in (7), to determine the position of the work 15 by inserting the main positioning unit 20 and the auxiliary positioning unit 30 placed on the reference plane 11a into the main positioning hole 16 and the auxiliary positioning hole 17 formed in the work 15, the main positioning unit 20 includes the insert shaft member 21 and the tapered ring 22 which have the circular outer periphery to be inserted into the main positioning hole 16, the auxiliary positioning means 30 includes the base lower block 36 formed with at least two slide holding surfaces 36e opposing each other and parallel with the center straight line CL joining the main positioning means 20 and the auxiliary positioning means 30, the sliding flange 34b having the sliding surfaces 34c formed in parallel and in correspondence with the slide holding surfaces 36e of the base lower block 36, and the insert shaft 31 and the tapered ring 32 which are placed above the sliding flange 34b and have the circular outer peripheral shape to be inserted into the auxiliary positioning hole 17. Accordingly, the positioning device 10 having the same effects as the positioning method described in (1-1) can be provided.

(1-5) In the positioning device 10 of the work 15 described in (1-4), corresponding to the invention described in (8), the auxiliary positioning unit 30 includes the tapered ring 32 which will contact with the inner surface of the auxiliary positioning hole 17 and the tapered protruding member 34 including the tapered protrusion 34a having the outer peripheral surface contacting with the tapered ring 32. While the insert shaft 31 and the tapered ring 32 are inserted into the auxiliary positioning hole 17 of the work 15, the tapered protruding member 34 or the tapered ring 32 is moved in parallel in the axis direction of the auxiliary positioning unit 30, so that the tapered ring 32 comes into contact with and presses against the inner surface of the auxiliary positioning hole 17. Thus, the positioning device 10 can be provided with the same effects as the positioning device described in (1-2).

(1-6) In the work positioning device 10 described in (1-4), corresponding to the invention described in (13), the air supply passage is connected to the sliding part 11 to prevent foreign substances from entering between the slide holding surface 36e and the sliding surface 34c. Thus, the positioning device 10 having the same effects as the positioning unit described in (1-3) can be provided.

Second Embodiment

Next, the configuration of a second embodiment will be described.

A positioning device 10 in the second embodiment has the same configuration as that in the first embodiment, except that the internal structures of the main positioning unit 20 and the auxiliary positioning unit 30 are different from those of the positioning unit 10 in the first embodiment.

Therefore, the following explanation is given to the main positioning unit 20 and the auxiliary positioning unit 30. The main positioning unit 20 is first explained.

Figure 9A:
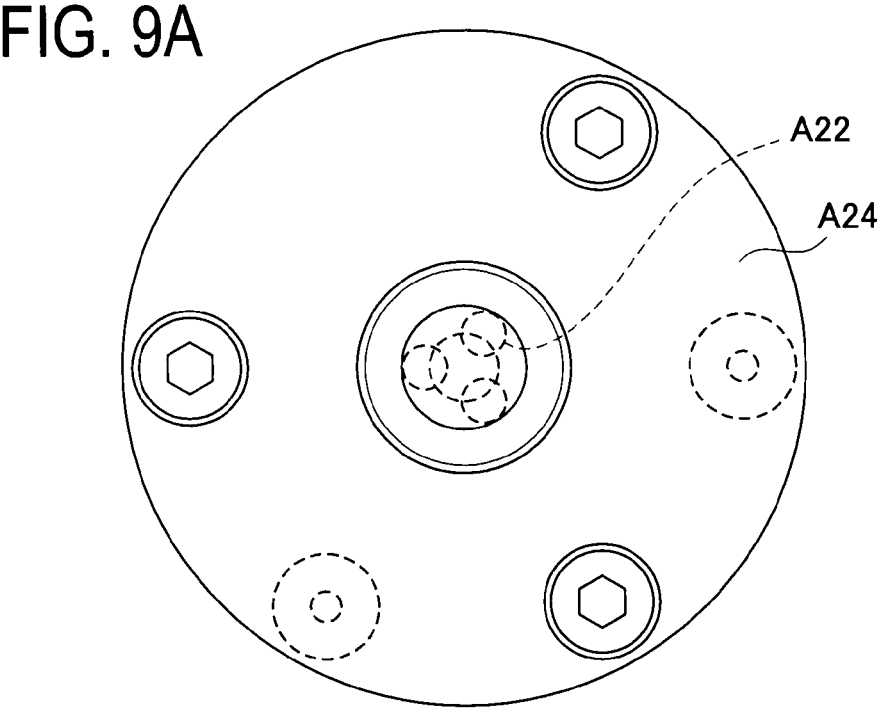
FIG. 9A is a top view of a main positioning unit 20 in a second embodiment.
Figure 9B:
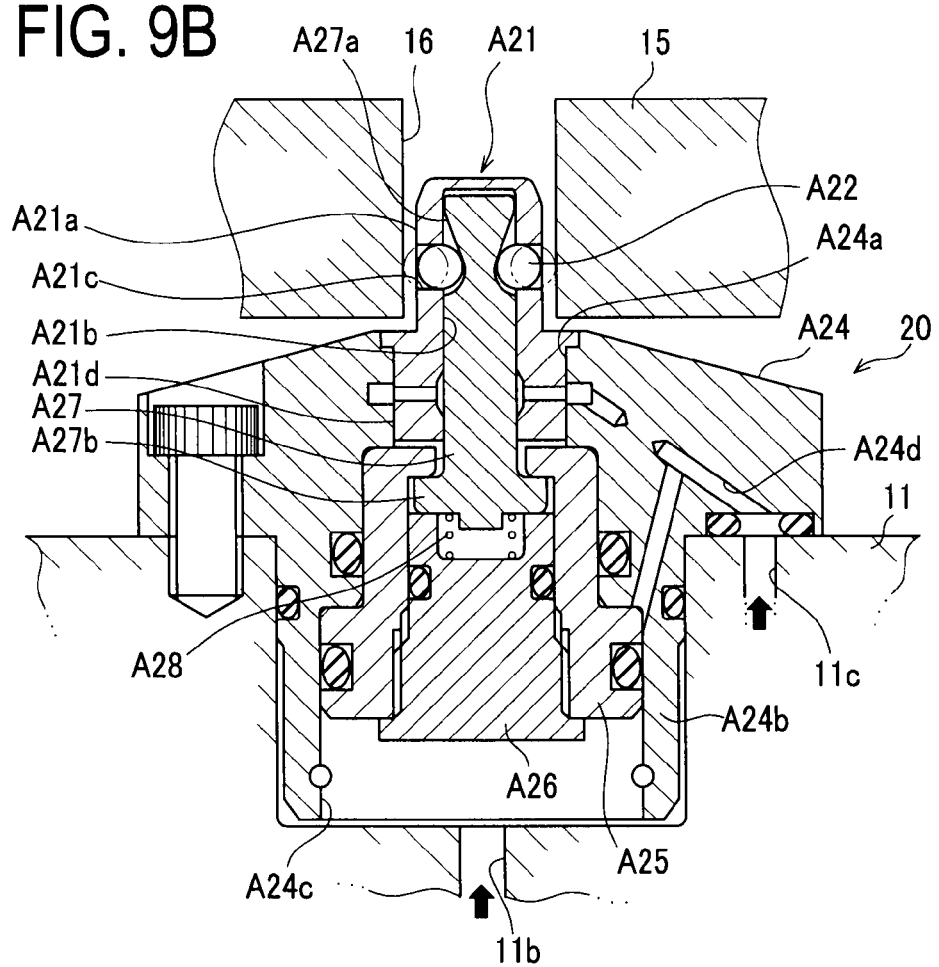
FIG. 9B is a sectional view of the main positioning unit 20 in the second embodiment, corresponding to a view taken along the line A-A in FIG. 1.

FIG. 9A is a top view of the main positioning unit 20 in the second embodiment. FIG. 9B is a sectional view of the main positioning unit 20 corresponding to a view taken along the line A-A in FIG. 1.

The main positioning unit 20 includes an insert cap member A21, inner-diameter holding balls A22, a base block A24, a piston A25, a tapered shaft A27, and others. Of them, the insert cap member A21 corresponds to the main positioning insertion part.

The insert cap member A21 is formed in a cylindrical shape and provided with a shaft hole A21b internally holding the tapered shaft A27. A cap leading part A21a is a portion to be inserted into the main positioning hole 16 of the work 15 and is provided with ball holes A21c at three positions in each of which an inner-diameter holding ball A22 is movable. In the second embodiment, the ball holes A21c are arranged at 120° intervals. The insert cap member A21 is held in the base block A24 through a fitting part A21d.

The inner-diameter holding balls A22 are components which will contact with the inner wall surface of the main positioning hole 16 of the work 15 and move in a radial direction of the insert cap member A21 in association with upward/downward movement of the tapered shaft A27.

The base block A24 fixes the main positioning unit 20 to the reference block 11 and is positioned in place by a base fitting part A24b inserted into a fitting hole formed in the reference block 11. The fitting hole A24a is a hole for holding the fitting part A21d of the insert cap member A21 and is positioned in a height direction by a flange provided at an upper portion of the fitting part A21d. The fitting hole A24a is also formed with a groove which receives the flange of the fitting part A21d.

The base fitting part A24b of the base block A24 is internally formed with a cylindrical sliding surface A24c on which the piston A25 slides. In the outer periphery of the piston A25, an O-ring is placed for the purpose of sliding and sealing.

The piston A25 is threadedly connected to a piston plug A26. One end of a pressure spring A28 abuts on an upper surface of the piston plug A26 and the other end of the pressure spring A28 abuts on a lower surface of the tapered shaft A27. An O-ring is placed in the outer periphery of the piston plug A26 at a portion contacting with the inner surface of the piston A25 to prevent entry of the oil supplied through the first oil feed passage 11b of the reference block 11.

The tapered shaft A27 includes tapered grooves A27a and a flange A27b. Each tapered groove A27a is formed to be gradually deeper in a radial direction from above. In FIG. 9B, the inner-diameter holding balls A22 are illustrated at two, right and left positions. Actually, as shown in FIG. 9A, the number of the inner-diameter holding balls A22 is three and thus the tapered grooves A27a are formed at 120° intervals. The positions of the tapered grooves A27a are determined at the same angles as the ball holes A21c.

The flange A27b is formed to be hooked on a flange formed in the piston A25 and is pressed from below by the pressure spring A28 to move the tapered shaft A27 in sync with the piston A25.

The main positioning unit 20 configured as above is operated as below.

When oil is supplied to the oil feed passage A24d formed in the base block A24 through the second supply passage 11c formed in the reference block 11, the piston A25 is moved downward by oil pressure. On the other hand, the piston A25 is moved upward when oil is supplied to the first oil feed passage 11b formed in the reference block 11 to apply oil pressure to the bottom of the piston A25.

In the case where the tapered shaft A27 is moved upward, accordingly, the inner-diameter holding balls A22 come out of contact with the tapered grooves A27a of the tapered shaft A27, thus creating a space to allow the balls A22 to retreat in the radial direction in the ball holes A21c.

In the case where the oil pressure is applied to the oil feed passage A24d, moving the tapered shaft A27 downward, the inner-diameter holding balls A22 move outward to press against the inner surface of the main positioning hole 16 of the work 15.

This makes it possible to eliminate the clearance between the main positioning hole 16 and the insert part of the main positioning unit 20. The following explanation is given to the auxiliary positioning unit 30.

Figure 10A:
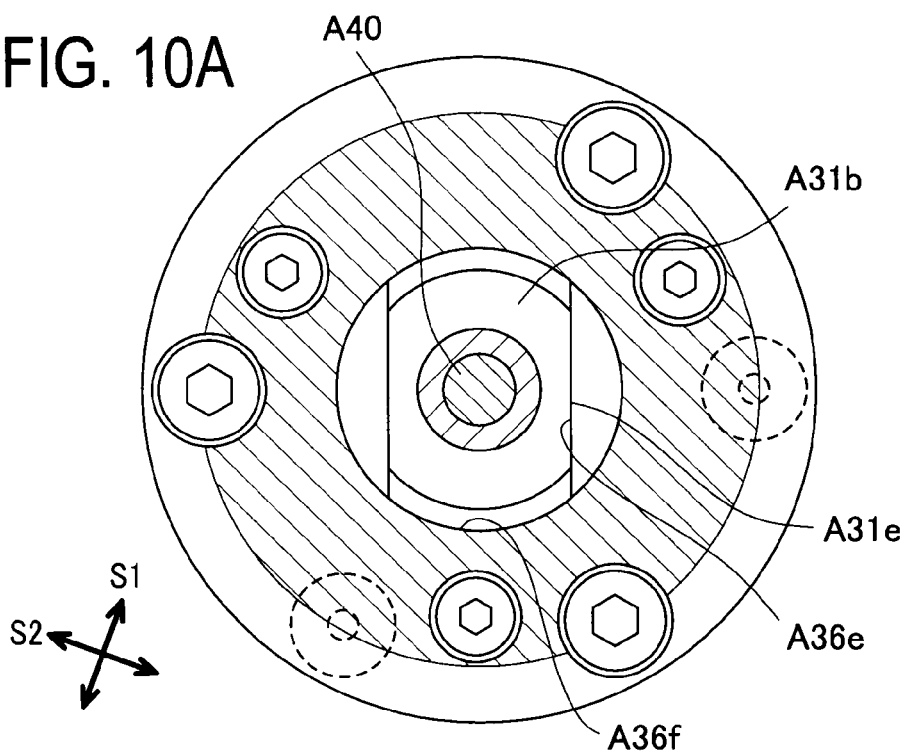
FIG. 10A is a sectional view of an auxiliary positioning unit 30 in the second embodiment, taken along a line F-F in FIG. 10B.
Figure 10B:
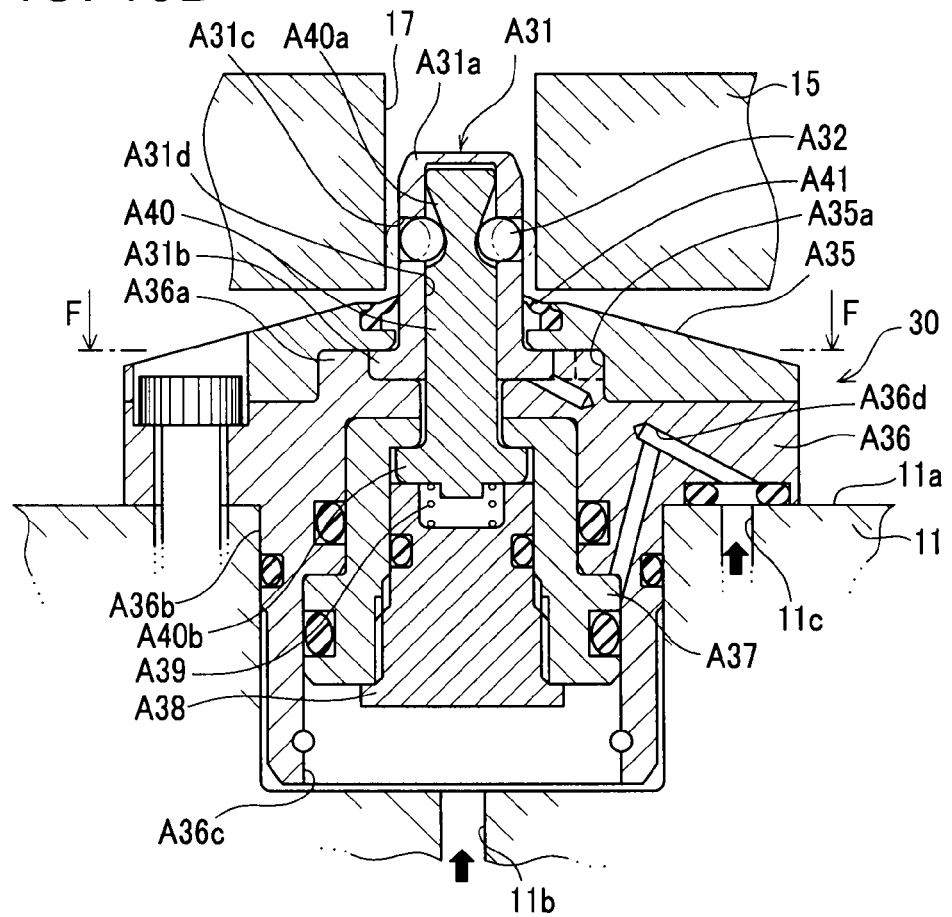
FIG. 10B is a sectional view of the auxiliary positioning unit 30 in the second embodiment, corresponding to a view taken along the line B-B in FIG. 1.

FIG. 10A is a sectional view of the auxiliary positioning unit 30 in the second embodiment, taken along a line F-F in FIG. 10B. FIG. 10B is a sectional view of the auxiliary positioning unit 30, corresponding to a view taken along the line B-B in FIG. 1.

The auxiliary positioning unit 30 includes an insert cap member A31, inner-diameter holding balls A32, a base upper block A35, a base lower block A36, a piston A37, and others.

The insert cap member A31 corresponds to the auxiliary positioning insert part and is formed in a circular shape. Furthermore, the insert cap member A31 is internally formed with a shaft hole A31d that holds a tapered shaft A40.

A cap leading part A31a is a portion to be inserted into the auxiliary positioning hole 17 of the work 15 and is formed with ball holes A31c at three positions in each of which the inner-diameter holding ball A32 is movable. The insert cap member A31 is provided, at its lower end, with a flange A31b which is held between the base upper block A35 and the base lower block A36.

The flange A31b is formed, at both side ends, with sliding surfaces A31e which slides on the corresponding slide holding surface A36e of the base lower block A36.

The thickness of the flange A31b is determined to be slightly thinner than the depth of the holding groove A36f formed in a fitting protrusion A36a of the base lower block A36 to allow the flange A31b to smoothly slide. The holding groove A36f is connected to an air supply passage and is constantly purged to prevent dust or the like from entering. On an upper surface of the base upper block A35, a seal member A41 is provided to seal the outer periphery of the insert cap member A31.

The inner-diameter holding balls A32 are components which will contact with the inner wall surface of the auxiliary positioning hole 17 of the work 15 and move in a radial direction of the insert cap member A31 in association with upward/downward movement of the tapered shaft A40. The inner-diameter holding balls A32 correspond to the inner-diameter holding member.

The base upper block A35 and the base lower block A36 are components corresponding to a base block member.

The base upper block A35 is formed with a fitting recess A35a and the base lower block A36 is formed with a fitting protrusion A36a. The fitting protrusion A36a is fitted in the fitting recess A35a for fitting positioning.

The base lower block A36 is formed with a base fitting part A36b which is inserted and positioned in a fitting hole formed in the reference block 11. The base fitting part A36b is internally formed with a cylindrical sliding surface A36c on which the piston A37 slides. In the outer periphery of the piston A37, an O-ring is placed for the purpose of sliding and sealing.

Furthermore, the fitting protrusion A36a formed in the upper portion of the base lower block A36 is formed with a holding groove A36f having two opposing slide holding surfaces A36e. The slide holding surfaces A36e correspond to a first smooth surface and are formed in parallel with the center straight line CL joining respective centers of the main positioning unit 20 and the auxiliary positioning unit 30.

The base lower block A36 is formed with an oil feed passage A36d. When oil is supplied to the oil feed passage A36d through the second oil feed passage 11c of the reference block 11, applying oil pressure to the piston A37, the piston A37 is moved downward. On the other hand, the piston A37 is moved upward when oil is supplied to the first oil feed passage 11b.

The flange A31b of the insert cap member A31 is placed in the holding groove A36f of the base lower block A36 and is fixed from above by the base upper block A35, so that the flange A31b of the insert cap member A31 can be held between the base upper block A35 and the base lower block A36.

The piston A37 is threadedly connected to a piston plug A38. One end of a pressure spring A39 abuts on an upper surface of the piston plug A38 and the other end of the pressure spring abuts on a lower surface of the tapered shaft A40. An O-ring is placed in a portion of the outer periphery of the piston plug A38 contacting with an inner surface of the piston A37 to prevent entry of the oil supplied through the first oil feed passage 11b of the reference block 11.

The tapered shaft A40 corresponds to a diameter adjusting part and includes a tapered groove A40a and a flange A40b. The tapered groove A40a is formed to be gradually deeper in a radial direction from above. In FIG. 10B, the inner-diameter holding balls A32 are illustrated at two, right and left positions. Actually, as shown in FIG. 10A, the number of the inner-diameter holding balls A32 is three and thus the tapered grooves A40a are formed at 120° intervals.

The flange A40b is formed to be hooked on a flange formed in the piston A37 and is pressed from below by the pressure spring A39 to move the tapered shaft A40 in sync with the piston A37.

A clearance is provided around the flange A40b of the tapered shaft A40 to allow the tapered shaft A40 to horizontally move. Accordingly, the tapered shaft A40 can be moved in accordance with movement of the insert cap member A31.

When the auxiliary positioning unit 30 configured as above is supplied with oil through the second supply passage 11c of the reference block 11, as with the main positioning unit 20, applying oil pressure to the oil feed passage A36d of the base lower block A36, the piston A37 is moved downward. On the other hand, when oil is supplied to the first oil feed passage 11b, applying oil pressure to the bottoms of the piston A37 and piston plug A38, the piston A37 is moved upward. As above, the tapered shaft A40 is moved downward or upward, thereby allowing the inner-diameter holding balls A32 to move in the ball holes A31c in a radial direction to come into or out of contact with the tapered grooves A40a of the tapered shaft A40.

In the case where oil pressure is applied to the oil feed passage A36d, moving the tapered shaft A40 downward, the inner-diameter holding balls A32 are moved radially outward, thus pressing against the inner surface of the auxiliary positioning hole 17 of the work 15.

Accordingly, this makes it possible to eliminate the clearance between the auxiliary positioning hole 17 and the auxiliary positioning unit 30. By such expanding and contracting operation of the auxiliary positioning unit 30, high accurate positioning of the work 15 can be achieved.

Since the auxiliary positioning unit 30 includes the sliding surfaces A31e and the slide holding surfaces A36e, the tapered protruding member A34 serving as the auxiliary positioning insertion part of the auxiliary positioning unit 30 is movable in parallel toward the main positioning unit 20.

The positioning device 10 in the second embodiment configured as above can provide the following operations and effects.

Basically, the effects of the second embodiment are the same as those of the first embodiment. By using the positioning device 10 of the second embodiment, the work 15 can accurately be positioned in place relative to the main positioning unit 20. This is because the auxiliary positioning unit 30 is adjusted along the center straight line CL, thereby correcting the deviation in the θ direction.

When the hole 18 to be machined in the work 15 is designed with reference to the main positioning hole 16, the deviation in the θ direction can be restricted by the auxiliary positioning unit 30 with reference to the main positioning unit 20 of the positioning device 10, so that the hole 18 can be machined in the work 15.

The second embodiment as explained above can provide the following configurations, operations, and effects.

(2-1) In the positioning method of the work 15, corresponding to the invention described in (1), to determine the position of the work 15 by inserting the main positioning unit 20 and the auxiliary positioning unit 30 placed on the reference plane 11a into the main positioning hole 16 and the auxiliary positioning hole 17 formed in the work 15, the main positioning unit 20 includes the insert cap member A21 having a circular outer peripheral shape to be inserted into the main positioning hole 16, the auxiliary positioning unit 30 includes the base lower block A36 formed with at least two opposing holding surfaces A36e parallel with the center straight line CL joining the main positioning unit 20 and the auxiliary positioning unit 30, the flange A31b having the sliding surfaces A31e that are formed in parallel with the center straight line CL and in correspondence with the slide holding surfaces A36e of the base lower block A36, and the insert cap member A31 which has the circular outer periphery as an upper part of the flange A31b and will be inserted into the auxiliary positioning hole 17. When the work 15 is to be positioned, the insert cap member A21 of the main positioning unit 20 is inserted into the main positioning hole 16 and the flange A31b of the auxiliary positioning unit 30 is guided by the slide holding surfaces A36e to move on the center straight line CL, thereby absorbing a pitch error between the main positioning hole 16 and the auxiliary positioning hole 17, so that the insert cap member A31 is inserted into the auxiliary positioning hole 17.

Accordingly, the auxiliary positioning unit 30 can be moved on the center straight line CL joining the auxiliary positioning unit 30 and the main positioning unit 20. It is possible to absorb the pitch error of the hole-to-hole P between the main positioning hole 16 and the auxiliary positioning hole 17 of the work 15 without imposing an unnecessary burden on the main positioning unit 20.

Furthermore, an auxiliary positioning insertion part of the auxiliary positioning unit 30 internally includes no sliding mechanism and therefore can have a simple internal structure. Thus, the insertion part with a small diameter can be realized while maintaining rigidity.

(2-2) In the positioning method of the work 15 described in (2-1), corresponding to the invention described in (2), the auxiliary positioning unit 30 includes the inner-diameter holding balls A32 which will contact with the inner surface of the auxiliary positioning hole 17 and the tapered shaft A40 having the outer peripheral surface formed with the tapered grooves A40a which contact with the inner-diameter holding balls A32. While the insert cap member A31 is inserted in the auxiliary positioning hole 17 of the work 15, the tapered shaft A40 is moved in parallel in the axis direction of the auxiliary positioning unit 30, thereby causing the inner-diameter holding balls A32 to contact with and press against the inner surface of the auxiliary positioning hole 17. Thus, the auxiliary positioning unit 30 can additionally have the inner-diameter holding function for the auxiliary positioning hole 17.

The main positioning unit 20 and the auxiliary positioning unit 30 are additionally provided with the inner-diameter holding function with respect to respective positioning holes, so that positioning accuracy can be enhanced.

Usually, a positioning hole is provided with a clearance by increasing a gap from a positioning pin in order to achieve good workability. Accordingly, even a hole having a diameter of about 10 mm is provided with a clearance of about several tens of micrometers. This clearance makes it easy to insert/eliminate the positioning pin with respect to the positioning hole formed in the work 15.

(2-3) In the work positioning method described in (2-2), corresponding to the invention described in (4), the inner-diameter holding balls A32 contact with the inner surface of the auxiliary positioning hole 17 at three points or more. This makes it possible to align the center axis of the auxiliary positioning hole 17 to the center axis of the tapered shaft A40 and thus the inner-diameter holding balls A32 can be accurately positioned with respect to the inner surface of the auxiliary positioning hole 17.

(2-4) In the positioning device 10 of the work 15, corresponding to the invention described in (8), to determine the position of the work 15 by inserting the main positioning unit 20 and the auxiliary positioning unit 30 placed on the reference plane 11a into the main positioning hole 16 and the auxiliary positioning hole 17 formed in the work 15, the main positioning unit 20 includes the insert cap member A21 having the circular outer peripheral shape to be inserted into the main positioning hole 16, the auxiliary positioning unit 30 includes the base lower block A36 formed with at least two opposing holding surfaces A36e parallel with the center straight line CL joining the main positioning unit 20 and the auxiliary positioning unit 30, the flange A31b having the sliding surfaces A31e that are formed in parallel with the center straight line CL and in correspondence with the slide holding surfaces A36e of the base lower block A36, and the insert cap member A31 which has the circular outer peripheral shape as an upper part of the flange A31b and will be inserted into the auxiliary positioning hole 17. Consequently, the positioning device 10 providing the same effects as the positioning method described in (2-1) can be provided.

(2-5) In the positioning device 10 of the work 15 described in (2-4), corresponding to the invention described in (9), the auxiliary positioning unit 30 includes the inner-diameter holding balls A32 which will contact with the inner surface of the auxiliary positioning hole 17 and the tapered shaft A40 having the outer surface formed with the tapered grooves A40a which contact with the inner-diameter holding balls A32. While the insert cap member A31 is inserted in the auxiliary positioning hole 17 of the work 15, the tapered shaft A40 is moved in parallel in the axis direction of the auxiliary positioning unit 30, thereby causing the inner-diameter holding balls A32 to contact with and press against the inner surface of the auxiliary positioning hole 17. Consequently, the positioning device 10 providing the same effects as the positioning method described in (2-2) can be provided.

(2-6) In the positioning device 10 of the work 15 described in (2-5), corresponding to the invention described in (11), the inner-diameter holding balls A32 contact with the inner surface of the auxiliary positioning hole 17 at three points or more. Consequently, the positioning device 10 providing the same effects as the positioning method described in (2-3) can be provided.

Third Embodiment

Next, the configuration of a third embodiment will be described.

A positioning device 10 in the third embodiment has the same configuration as that in the second embodiment, except for the auxiliary positioning unit 30. Specifically, the third embodiment shows a modified example of the auxiliary positioning unit 30 of the second embodiment. Thus, the configuration of the auxiliary positioning unit 30 is explained.

FIG. 11A is a sectional view of the auxiliary positioning unit 30 of the third embodiment, taken along a line G-G in FIG. 11B. FIG. 11B is a sectional view of the auxiliary positioning unit 30 corresponding to a view taken along the line B-B in FIG. 1.

The auxiliary positioning unit 30 includes an insert cap member B31, inner-diameter holding balls B32, a base upper block B35, a base lower block B36, a piston B37, and others.

The insert cap member B31 corresponds to the insert cap member A31 and is formed in a cylindrical shape internally having a ball hole B31d in which an expansion/contraction ball B40 is held. A cap leading part B31a is to be inserted into the auxiliary positioning hole 17 of the work 15 and is formed with ball holes B31c at three positions in each of which the inner-diameter holding ball B32 is movable. The insert cap member B31 is provided, at its lower end, with a flange B31b which is held by the base upper block B35 and the base lower block B36.

The flange B31b is formed, at both side ends, with sliding surfaces B31e which slide on the corresponding slide holding surfaces B36e of the base lower block B36.

The thickness of the flange B31b is determined to be slightly thinner than the depth of the holding groove B36f formed in a fitting protrusion B36a to allow the flange B31b to smoothly slide. The holding groove B36f is connected to an oil feed passage B36d to contribute smooth sliding. Therefore, a seal member B41 is provided on an upper surface of the base upper block B35 to seal the outer periphery of the insert cap member B31.

The inner-diameter holding balls B32 are components which will contact with the inner wall surface of the auxiliary positioning hole 17 of the work 15 and move inside the ball holes B31c of the insert cap member B31 in a radial direction of the insert cap member B31 in accordance with upward/downward movement of the expansion/contraction ball B40.

In FIG. 11B, two inner-diameter holding balls B32 are illustrated. Actually, three inner-diameter holding balls B32 are placed in the auxiliary positioning unit 30.

The base upper block B35 is formed with a fitting recess B35a and the base lower block B36 is formed with a fitting protrusion B36a. The fitting protrusion B36a is fitted in the fitting recess B35a for fitting positioning.

The base lower block B36 is formed with a base fitting part B36b which is inserted for positioning in a fitting hole formed in the reference block 11. The base fitting part B36b is internally formed with a cylindrical sliding surface B36c on which the piston B37 slides. In the outer periphery of the piston B37, an O-ring is placed for the purpose of sliding and sealing.

Furthermore, the fitting protrusion B36a formed in the upper portion of the base lower block B36 is formed with a holding groove B36f having two opposing slide holding surfaces B36e. These slide holding surfaces B36e are formed in parallel with the center straight line CL joining respective centers of the main positioning unit 20 and auxiliary positioning unit 30.

The base lower block B36 is formed with an oil feed passage B36d to allow downward movement of the piston B37. When oil is supplied to the oil feed passage B36d through the second supply passage 11c of the reference block 11, applying oil pressure to the piston B37, the piston B37 is moved downward. On the other hand, the piston B37 is moved upward when oil is supplied to the first oil feed passage 11b.

The flange B31b of the insert cap member B31 is placed in the holding groove B36f of the base lower block B36 and is fixed from above by the base upper block B35, so that the flange B31b of the insert cap member B31 can be held between the base upper block B35 and the base lower block B36.

The piston B37 is formed with a ball pressing part B37a and a piston sliding part B37b. An upper surface of the ball pressing part B37a contacts with the expansion/contraction ball B40. Thus, vertical movement of the piston B37 causes vertical movement of the expansion/contraction ball B40. The piston sliding part B37b slides on the cylindrical sliding surface B36c and is provided, in an outer periphery thereof, with an O-ring for the purpose of sealing and sliding.

The expansion/contraction ball B40 is a spherical object having such a diameter as to be slidable on the inner surface of the ball hole B31d of the insert cap member B31. The inner-diameter holding balls B32 contact with the surface of the ball B40.

One end of a pressure spring B39 abuts on an upper surface of the expansion/contraction ball B40 and the other end of the pressure spring B39 abuts on the inner surface of the ball hole B31d of the insert cap member B31 to urge the expansion/contraction ball B40 downward.

Since the auxiliary positioning unit 30 is provided with the sliding surfaces B31e and the slide holding surfaces B36e, the insert cap member B31 serving as the auxiliary positioning insert part of the auxiliary positioning unit 30 can be moved in parallel toward the main positioning unit 20.

When the auxiliary positioning unit 30 in the third embodiment configured as above is supplied with oil through the second supply passage 11c of the reference block 11, as with the auxiliary positioning unit 30 in the second embodiment, applying oil pressure to the oil feed passage B36d of the base lower block B36, the piston B37 is moved downward.

On the other hand, when oil is supplied to the first oil feed passage 11b, applying oil pressure to the bottom of the piston B37, the piston B37 is moved upward. As above, the expansion/contraction ball B40 is moved up/down, causing the inner-diameter holding balls B32 contacting with the outer surface of the ball B40 to move in the radial direction inside the ball holes B31c. Accordingly, in association with upward movement of the piston B37, the inner-diameter holding balls B32 are moved in an outward direction of the insert cap member B31, thereby pressing against the inner wall surface of the auxiliary positioning hole 17 of the work 15.

When oil is supplied to the second supply passage 11c of the reference block 11, applying oil pressure to the oil feed passage B36d, the piston B37 is moved downward. In association with this, the expansion/contraction ball B40 urged by the pressure spring B39 is moved downward. Thus, the inner-diameter holding balls B32 do not receive any force that pushes the balls B32 in the radially outward direction of the insert cap member B31, thereby allowing the work 15 to be detached easily from the auxiliary positioning unit 30.

In this way, the inner-diameter holding balls B32 placed in the leading end part of the auxiliary positioning unit 30 are moved radially outward, pressing against the inner surface of the auxiliary positioning hole 17 of the work 15, so that accurate positioning of the work 15 can be achieved. In other words, the same effects as in the second embodiment can be provided.

Additionally, because of a simpler structure than in the second embodiment, a manufacturing cost can be reduced.

As explained above, the third embodiment can provide the following configurations, operations, and effects.

(3-1) In the positioning method of the work 15, corresponding to the invention described in (1), to determine the position of the work 15 by inserting the main positioning unit 20 and the auxiliary positioning unit 30 placed on the reference plane 11*a* into the main positioning hole 16 and the auxiliary positioning hole 17 formed in the work 15, the main positioning unit 20 includes the insert cap member A21 having a circular outer peripheral shape to be inserted into the main positioning hole 16, the auxiliary positioning unit 30 includes the base lower block B36 formed with at least two opposing holding surfaces B36*e* parallel with the center straight line CL joining the main positioning unit 20 and the auxiliary positioning unit 30, the flange B31*b* having the sliding surfaces B31*e* formed in parallel with the center straight line CL and in correspondence with the slide holding surfaces B36*e* of the base lower block B36, and the insert cap member B31 which has the circular outer peripheral shape on the flange B31*b* and will be inserted into the auxiliary positioning hole 17. When the work 15 is to be positioned, the insert cap member A21 of the main positioning unit 20 is inserted into the main positioning hole 16 and the flange B31*b* of the auxiliary positioning unit 30 is guided by the slide holding surfaces B36*e* to move on the center straight line CL, thereby absorbing a pitch error between the main positioning hole 16 and the auxiliary positioning hole 17, so that the insert cap member B31 is inserted into the auxiliary positioning hole 17.

Accordingly, the auxiliary positioning unit 30 can be moved on the center straight line CL joining the auxiliary positioning unit 30 and the main positioning unit 20. It is possible to absorb the pitch error of the hole-to-hole P between the main positioning hole 16 and the auxiliary positioning hole 17 of the work 15 without imposing an unnecessary burden on the main positioning unit 20.

Furthermore, the auxiliary positioning insertion part of the auxiliary positioning unit 30 internally includes no sliding mechanism and therefore can have a simple internal structure. Thus, the insertion part with a small diameter can be realized while maintaining rigidity.

(3-2) In the positioning method of the work 15 described in (3-1), corresponding to the invention described in (4), the auxiliary positioning unit 30 includes the inner-diameter holding balls B32 which will contact with the inner surface of the auxiliary positioning hole 17 and the expansion/contraction ball B40 having the outer surface contacting with the inner-diameter holding balls B32. While the insert cap member B31 is inserted in the auxiliary positioning hole 17 of the work 15, the expansion/contraction ball B40 is moved in parallel in the axis direction of the auxiliary positioning unit 30, thereby causing the inner-diameter holding balls B32 to contact with and press against the inner surface of the auxiliary positioning hole 17. Accordingly, the auxiliary positioning unit 30 can be additionally provided with the inner-diameter holding function for the auxiliary positioning hole 17.

The main positioning unit 20 and the auxiliary positioning unit 30 are additionally provided with the inner-diameter holding function with respect to respective positioning holes, so that positioning accuracy can be enhanced.

Usually, a positioning hole is provided with a clearance by increasing a gap from a positioning pin in order to achieve good workability. Accordingly, even a hole having a diameter of about 10 mm is provided with a clearance of about several tens of micrometers. This clearance makes it easy to insert/remove the positioning pin with respect to the positioning hole formed in the work 15.

(3-3) In the positioning device 10 of the work 15, corresponding to the invention described in (8), to determine the position of the work 15 by inserting the main positioning unit 20 and the auxiliary positioning unit 30 placed on the reference plane 11*a* into the main positioning hole 16 and the auxiliary positioning hole 17 formed in the work 15, the main positioning unit 20 includes the insert cap member A21 having a circular outer peripheral shape to be inserted into the main positioning hole 16, the auxiliary positioning unit 30 includes the base lower block B36 formed with at least two opposing holding surfaces B36*e* parallel with the center straight line CL joining the main positioning unit 20 and the auxiliary positioning unit 30, the flange B31*b* having the sliding surfaces B31*e* formed in parallel with the center straight line CL and in correspondence with the slide holding surfaces B36*e* of the base lower block B36, and the insert cap member B31 which has the circular outer peripheral shape as an upper part of the flange B31*b* and will be inserted into the auxiliary positioning hole 17. Accordingly, the positioning device 10 having the same effects as the positioning method described in (3-1) can be provided.

(3-4) In the positioning device 10 of the work 15 described in (3-3), corresponding to the invention described in (11), the auxiliary positioning unit 30 includes the inner-diameter holding balls B32 which will contact with the inner surface of the auxiliary positioning hole 17 and the expansion/contraction ball B40 having the outer surface contacting with the inner-diameter holding balls B32. While the insert cap member B31 is inserted in the auxiliary positioning hole 17 of the work 15, the expansion/contraction ball B40 is moved in parallel in the axis direction of the auxiliary positioning unit 30, thereby causing the inner-diameter holding balls B32 to contact with and press against the inner surface of the auxiliary positioning hole 17. Accordingly, the positioning device 10 providing the same effects as with the positioning unit described in (3-2) can be provided.

Fourth Embodiment

Next, the configuration of a fourth embodiment will be described.

A positioning device 10 in the fourth embodiment has the same configuration as that in the first embodiment, except for the main positioning unit 20 and the auxiliary positioning unit 30 in the first embodiment.

Therefore, the following explanation is given to the main positioning unit 20 and the auxiliary positioning unit 30. The main positioning unit 20 is first explained.

Figure 12A:
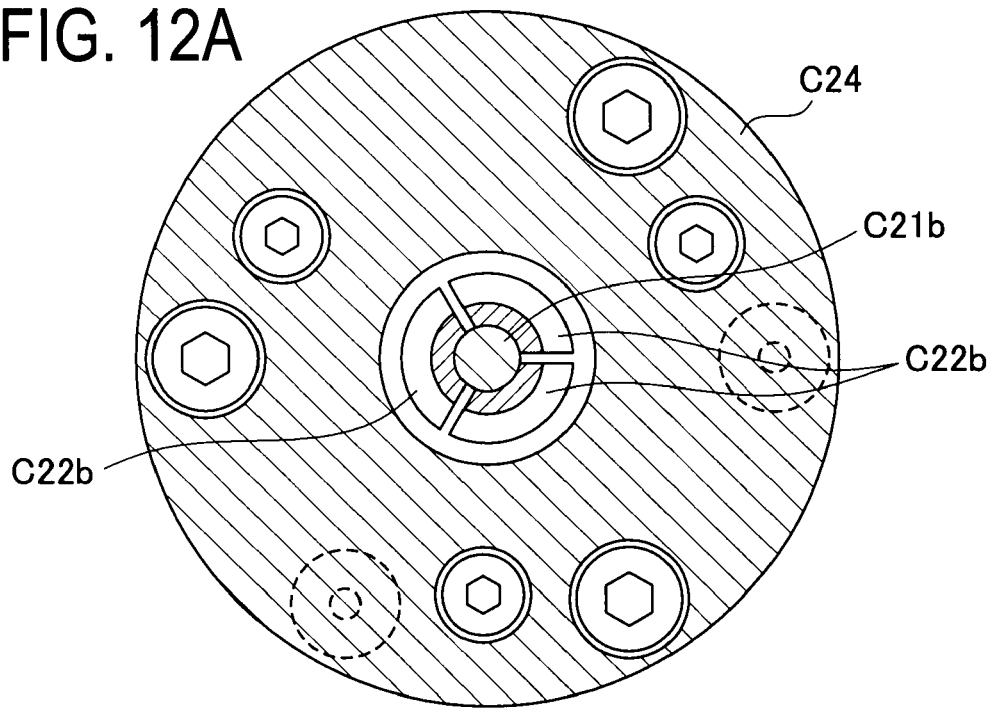
FIG. 12A is a sectional view of a main positioning unit 20 in a fourth embodiment, taken along a line H-H in FIG. 12B.
Figure 12B:
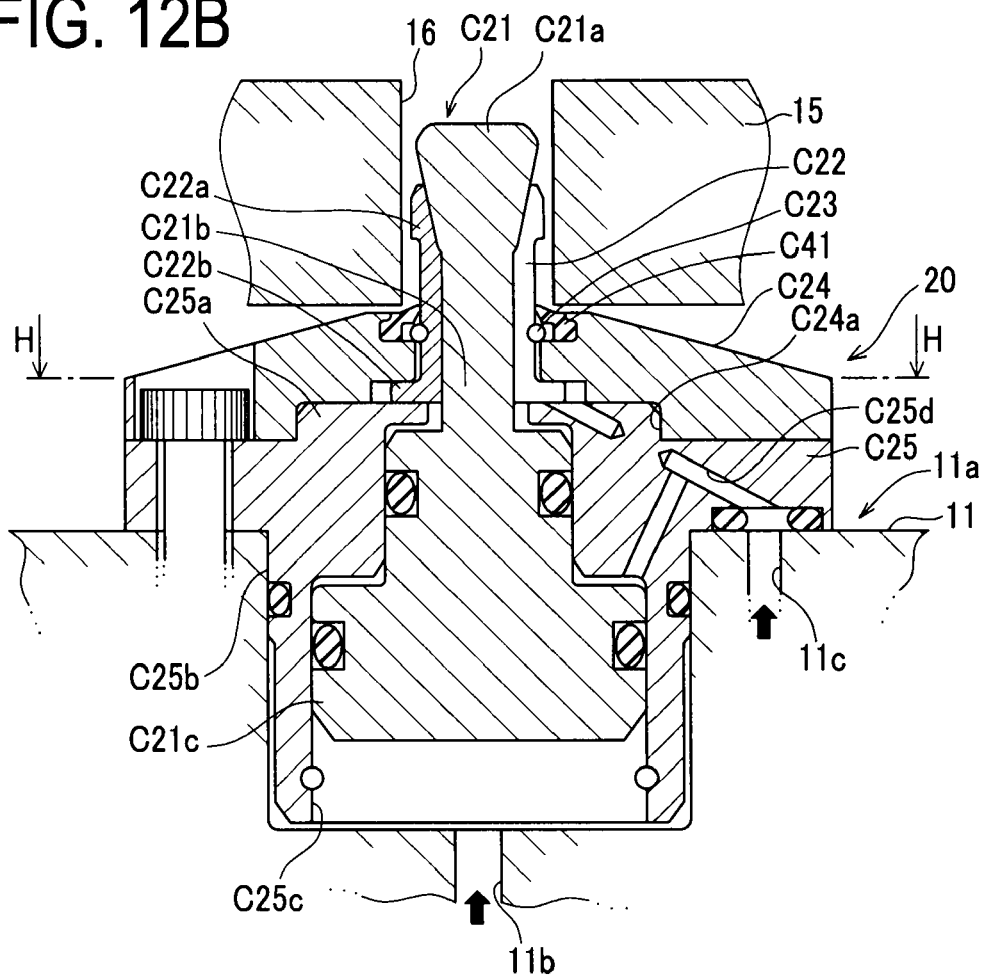
FIG. 12B is a sectional view of the main positioning unit 20 in the fourth embodiment, corresponding to a view taken along the line A-A in FIG. 1.

FIG. 12A is a sectional view of the main positioning unit 20 taken along a line H-H in FIG. 12B. FIG. 12B is a sectional view of the main positioning unit 20 corresponding to a view taken along the line A-A in FIG. 1.

The main positioning unit 20 includes a tapered shaft piston C21, an expansion/contraction gripper C22, a base upper block C24, a base lower block C25, and others.

The tapered shaft piston C21 corresponds to the diameter adjusting part and includes a tapered part C21*a*, a shaft part C21*b*, and a piston part C21*c*. The tapered part C21*a* is formed to have a diameter that gradually increases from an end of the columnar shaft part C21*b*, taking an inverted cone-shape continuous to the shaft part C21*b*. The other end of the shaft part C21*b* is continuous to the piston part C21*c* to slide on a cylindrical sliding surface C25*c* which is an inner peripheral surface of the base lower block C25. An O-ring is provided in the outer periphery of the piston part C21*c* for the purpose of sliding and sealing.

The expansion/contraction gripper C22, which corresponds to the inner-diameter holding member and the main positioning insert part, is a component that contacts with each outer periphery of the tapered part C21a and the shaft part C21b of the tapered shaft piston C21. The gripper C22 is formed with a grip part C22a and a flange C22b.

The grip part C22a will contact with the main positioning hole 16 of the work 15. The flange C22b is held between the base upper block C24 and the base lower block C25.

The expansion/contraction gripper C22 is formed of three separate parts so as to expand/contract as the tapered shaft piston C21 moves downward/upward. A ring C23 is placed near the center of the expansion/contraction gripper C22 and held in contact with the outer peripheral surface of the tapered part C21a of the tapered shaft piston C21.

The baser upper block C24 is formed with a fitting recess C24a in which a fitting protrusion C25a of the base lower block C25 is inserted for fitting positioning. Those correspond to the baser block member.

The base upper block C24 holds the flange C22b of the expansion/contraction gripper C22 in cooperation with the base lower block C25. A seal member C41 is placed in an upper portion of the base upper block C24 to prevent entry of dusts or the like from the outside.

The base lower block C25 is formed with a base fitting part C25b which is inserted and positioned in a fitting hole formed in the reference block 11. The base fitting part C25b is internally formed with the cylindrical sliding surface C25c on which the piston part C21c of the tapered shaft piston C21 slides.

To move the tapered shaft piston C21 downward by the oil supplied through the second supply passage lc of the reference block 11, an oil feed passage C25d is formed in the base lower block C25.

The main positioning unit 20 configured as above is operated in the following manner.

When oil is supplied through the second supply passage 11c of the reference block 11, applying oil pressure into the oil feed passage C25d of the base lower block 25, the piston part C21c is moved downward. On the other hand, when oil is supplied through the first oil feed passage 11b of the reference block 11, applying oil pressure to the bottom of the piston part C21c, the piston part C21c is moved upward. Accordingly, the tapered part C21a is moved upward or downward, thereby causing the expansion/contraction gripper C22 contacting with the outer surfaces of the tapered part C21a and the shaft part C21b to contract or expand in a radial direction.

When oil pressure is applied to the oil feed passage C25d, moving the tapered part C21a downward, the expansion/contraction gripper C22 is expanded outward to press against the inner surface of the main positioning hole 16 of the work 15.

Consequently, a clearance between the main positioning hole 16 and an insert part of the main positioning unit 20 is eliminated. By such expanding and contracting operation of the main positioning unit 20, high accurate positioning of the work 15 can be achieved.

The following explanation is given to the auxiliary positioning unit 30.

Figure 13A:
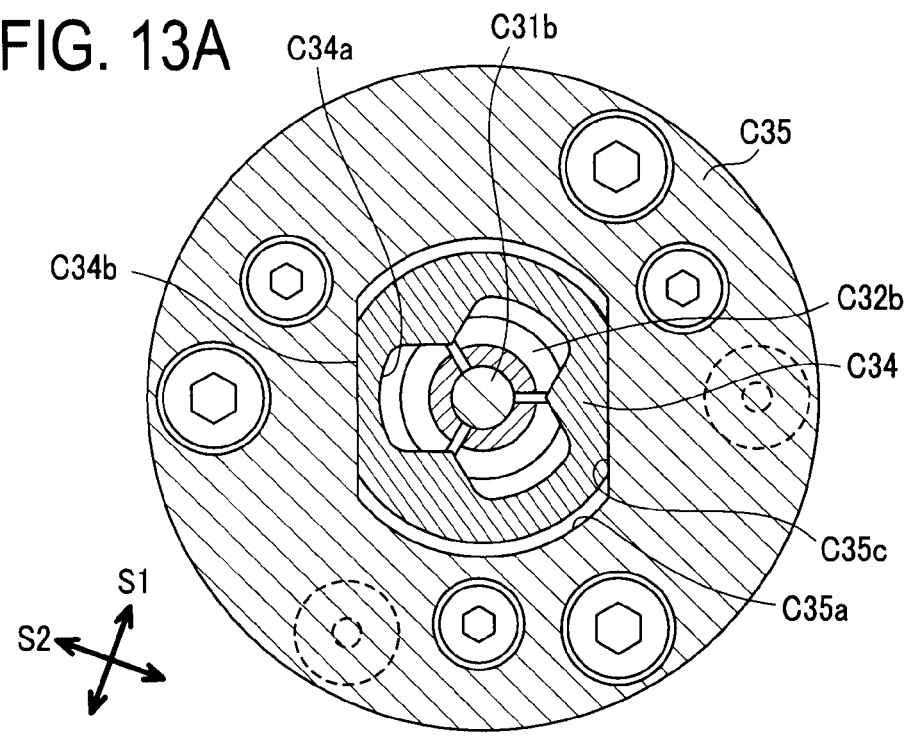
FIG. 13A is a sectional view of an auxiliary positioning unit 30 in the fourth embodiment, taken along a line I-I in FIG. 13B.
Figure 13B:
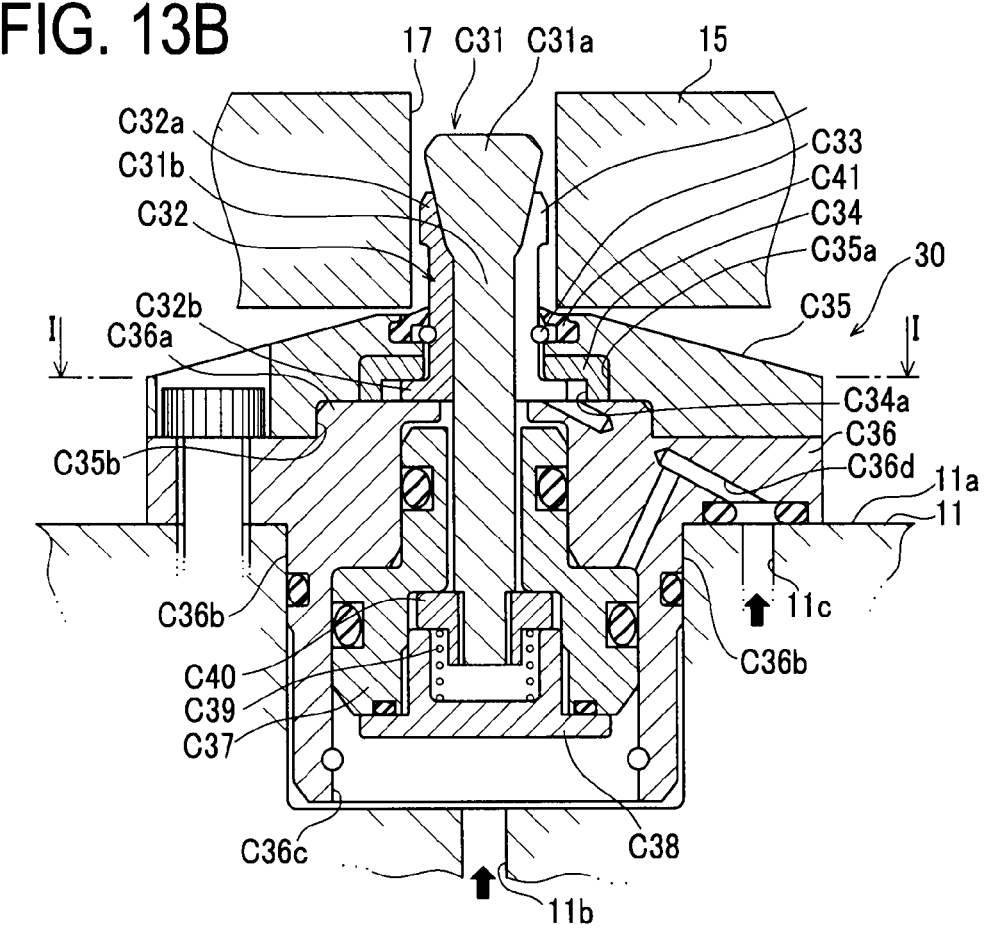
FIG. 13B is a sectional view of the auxiliary positioning unit 30 in the fourth embodiment, corresponding to a view taken along the line B-B in FIG. 1.

FIG. 13A is a sectional view of the auxiliary positioning unit 30 in the fourth embodiment, taken along a line I-I in FIG. 13B. FIG. 13B is a sectional view of the auxiliary positioning unit 30, corresponding to a view taken along the line B-B in FIG. 1.

The auxiliary positioning unit 30 includes a tapered shaft C31, an expansion/contraction gripper C32, a base upper block C35, a base lower block C36, a piston C37, and others.

The tapered shaft C31, which corresponds to the diameter adjusting part, includes a tapered part C31a and a shaft part C31b. The tapered part C31a is formed to have a diameter that gradually increases from an end of the columnar shaft part C31b, taking an inverted cone-shape continuous to the shaft part C31b. The other end of the shaft part C31b is formed with external threads which threadedly engage the flange C40.

The expansion/contraction gripper C32, which corresponds to the inner-diameter holding member and the main positioning insert part, is a component that contacts with each outer periphery of the tapered part C31a and the shaft part C31b of the tapered shaft piston C31. The gripper C32 is formed with a grip part C32a and a flange C32b.

The grip part C32a will contact with the auxiliary positioning hole 17 of the work 15. The flange C32b is held between the base upper block C35 and the base lower block C36.

The expansion/contraction gripper C32 is formed of three separate parts so as to expand or contract as the tapered shaft C31 moves downward or upward. A ring C33 is placed near the center of the expansion/contraction gripper C32 which is held in contact with the outer peripheral surface of the tapered part C31a of the tapered shaft piston C31.

The slide flange C34 is a component that holds down the upper surface of the flange part C32b of the expansion/contraction gripper C32 and is slidable in a slide groove C35a formed in the base upper block C35. The slide flange C34 is internally formed with a groove C34 in which the flange part C32b of the gripper C32 is allowed to radially move. The slide flange C34 is externally formed with two opposing sliding surfaces C34b. The sliding surfaces C34b correspond to the second smooth surface. The depth of the groove C34a is determined to be slightly larger than flange part C32b to facilitate smooth sliding of the flange part C32b.

The base upper block C35 is formed with a fitting recess C35b in which a fitting protrusion C36a formed in the base lower block C36 is inserted for fitting positioning. The slide groove C35a of the base upper block C35 is formed with two opposing slide holding surfaces C35c parallel in the center straight line CL. The slide holding surfaces C35c correspond to the first smooth surface. On the slide holding surfaces C35c, the sliding surfaces C34b of the slide flange C34 will slide.

A seal member C41 is placed in an upper portion of the base upper block C35 to prevent oil scattering and entry of dusts or the like from the outside.

The base lower block C36 is formed with a base fitting part C36b which is inserted for positioning in a fitting hole formed in the reference block 11. The base fitting part C36b is internally formed with the cylindrical sliding surface C36c on which the piston C37 slides.

To move the piston C37 downward by the oil supplied through the second supply passage 11c of the reference block 11, an oil feed passage C36d is formed in the base lower block C36. The base upper block C35 and the base lower block C36 correspond to the base block member.

The piston C37 is connected to the tapered shaft C31 and slides on the cylindrical sliding surface C36c. Accordingly, an O-ring is provided in the outer peripheral surface of the piston C37 for the purpose of sliding and sealing. The piston C37 is threadedly connected to a piston plug C38.

One end of a pressure spring C39 abuts on an upper surface of the piston plug C38 and the other end of the pressure spring C39 abuts on a lower surface of the flange C40 threadedly engaging the tapered shaft C31.

The auxiliary positioning unit 30 configured as above is operated in the following manner.

When oil is supplied through the second supply passage 11c of the reference block 11, applying oil pressure to the oil feed passage C36d of the base lower block C36, the piston C37 is moved downward. On the other hand, when oil is supplied through the first oil feed passage 11b of the reference block 11, applying oil pressure to lower surfaces of the piston C37 and the piston plug C38, the piston C37 is moved upward.

In association with upward movement of the piston C37, the tapered shaft C31 is moved vertically, thereby causing the expansion/contraction gripper C32 contacting with the outer peripheral surface of the tapered part C31a and the shaft part C31b to expand or contract in a radial direction.

In the case where oil pressure is applied to the oil feed passage C36d, moving the tapered part C31a downward, the expansion/contraction gripper C32 is expanded radially outward to press against the inner surface of the auxiliary positioning hole 17 of the work 15.

Consequently, a clearance between the auxiliary positioning hole 17 and an insert part of the auxiliary positioning unit 30 is eliminated.

Furthermore, since the auxiliary positioning unit 30 is provided with the sliding surfaces C34b and the slide holding surfaces C35c, the expansion/contraction gripper C32 serving as the auxiliary positioning insert part of the auxiliary positioning unit 30 can be moved in parallel toward the main positioning unit 20.

The positioning device 10 configured as above in the fourth embodiment can provide the following operations and effects.

The effects in the fourth embodiment are basically the same as those in the first embodiment. By using the positioning device 10 of the fourth embodiment, the work 15 can accurately be positioned in place relative to the main positioning unit 20. This is because the auxiliary positioning unit 30 is adjusted along the center straight line CL, thereby correcting the deviation in the θ direction.

When the hole 18 to be machined in the work 15 is designed with reference to the main positioning hole 16, the deviation in the θ direction can be restricted by the auxiliary positioning unit 30 with reference to the main positioning unit 20 of the positioning device 10, so that the hole 18 can be machined in the work 15.

Different from other embodiments, this embodiment adopts the configuration that expands/contracts the expansion/contraction gripper C22 and the expansion/contraction gripper C32. Accordingly, for example, even if the inner surfaces of the main positioning hole 16 and the auxiliary positioning hole 17 of the work 15 are tapered, the expansion/contraction gripper C22 and the expansion/contraction gripper C32 can be deformed to adapt to such tapered surfaces.

Since the grip part C22a will come into linear contact with the auxiliary positioning hole 17, the auxiliary positioning hole 17 is unlikely to be damaged. Thus, the grip part C22a can press against the work 15 with a large force, so that even a work 15 having a large weight can be reliably positioned in place.

The fourth embodiment explained as above can provide the following configurations, operations, and effects.

(4-1) In the positioning method of the work 15, corresponding to the invention described in (1), provided with the main positioning unit 20 and the auxiliary positioning unit 30 placed to protrude on the reference plane 11, to determine the position of the work 15 by inserting the main positioning unit 20 into the main positioning hole 16 formed in the work 15 and inserting the auxiliary positioning unit 30 into the auxiliary positioning hole 17 formed in the work 15, the main positioning unit 20 includes the expansion/contraction gripper C22 having the circular outer peripheral shape to be inserted into the main positioning hole 16, the auxiliary positioning unit 30 includes the base upper block C35 formed with at least two opposing slide holding surfaces C35c parallel with the center straight line CL joining the main positioning unit 20 and the auxiliary positioning unit 30, the slide flange C34 formed with the sliding surfaces C34b formed in parallel with the center straight line CL and in correspondence with the slide holding surfaces C35c of the base upper block C35, and the expansion/contraction gripper C32 which has the circular outer peripheral shape as an upper part of the slide flange C34 and will be inserted into the auxiliary positioning hole 17. When the work 15 is to be positioned, the expansion/contraction gripper C22 is inserted into the main oil feed passage hole 16 and the slide flange C34 of the auxiliary positioning unit 30 is guided by the slide holding surfaces C35c to move on the center straight line CL, thereby absorbing a pitch error between the main oil feed passage hole 16 and the auxiliary positioning hole 17, so that the expansion/contraction gripper C32 is inserted into the auxiliary positioning hole 17.

Accordingly, the auxiliary positioning unit 30 can be moved on the center straight line CL joining the auxiliary positioning unit 30 and the main positioning unit 20. It is possible to absorb the pitch error of the hole-to-hole P between the main positioning hole 16 and the auxiliary positioning hole 17 of the work 15 without imposing an unnecessary burden on the main positioning unit 20.

Furthermore, the expansion/contraction gripper C32 of the auxiliary positioning unit 30 internally includes no sliding mechanism and therefore can have a simple internal structure. Thus, the insertion part with a small diameter can be realized while maintaining rigidity.

(4-2) In the positioning method of the work 15 described in (4-1), corresponding to the invention described in (2), the auxiliary positioning unit 30 includes the expansion/contraction gripper C32 which will contact with the inner surface of the auxiliary positioning hole 17 and the tapered shaft C31 having the tapered outer peripheral surface contacting with the gripper C32. While the expansion/contraction gripper C32 is inserted in the auxiliary positioning hole 17 of the work 15, the tapered shaft C31 or the gripper C32 is moved in parallel in the axis direction of the auxiliary positioning unit 30, thereby causing the gripper C32 to contact with and press against the inner surface of the auxiliary positioning hole 17. The auxiliary positioning unit 30 can additionally have the inner-diameter holding function for the auxiliary positioning hole 17.

The main positioning unit 20 and the auxiliary positioning unit 30 are additionally provided with the inner-diameter holding function with respect to respective positioning holes, so that positioning accuracy can be enhanced.

(4-3) In the positioning device 10 of the work 15, corresponding to the invention described in (8), provided with the main positioning unit 20 and the auxiliary positioning unit 30 placed to protrude on the reference plane 11a, to determine the position of the work 15 by inserting the main positioning unit 20 into the main positioning hole 16 formed in the work 15 and inserting the auxiliary positioning unit 30 in the auxiliary positioning hole 17 formed in the work 15, the main positioning unit 20 includes the expansion/contraction gripper C22 having the circular outer peripheral shape to be inserted into the main positioning hole 16, the auxiliary positioning unit 30 includes the base upper block C35 formed with at least two opposing slide holding surfaces C35c parallel with the center straight line CL joining the main positioning unit 20 and the auxiliary positioning unit 30, the slide flange C34 formed with the sliding surfaces C34b formed in parallel with the center straight line CL and in correspondence with the slide holding surfaces C35c of the base upper block C35, and the expansion/contraction gripper C32 which has the circular outer peripheral shape on the slide flange C3/1 base lower block C36 and will be inserted into the auxiliary positioning hole 17. Consequently, the positioning device 10 capable of providing the same effects as in the positioning method described in (4-1) can be provided.

(4-4) In the positioning method of the work 15 described in (4-3), corresponding to the invention described in (9), the auxiliary positioning unit 30 includes the expansion/contraction gripper C32 which will contact with the inner surface of the auxiliary positioning hole 17 and the tapered shaft C31 having the tapered outer peripheral surface contacting with the gripper C32. While the expansion/contraction gripper C32 is inserted in the auxiliary positioning hole 17 of the work 15, the tapered shaft C31 or the gripper C32 is moved in parallel in the axis direction of the auxiliary positioning unit 30, thereby causing the gripper C32 to contact with and press against the inner surface of the auxiliary positioning hole 17. Consequently, the positioning device 10 capable of providing the same effects as in the positioning method described in (4-2) can be provided.

Fifth Embodiment

Next, the configuration of a fifth embodiment will be described.

A positioning device 10 in the fifth embodiment has the same configuration as that in the first embodiment. The following explanation is therefore given to different configuration from the first embodiment.

Figure 14A:
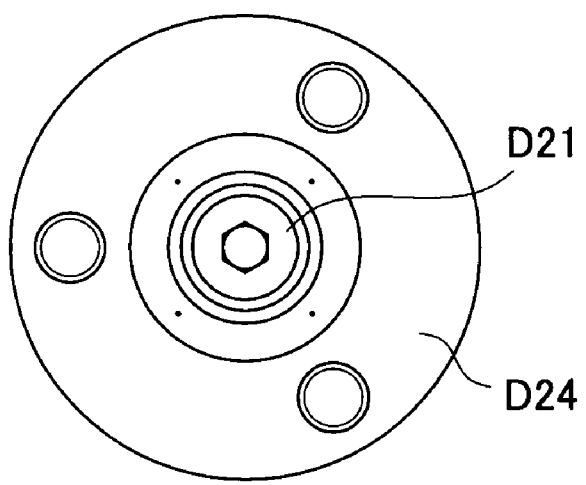
FIG. 14A is a top view of a main positioning unit 20 in a fifth embodiment.
Figure 14B:
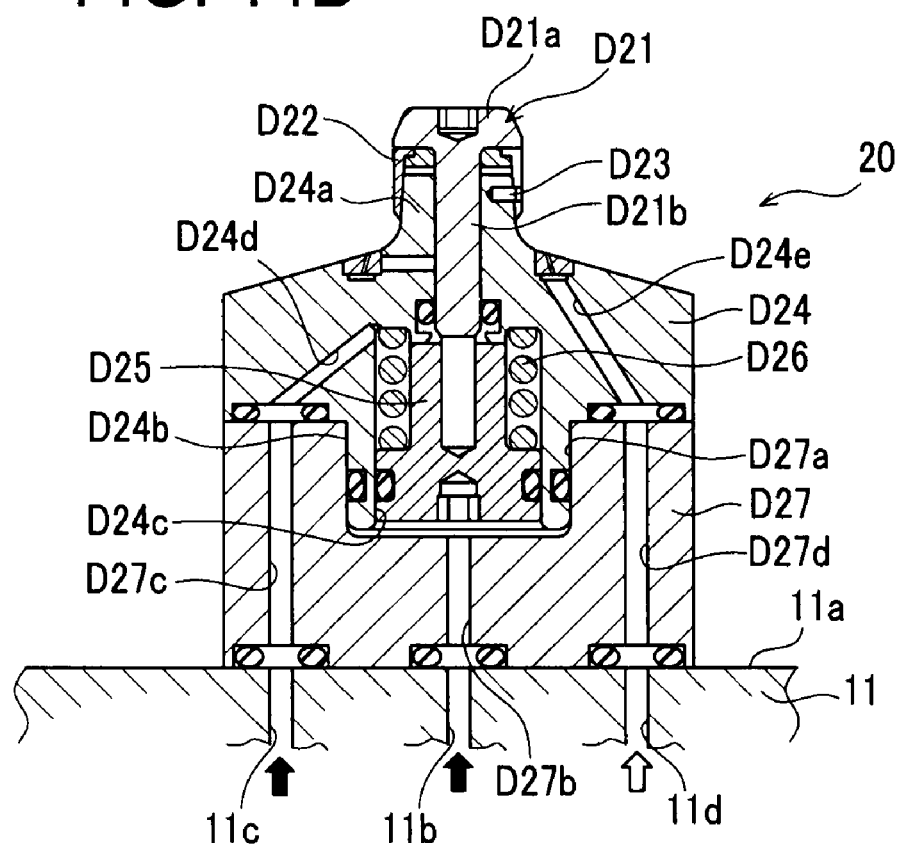
FIG. 14B is a sectional view of the main positioning unit 20 in the fifth embodiment, corresponding to a view taken along the line A-A in FIG. 1.

FIG. 14A is a top view of the main positioning unit 20 in the fifth embodiment. FIG. 14B is a sectional view of the main positioning unit 20 corresponding to a view taken along the line A-A in FIG. 1.

The main positioning unit 20 includes an insert shaft D21, a tapered ring D22, a base block D24, a piston D25, a spacer block D27, and others.

The insert shaft D21 is constituted of a leading end part D21a and a shaft part D21b so that the shaft part D21b is formed coaxially with the leading end part D21a having a trapezoidal vertical section.

The tapered ring D22 is a cylindrical tapered component having a C-shaped cross section, which is attached to a lower surface of the leading end part D21a of the insert shaft D21. Accordingly, the tapered ring D22 can be expanded and contracted in a radial direction.

The insert shaft D21 and the tapered ring D22 correspond to the main positioning insert part.

The base block D24 is formed with a tapered protrusion D24a and a block fitting part D24b which is fitted for positioning in a fitting recess D27a formed in the spacer block D27. The tapered protrusion D24a is formed to have a tapered outer peripheral surface which contacts with the inner surface of the tapered ring D22. The tapered protrusion D24a is formed with a through hole at the center through which the shaft part D21b passes. Furthermore, the tapered protrusion D24a is provided with a pin D23 for holding the tapered ring D22 against rotation.

In the outer periphery of the block fitting part D24b, an O-ring is placed for the purpose of sealing. The block fitting part D24b is formed with a cylindrical sliding surface D24c on which the piston D25 slides. In the outer periphery of the piston D25, an O-ring is placed for the purpose of sliding and sealing.

The base block D24 is formed with an oil feed passage D24d and an air supply passage D24e. The oil feed passage D24d is provided to move the piston D25 downward. The air supply passage D24e is provided to purge the insert shaft D21.

The piston D25 is connected, at an upper portion thereof, with the shaft part D21b of the insert shaft D21.

When oil is supplied to the oil feed passage D24d formed in the base block D24, applying oil pressure to an upper surface of the piston D25, the piston D25 is moved downward along the cylindrical sliding surface D24c. On the other hand, when oil is supplied to a first oil feed passage D27b formed in the spacer block D27, applying oil pressure to a lower surface of the piston D25, the piston D25 is moved upward along the cylindrical sliding surface D24c.

One end of a pressure spring D26 abuts on the piston D25 and the other end abuts on an inner surface of the base block D24.

The spacer block D27 is a component connected to the base block D24 and used to adjust the height of the main positioning unit 20. The spacer block D27 is formed with the first oil feed passage D27b, a second oil feed passage D27c, and an air supply passage D27c as well as the fitting recess D27a.

The spacer block D27 is fixed to the reference block 11 so that the first oil feed passage D27b is connected to the first oil feed passage 11b, the second oil feed passage D27c is connected to the second supply passage 11c, and the air supply passage D27d is connected to the air supply passage 11d. The second oil feed passage D27c is connected to the oil feed passage D24d and the air supply passage D27d is connected to the air supply passage D24e.

The spacer block D27 uses appropriate positioning means, even though not illustrated, for connecting to the reference block 11.

When the main positioning unit 20 configured as above is supplied with oil through the second supply passage 11c of the reference block 11, the oil passing through the second oil feed passage D27c and the oil feed passage D24d applies pressure on the upper surface of the piston D25. The piston D25 is thus moved downward. Accordingly, the insert shaft D21 connected to the piston D25 is also moved downward.

When the insert shaft D21 is moved downward, the tapered ring D22 connected to the insert shaft D21 is also moved downward while remaining in contact with the outer peripheral surface of the tapered protrusion D24a. Thus, the diameter of the tapered ring D22 is expanded.

The tapered ring D22, when is expanded, can press against the inner surface of the main positioning hole 16 of the work 15. This can achieve high accurate positioning of the work 15.

On the other hand, when oil is supplied through the first oil feed passage 11b of the reference block 11, the oil passes through the first oil feed passage D27b and applies pressure on the lower surface of the piston D25, thereby moving the piston D25 upward. Accordingly, the insert shaft D21 connected to the piston D25 is also moved upward.

By this upward movement of the insert shaft D21, the diameter of the tapered ring D22 becomes smaller.

The following explanation is given to the auxiliary positioning unit 30.

Figure 15A:
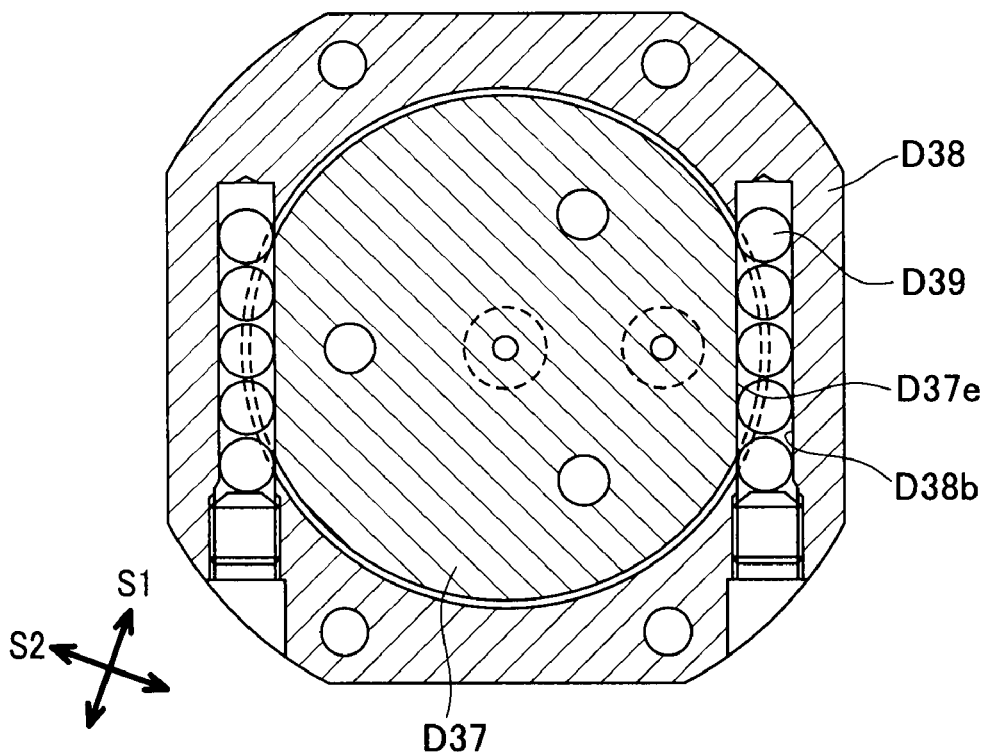
FIG. 15A is a sectional view of an auxiliary positioning unit 30 in the fifth embodiment, taken along a line J-J in FIG. 15B.
Figure 15B:
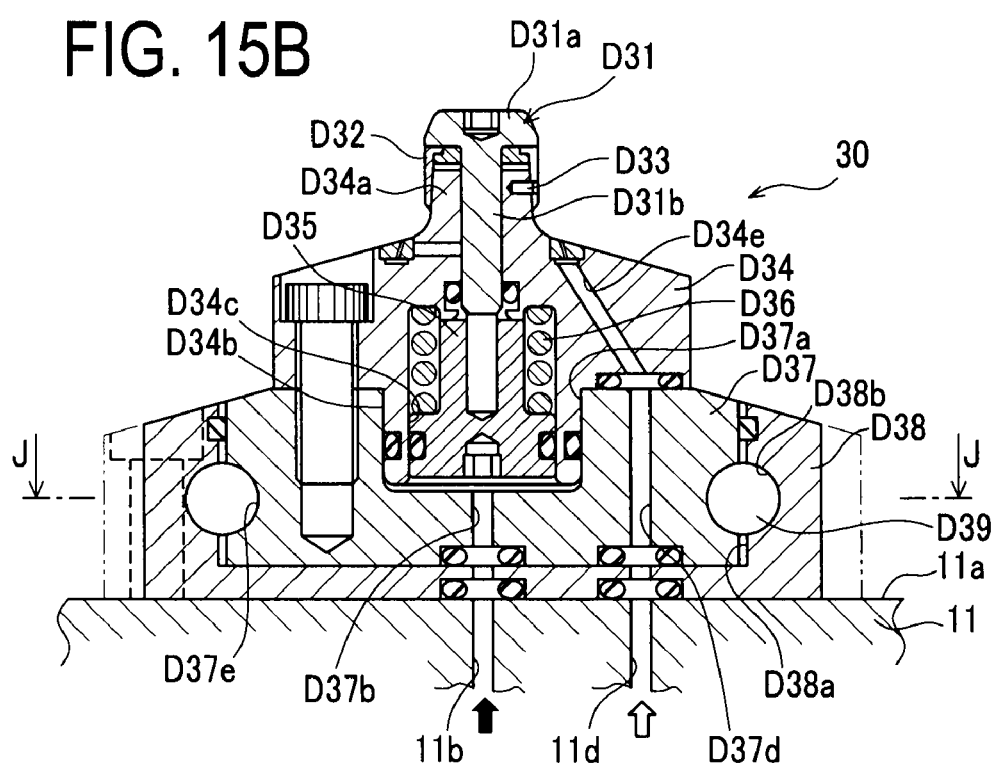
FIG. 15B is a sectional view of the auxiliary positioning unit 30 in the fifth embodiment, corresponding to a view taken along the line B-B in FIG. 1.

FIG. 15A is a sectional view of the auxiliary positioning unit 30 in the fifth embodiment, taken along a line J-J in FIG. 15B. FIG. 15B is a sectional view of the auxiliary positioning unit 30 corresponding to a view taken along the line B-B in FIG. 1.

The auxiliary positioning unit 30 includes an insert shaft D31, a tapered ring D32, a base block D34, a piston D35, a slide block D37, an outer block D38, and others.

The main positioning unit 20 and the auxiliary positioning unit 30 have some common components. As to the insert shaft D21 and the insert shaft D31; the tapered ring D22 and the tapered ring D32; the pin D23 and a pin D33; the base block D24 and the base block D34; the piston D25 and the piston D35; and the pressure spring D26 and the pressure spring D36; they have the same function in each pair. The explanation thereof is therefore omitted. The insert shaft D31 and the tapered ring D32 of the auxiliary positioning unit 30 correspond to an auxiliary positioning insert part.

The slide block D37 is formed with a fitting recess D37a in which a block fitting part D34b formed in the base block D34 is fitted as in the spacer block D27 of the main positioning unit 20.

The slide block D37 is formed with second rolling contact surfaces D37e parallel with the center straight line CL. The second rolling contact surfaces D37e correspond to a second smooth surface. Balls D39 roll in a groove defined by a first rolling contact surface D38b formed in the outer block D38 in correspondence with the second rolling contact surface D37e.

The slide block D37 is formed with an air supply passage D37d connected to the air supply passage D34e. The slide block D37 is further formed with a first oil feed passage D37b connected to the first oil feed passage 11b of the reference block 11 and, though not illustrated, a second oil feed passage D37c connected to the second supply passage 11c.

The outer block D38 is formed with a holding groove D38a in which the slide block D37 slides. On the first rolling contact surfaces D38b of the outer block D38, the balls D39 roll. The first rolling contact surfaces D38b corresponds to a first smooth surface.

The outer block D38 is fixed to the reference block 11 and, though not illustrated, it may be fixed by use of a positioning pin or the like.

The outer block D38 is also formed with passages connected to the first oil feed passage D37b, the second oil feed passage D37c, and the air supply passage D37d of the slide block D37.

The balls D39 serve to guide the slide block D37 when it is slid with respect to the outer block D38. The diameter of each ball D39 is determined to be slightly larger than the groove defined by the second rolling contact surface D37e and the first rolling contact surface D38b to pressurize the slide block D37 to enhance the precision.

When the auxiliary positioning unit 30 configured as above is supplied with oil through the first oil feed passage 11b or the second supply passage 11c of the reference block 11, as in the main positioning unit 20, the piston D35 is moved downward/upward, thereby expanding/contracting the tapered ring D32. The tapered ring D32 which is expanded and contracted can eliminate a clearance with respect to the auxiliary positioning hole 17 of the work 15.

Since the auxiliary positioning unit 30 is provided with the second rolling contact surface D37e and the first rolling contact surface D38b, the insert shaft D31 and the tapered ring D32 serving as the auxiliary positioning insert part of the auxiliary positioning unit 30 can be moved in parallel toward the main positioning unit 20.

The positioning device 10 in the fifth embodiment configured as above can provide the following operations and effects.

The effects of the fifth embodiment are basically the same as those in the first embodiment. By using the positioning device 10 in the fifth embodiment, the work 15 can be accurately positioned in place relative to the main positioning unit 20. The slide block D37 of the auxiliary positioning unit 30 can be moved on the center straight line CL relative to the outer block D38 to absorb a pitch error of the hole-to-hole P, thereby correcting a deviation in the θ direction.

In the positioning device 10 in the fifth embodiment, the main positioning unit 20 and the auxiliary positioning unit 30 use common components. The sliding mechanism of the auxiliary positioning unit 30 is achieved by the slide block D37 and the outer block D38. Thus, the positioning device 10 can be realized at low cost.

If the number of common components between the main positioning unit 20 and the auxiliary positioning unit 30 is increased, maintenance can be enhanced.

As explained above, the fifth embodiment can provide the following configurations, operations, and effects.

(5-1) In the positioning method of the work 15, corresponding to the invention described in (1), provided with the main positioning unit 20 and the auxiliary positioning unit 30 placed to protrude on the reference plane 11a, to determine the position of the work 15 by inserting the main positioning unit 20 into the main positioning hole 16 formed in the work 15 and inserting the auxiliary positioning unit 30 into the auxiliary positioning hole 17 formed in the work 15, the main positioning unit 20 includes the insert shaft D21 and the tapered ring D22 each of which has the circular outer peripheral shape to be inserted into the main positioning hole 16, the auxiliary positioning unit 30 includes the outer block D38 formed with at least two first rolling contact surfaces D38b opposing each other and parallel with the center straight line CL joining the main positioning unit 20 and the auxiliary positioning unit 30, the slide block D37 formed with the second rolling contact surfaces D37e formed in parallel with the center straight line CL and in correspondence with the first rolling contact surfaces D38b of the outer block D38, and the insert shaft D31 and the tapered ring D32 each of which has the circular outer peripheral shape to be inserted into the auxiliary positioning hole 17 and are placed above the slide block D37. When the work 15 is to be positioned in place, the insert shaft D21 and the tapered ring D22 of the main positioning unit 20 are inserted into the main positioning hole 16 and the slide block D37 of the auxiliary positioning unit 30 is guided by the first rolling contact surfaces D38b through the balls D39 and moved on the center straight line CL to absorb a pitch error between the main positioning hole 16 and the auxiliary positioning hole 17, so that the insert shaft D31 and the tapered ring D32 are inserted into the auxiliary positioning hole 17.

Accordingly, the auxiliary positioning unit 30 can be moved on the center straight line CL joining the auxiliary positioning unit 30 and the main positioning unit 20. It is therefore possible to absorb the pitch error of the hole-to-hole P between the main positioning hole 16 and the auxiliary positioning hole 17 of the work 15 without imposing an unnecessary burden on the main positioning unit 20.

Furthermore, the insert shaft D31 and the tapered ring D32 of the auxiliary positioning unit 30 internally include no sliding mechanism and therefore they can have a simple internal structure. Thus, the insertion part with a small diameter can be realized while maintaining rigidity.

(5-2) In the positioning method of the work 15 described in (5-1), corresponding to the invention described in (2), the auxiliary positioning unit 30 includes the tapered ring D32 which will contact with the auxiliary positioning hole 17 and the base block D34 having the tapered outer peripheral surface contacting with the tapered ring D32. While the tapered ring D32 is inserted in the auxiliary positioning hole 17 of the work 15, the tapered ring D32 is moved in parallel in an axis direction of the auxiliary positioning unit 30 to come into contact with and press against the inner surface of the auxiliary positioning hole 17. Thus, the auxiliary positioning unit 30 can additionally have the inner-diameter holding function for the auxiliary positioning hole 17.

The main positioning unit 20 and the auxiliary positioning unit 30 are additionally provided with the inner-diameter holding function with respect to respective positioning holes, so that positioning accuracy can be enhanced.

(5-3) In the positioning method of the work 15 described in (5-1) or (5-2), corresponding to the invention described in (5), the sliding part including the second rolling contact surfaces D37e is formed in the slide block D37 placed in the outer block D38, and the slide block D37 holds the base block D34 including the insert shaft D31 and the tapered ring D32. Accordingly, a sliding part is not needed to be directly provided in the base block D34. This leads to an advantage that the main positioning insert part of the main positioning unit 20 and the auxiliary positioning insert part of the auxiliary positioning unit 30 use common components.

Since the sliding part is provided blow the auxiliary positioning insert part, needless to say, it can contribute to downsizing of the auxiliary positioning insert part.

(5-4) In the positioning device 10 of the work 15, corresponding to the invention described in (8), provided with the main positioning unit 20 and the auxiliary positioning unit 30 placed to protrude on the reference plane 11a, to determine the position of the work 15 by inserting the main positioning unit 20 into the main positioning hole 16 formed in the work 15 and inserting the auxiliary positioning unit 30 in the auxiliary positioning hole 17 formed in the work 15, the main positioning unit 20 includes the insert shaft D21 and the tapered ring D22 which have the circular outer peripheral shapes, to be inserted into the main positioning hole 16, the auxiliary positioning unit 30 includes the outer block D38 formed with at least two first rolling contact surfaces D38b opposing each other and parallel with the center straight line CL joining the main positioning unit 20 and the auxiliary positioning unit 30, the slide block D37 formed with the second rolling contact surfaces D37e formed in parallel with the center straight line CL and in correspondence with the first rolling contact surfaces D38b of the outer block D38, and the insert shaft D31 and the tapered ring D32 each of which has the circular outer peripheral shape to be inserted into the auxiliary positioning hole 17 and are placed above the slide block D37. Accordingly, the positioning device 10 capable of providing the same effects as the positioning method described in (5-1) can be provided.

(5-5) In the positioning device 10 of the work 15 described in (5-4), corresponding to the invention described in (9), the auxiliary positioning unit 30 includes the tapered ring D32 which will contact with the auxiliary positioning hole 17 and the base block D34 having the tapered outer peripheral surface contacting with the tapered ring D32. While the tapered ring D32 is inserted in the auxiliary positioning hole 17 of the work 15, the tapered ring D32 is moved in parallel in an axis direction of the auxiliary positioning unit 30 to come into contact with and press against the inner surface of the auxiliary positioning hole 17. Accordingly, the positioning device 10 capable of providing the same effects as the positioning method described in (5-2) can be provided.

(5-6) In the positioning device 10 of the work 15 described in (5-4) or (5-5), corresponding to the invention described in (12), the sliding part including the second rolling contact surfaces D37e is formed in the slide block D37 placed in the outer block D38, and the slide block D37 holds the base block D34 including the insert shaft D31 and the tapered ring D32. Accordingly, the positioning device 10 capable of providing the same effects as the positioning method described in (5-3) can be provided.

Sixth Embodiment

Next, the configuration of a sixth embodiment will be described.

A positioning device 10 in the sixth embodiment has the same configuration as that in the first embodiment, except for the main positioning unit 20 and the auxiliary positioning unit 30 in the fifth embodiment. The following explanation is given to the auxiliary positioning unit 30.

Figure 16A:
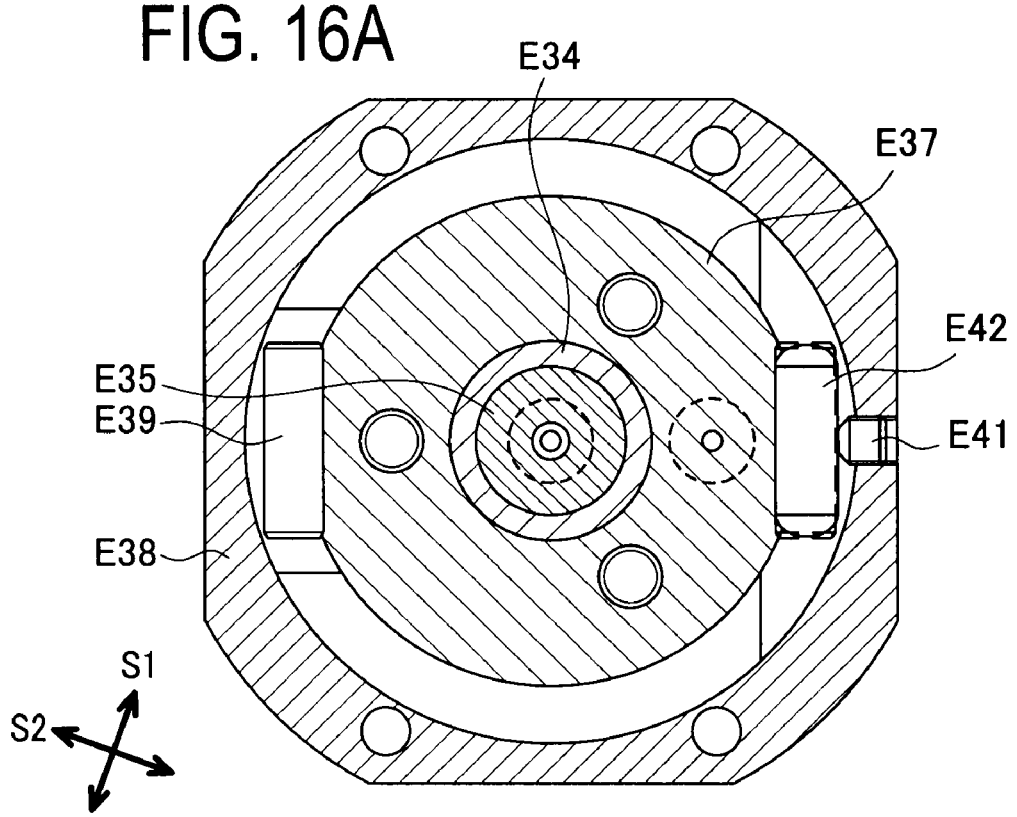
FIG. 16A is a sectional view of an auxiliary positioning unit 30 in a sixth embodiment, taken along a line K-L in FIG. 16B.
Figure 16B:
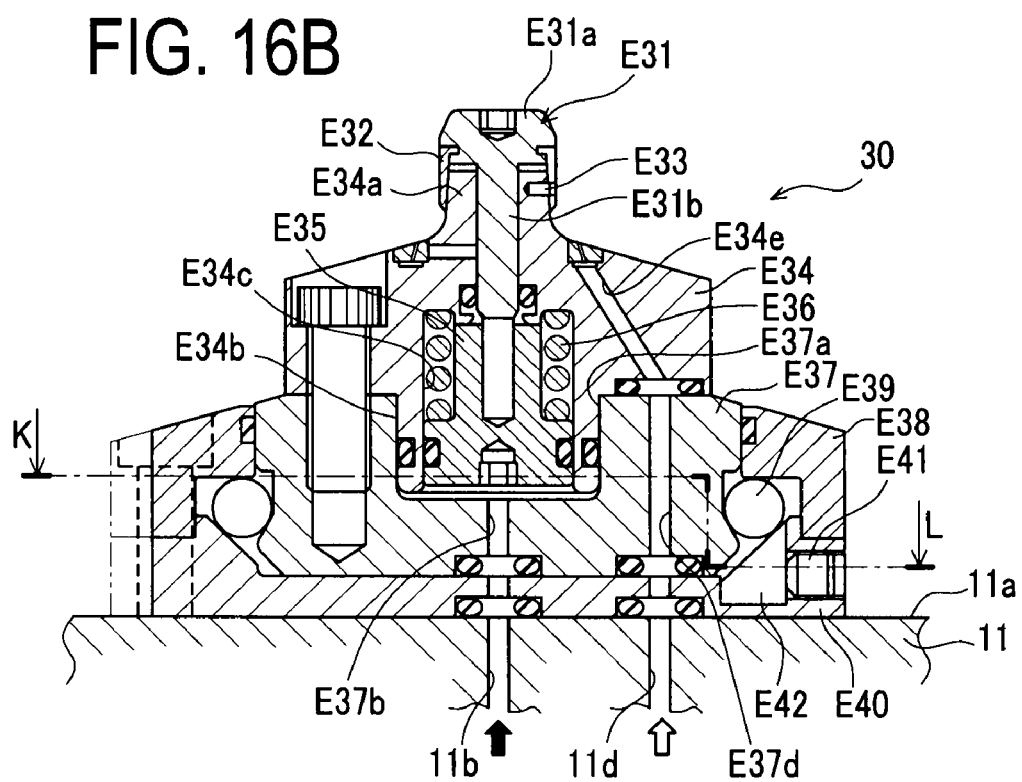
FIG. 16B is a sectional view of the auxiliary positioning unit 30 in the sixth embodiment, corresponding to a view taken along the line B-B in FIG. 1.

FIG. 16A is a sectional view of the auxiliary positioning unit 30 in the sixth embodiment, taken along a line K-L in FIG. 16B. FIG. 16B is a sectional view of the auxiliary positioning unit 30 corresponding to a view taken along the line B-B in FIG. 1.

The auxiliary positioning unit 30 includes an insert shaft E31, a tapered ring E32, a base block E34, a piston E35, a slide block E37, an outer upper block E38, an outer lower block E40, and others.

The auxiliary positioning unit 30 in the sixth embodiment and the main positioning unit 20 and the auxiliary positioning unit 30 in the fifth embodiment have some common components. As to the insert shaft D21 and the insert shaft E31; the tapered ring D22 and the tapered ring E32; the pin D23 and a pin E33; the base block D24 and the base block E34; the piston D25 and the piston E35; the pressure spring D26 and a pressure spring E36; they have the same function in each pair. The explanation thereof is therefore omitted. The insert shaft E31 and the tapered ring E32 of the auxiliary positioning unit 30 correspond to the auxiliary positioning insert part.

The slide block E37 is formed with a fitting recess E37a in which a block fitting part E34b formed in the base block E34 is fitted as in the spacer block D27 of the main positioning unit 20 in the fifth embodiment.

The slide block E37 are formed with first sliding surfaces opposed to each other and formed in parallel with the center straight line CL and in correspondence with a second smooth surface. The second sliding surfaces formed in the outer upper block E38, the third sliding surfaces of the outer lower block E40, and the third sliding surfaces formed in an adjustment block E42 are allowed to contact with and slide on each rod E39. Those sliding surfaces correspond to a first smooth surface.

The rods E39 correspond to the balls D33 in the fifth embodiment and is formed so that the smoothly formed surface of the rod E39 slides on each sliding surface of the slide block E37, the outer upper block E38, the outer lower block E40, and the adjustment block E42, thereby allowing the slide block E37 to smoothly move in parallel. Each sliding surface is parallel with the center straight line CL.

By the adjustment block E42 and an adjustment screw E41 that presses against one surface of the adjustment block E42, the rod E39 can change contact pressure on each of the sliding surfaces.

The slide block E37 is further formed with a first oil feed passage E37b, a second oil feed passage E37c not shown, and an air supply passage E37d. Those passages act in the same way as those in the fifth embodiment.

When the auxiliary positioning unit 30 configured as above is supplied, as with the auxiliary positioning unit 30 in the fifth embodiment, with oil through the first oil feed passage 11b or the second supply passage 11c formed in the reference block 11 as in the main positioning unit 20, the piston E35 is moved downward/upward, thereby expanding and contracting the tapered ring E32. The tapered ring E32 which is expanded and contracted can eliminate a clearance with respect to the auxiliary positioning hole 17 in the work 15.

Since the auxiliary positioning unit 30 is provided with the slide block E37, the outer upper block E38, the adjustment block E42, and respective sliding surfaces, the insert shaft E31 and the tapered ring E32 serving as the auxiliary positioning insert part of the auxiliary positioning unit 30 can be moved in parallel toward the main positioning unit 20. The positioning device 10 in the sixth embodiment configured as above can provide the following operations and effects.

The effects of the sixth embodiment are basically the same as those in the first embodiment. By using the positioning device 10 in the sixth embodiment, the work 15 can be accurately positioned in place relative to the main positioning unit 20. This is because when the slide block E37 of the auxiliary positioning unit 30 is moved on the center straight line CL with respect to the outer upper block E38 and the outer lower block E40, a pitch error of the hole-to-hole P is absorbed, thereby correcting a deviation in a θ direction.

In the positioning device 10 in the sixth embodiment, as in the fifth embodiment, the main positioning unit 20 and the auxiliary positioning unit 30 use common components. The sliding mechanism of the auxiliary positioning unit 30 is achieved by the slide block E37, the outer upper block E38, and the outer lower block E40. Thus, the positioning device 10 can be realized at low cost.

If the number of common components between the main positioning unit 20 and the auxiliary positioning unit 30 is increased, maintenance can be enhanced. A difference between the fifth embodiment and the sixth embodiment is whether the balls D33 or the rods E39 is used as the sliding mechanism.

In the sixth embodiment, the rod E39 is used and the pressure of the rod E39 is given by the adjustment block E42 and the adjustment screw E41 and is easily adjustable. In the fifth embodiment, on the other hand, the size of the ball D39 needs to be changed and the pressure has to be controlled during manufacture.

The pressure can be adjusted by the adjustment block E42 and the adjustment screw E41, so that a user can arbitrarily adjust it, not at the time of factory shipment.

As explained above, the sixth embodiment can provide the following configurations, operations, and effects.

(6-1) In the positioning method of the work 15, corresponding to the invention described in (1), provided with the main positioning unit 20 and the auxiliary positioning unit 30 placed to protrude on the reference plane 11a, to determine the position of the work 15 by inserting the main positioning unit 20 into the main positioning hole 16 formed in the work 15 and inserting the auxiliary positioning unit 30 into the auxiliary positioning hole 17 formed in the work 15, the main positioning unit 20 includes the insert shaft D21 and the tapered ring D22 each of which has the circular outer peripheral shape to be inserted into the main positioning hole 16, the auxiliary positioning unit 30 includes the outer upper block E38, the outer lower block E40, and the adjustment block E41, each of which is formed with at least two opposing first smooth surfaces parallel with the center straight line CL joining the main positioning unit 20 and the auxiliary positioning unit 30, the slide block E37 formed with the second smooth surfaces formed in parallel with the center straight line CL and in correspondence with the first smooth surfaces of the outer upper block E38, the outer lower block E40, and the adjustment block E41, and the insert shaft E31 and the tapered ring E32 each of which has the circular outer peripheral shape to be inserted into the auxiliary positioning hole 17 and are placed above the slide block E37. When the work 15 is to be positioned in place, the insert shaft D21 and the tapered ring D22 of the main positioning unit 20 are inserted into the main positioning hole 16, and the slide block E37 of the auxiliary positioning unit 30 is moved guided by the first smooth surfaces through the rods E39 and moved on the center straight line CL to absorb a pitch error between the main positioning hole 16 and the auxiliary positioning hole 17, so that the insert shaft E31 and the tapered ring E32 are inserted into the auxiliary positioning hole 17.

Accordingly, the auxiliary positioning unit 30 can be moved on the center straight line CL joining the auxiliary positioning unit 30 and the main positioning unit 20. It is therefore possible to absorb the pitch error of the hole-to-hole P between the main positioning hole 16 and the auxiliary positioning hole 17 of the work 15 without imposing an unnecessary burden on the main positioning unit 20.

Furthermore, the insert shaft E31 and the tapered ring E32 of the auxiliary positioning unit 30 internally include no sliding mechanism and therefore can have a simple internal structure. Thus, the insertion part with a small diameter can be realized while maintaining rigidity.

(6-2) In the positioning method of the work 15 described in (6-1), corresponding to the invention described in (2), the auxiliary positioning unit 30 includes the tapered ring E32 which will contact with the inner surface of the auxiliary positioning hole 17 and the base block E34 provided with the tapered outer peripheral surface contacting with the tapered ring E32. While the tapered ring E32 is inserted in the auxiliary positioning hole 17 of the work 15, the tapered ring E32 is moved in parallel in an axis direction of the auxiliary positioning unit 30 to come into contact with and press against the inner surface of the auxiliary positioning hole 17. Thus, the auxiliary positioning unit 30 can additionally have the inner-diameter holding function for the auxiliary positioning hole 17.

The main positioning unit 20 and the auxiliary positioning unit 30 are additionally provided with the inner-diameter holding function with respect to respective positioning holes, so that positioning accuracy can be enhanced.

(6-3) In the positioning method of the work 15 described in (6-1) or (6-2), corresponding to the invention described in (5), the sliding part including the second smooth surfaces is formed in the slide block E37 placed in the outer upper block E38 and the outer lower block E40, and the slide block E37 holds the base block E34 including the insert shaft E31 and the tapered ring E32. Accordingly, a sliding part is not needed to be directly provided in the base block E34. This leads to an advantage that the main positioning insert part of the main positioning unit 20 and the auxiliary positioning insert part of the auxiliary positioning unit 30 use common components.

Since the sliding part is provided below the auxiliary positioning insert part, needless to say, it can contribute to downsizing of the auxiliary positioning insert part.

(6-4) In the positioning device 10 of the work 15, corresponding to the invention described in (8), provided with the main positioning unit 20 and the auxiliary positioning unit 30 placed to protrude on the reference plane 11a, to determine the position of the work 15 by inserting the main positioning unit 20 into the main positioning hole 16 formed in the work 15 and inserting the auxiliary positioning unit 30 in the auxiliary positioning hole 17 formed in the work 15, the main positioning unit 20 includes the insert shaft E21 and the tapered ring E22 which have the circular outer peripheral shapes, to be inserted into the main positioning hole 16, the auxiliary positioning unit 30 includes the outer upper block E38, the outer lower block E40, and the adjustment block E41, each of which is formed with at least two opposing first smooth surfaces parallel with the center straight line CL joining the main positioning unit 20 and the auxiliary positioning unit 30, the slide block E37 formed with the second smooth surfaces formed in parallel with the center straight line CL and in correspondence with the first smooth surfaces of the outer upper block E38, the outer lower block E40, and the adjustment block E41, and the insert shaft E31 and the tapered ring E32 each of which has the circular outer peripheral shape to be inserted into the auxiliary positioning hole 17 and are placed above the slide block E37. Accordingly, the positioning device 10 capable of providing the same effects as in the positioning method described in (6-1) can be provided.

(6-5) In the positioning device 10 of the work 15 described in (6-4), corresponding to the invention described in (9), the auxiliary positioning unit 30 includes the tapered ring E32 which will contact with the auxiliary positioning hole 17 and the base block E34 having the tapered outer peripheral surface contacting with the tapered ring E32. While the tapered ring E32 is inserted in the auxiliary positioning hole 17 of the work 15, the tapered ring E32 is moved in parallel in an axis direction of the auxiliary positioning unit 30 to come into contact with and press against the inner surface of the auxiliary positioning hole 17. Accordingly, the positioning device 10 capable of providing the same effects as the positioning method described in (6-2) can be provided.

(6-6) In the positioning device 10 of the work 15 described in (6-4) or (6-5), corresponding to the invention described in (12), the sliding part including the second smooth surfaces is formed in the slide block E37 placed in the outer upper block E38 and the outer lower block E40, and the adjustment block E42, and the slide block E37 holds the base block E34 including the insert shaft E31 and the tapered ring E32. Accordingly, the positioning device 10 capable of providing the same effects as the positioning method described in (6-3) can be provided.

Seventh Embodiment

Next, the configuration of a seventh embodiment will be described.

A positioning device 10 in the seventh embodiment has the same configuration as that in the fifth embodiment, except for the auxiliary positioning unit 30. The following explanation is given to the auxiliary positioning unit 30.

Figure 17A:
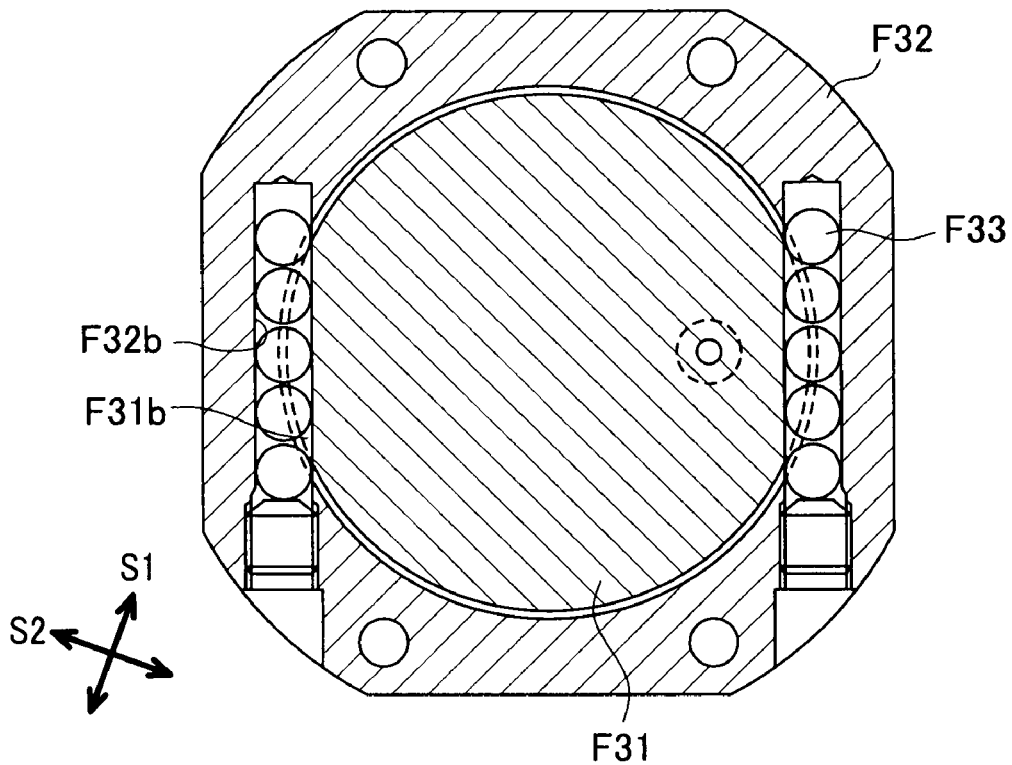
FIG. 17A is a sectional view of an auxiliary positioning unit 30 in a seventh embodiment, taken along a line M-M in FIG. 17B.
Figure 17B:
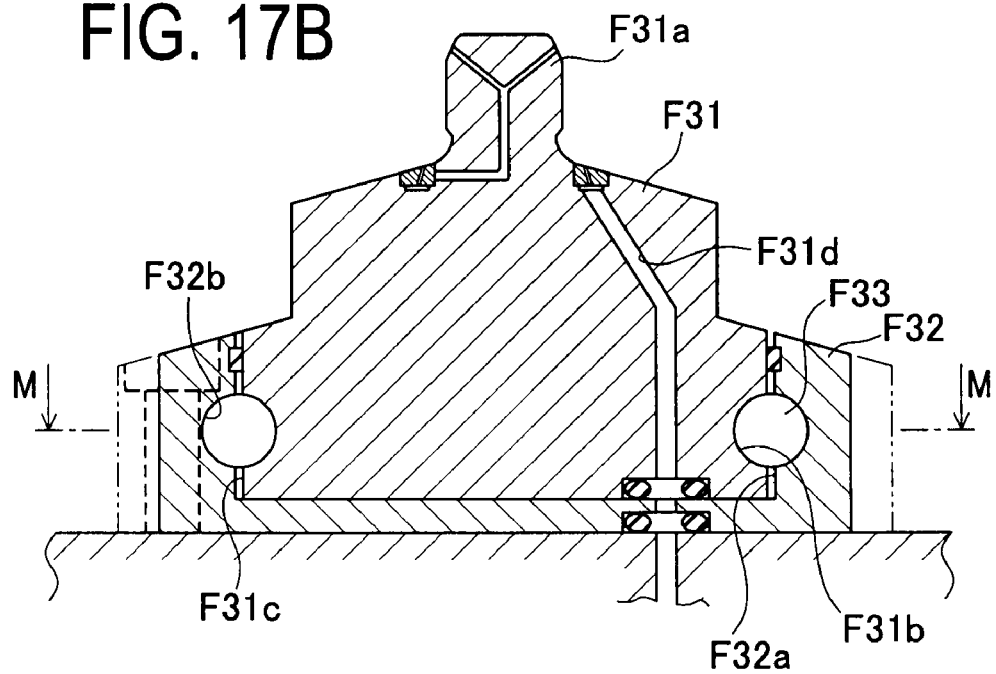
FIG. 17B is a sectional view of the auxiliary positioning unit 30 in the seventh embodiment, corresponding to a view taken along the line B-B in FIG. 1.
Figure 19:
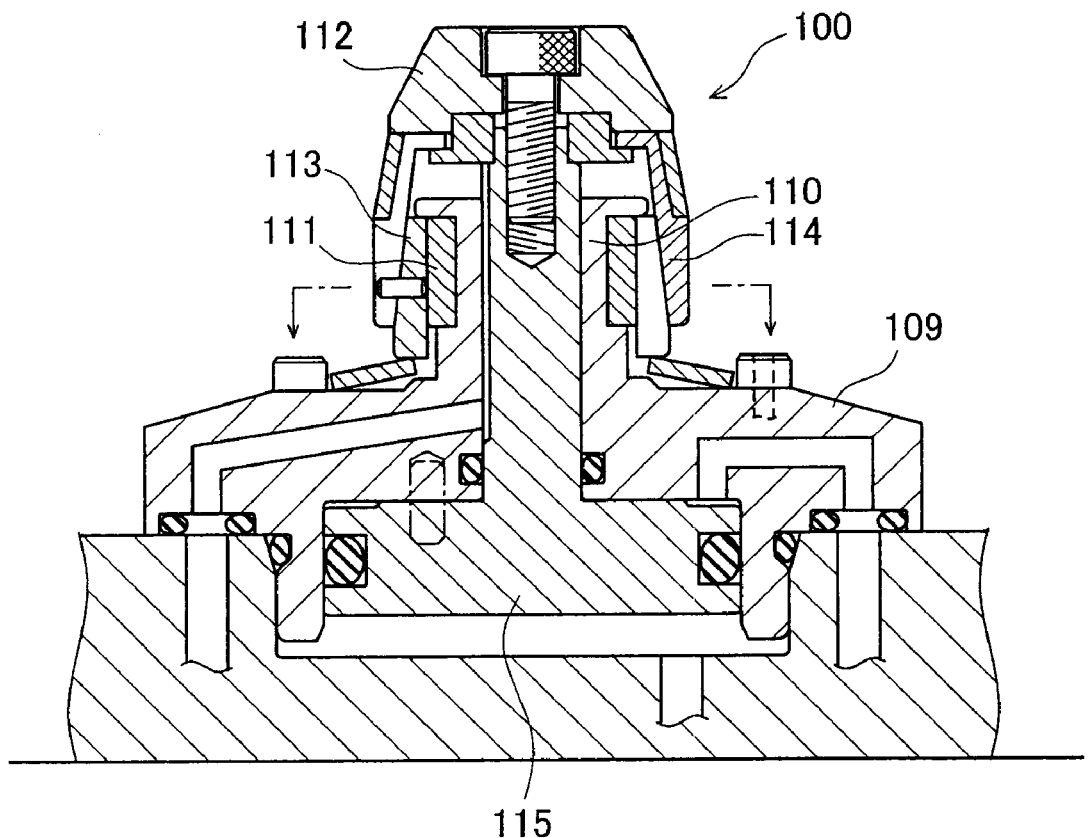
FIG. 19 is a vertical sectional view of an auxiliary knock pin 100 in Patent Literature 5.
Figure 20:
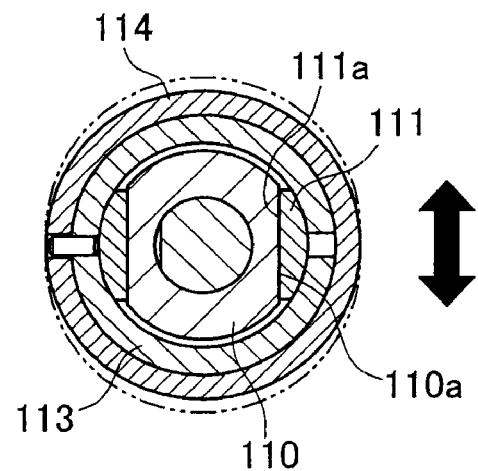
FIG. 20 is a horizontal sectional view of a part of the auxiliary knock pin 100 to be inserted into a work in Patent Literature 5.

FIG. 17A is a sectional view of the auxiliary positioning unit 30 in the seventh embodiment, taken along a line M-M in FIG. 17B. FIG. 17B is a sectional view of the auxiliary positioning unit 30 corresponding to a view taken along the line B-B in FIG. 1.

The auxiliary positioning unit 30 includes an insert block F31, an outer block F32, and others. The outer block F32 has the same function as the outer block D38 in the fifth embodiment and the explanation thereof is omitted.

The insert block F31 includes an insert part F31a to be inserted into the auxiliary positioning hole 17 of the work 15 and an inserted part F31c inserted into a holding groove F32a formed in the outer block F32.

The insert block F31 is formed with second rolling contact surfaces F31b for holding balls F33 in cooperation with first rolling contact surfaces F32b. The insert block F31 is further formed with an air supply passage F31d communicating with the air supply passage 11d formed in the reference block 11. The air supply passage F31d also communicates with a leading end of the insert part F31a to blow air into the main positioning hole 16 and the auxiliary positioning hole 17.

The inserted part F31c of the insert block F31 is provided, on an outer periphery, with a seal member for the purpose of sliding and sealing.

Since the auxiliary positioning unit 30 configured as above, the insert block F31 can be moved in parallel along the center straight line CL. This is because the outer block F32 is formed in parallel with the center straight line CL and the insert block F31 is supported by the second rolling contact surfaces F31b through the balls F33.

The positioning device 10 in the seventh embodiment configured as above can provide the following operations and effects.

The seventh embodiment omits the expanding and contracting function of the auxiliary positioning unit 30 as compared with the first embodiment, the seventh embodiment can provides an effect of a cost reduction by just that much. By using the positioning device 10 in the seventh embodiment, the work 15 can be accurately positioned in place relative to the main positioning unit 20. Specifically, the insert block F31 of the auxiliary positioning unit 30 can be moved on the center straight line CL with respect to the outer block F32 to absorb a pitch error of the hole-to-hole P, thereby correcting a deviation in the θ direction.

The seventh embodiment explained as above can provide the following configurations, operations, and effects.

(7-1) In the positioning method of the work 15, corresponding to the invention described in (1), provided with the main positioning unit 20 and the auxiliary positioning unit 30 placed to protrude on the reference plane 11a, to determine the position of the work 15 by inserting the main positioning unit 20 into the main positioning hole 16 formed in the work 15 and inserting the auxiliary positioning unit 30 into the auxiliary positioning hole 17 formed in the work 15, the main positioning unit 20 includes the insert part F31a having the circular outer peripheral shape to be inserted into the main positioning hole 16, the auxiliary positioning unit 30 includes the outer block F32 formed with at least two opposing first rolling surfaces F32b parallel with the center straight line CL joining the main positioning unit 20 and the auxiliary positioning unit 30, the insert block F31 provided with the second rolling contact surfaces F31b formed in parallel with the center straight line CL and in correspondence with the first rolling contact surfaces F32b of the outer block F32, and the insert part F31a provided in an upper portion of the insert block F31, the insert part F31a having the circular outer shape to be inserted into the auxiliary positioning hole 17. When the work 15 is to be positioned in place, the insert shaft D21 and the tapered ring D22 of the main positioning unit 20 are inserted into the main positioning hole 16, and the slide block E37 of the auxiliary positioning unit 30 and the insert block F31 of the auxiliary positioning unit 30 is moved on the center straight line CL to absorb a pitch error between the main positioning hole 16 and the auxiliary positioning hole 17, so that the insert shaft E31 and the tapered ring E32 are inserted into the auxiliary positioning hole 17.

Accordingly, the auxiliary positioning unit 30 can be moved on the center straight line CL joining the auxiliary positioning unit 30 and the main positioning unit 20. It is therefore possible to absorb the pitch error of the hole-to-hole P between the main positioning hole 16 and the auxiliary positioning hole 17 of the work 15 without imposing an unnecessary burden on the main positioning unit 20.

Furthermore, the insert part F31a of the auxiliary positioning unit 30 internally includes no sliding mechanism and therefore can have a simple internal structure. Thus, the insertion part with a small diameter can be realized while maintaining rigidity.

(7-2) In the positioning method of the work 15, corresponding to the invention described in (8), provided with the main positioning unit 20 and the auxiliary positioning unit 30 placed to protrude on the reference plane 11a, to determine the position of the work 15 by inserting the main positioning unit 20 into the main positioning hole 16 formed in the work 15 and inserting the auxiliary positioning unit 30 into the auxiliary positioning hole 17 formed in the work 15, the main positioning unit 20 includes the insert part F31a having the circular outer peripheral shape to be inserted into the main positioning hole 16, the auxiliary positioning unit 30 includes the outer block F32 formed with at least two opposing first rolling surfaces F32b parallel with the center straight line CL joining the main positioning unit 20 and the auxiliary positioning unit 30, the insert block F31 provided with the second rolling contact surfaces F31b formed in parallel with the center straight line CL and in correspondence with the first rolling contact surfaces F32b of the outer block F32, and the insert part F31a provided in the upper portion of the insert block F31. Accordingly, the positioning device 10 capable of providing the same effects as the positioning method described in (7-1) can be provided.

Eighth Embodiment

Next, the configuration of an eighth embodiment will be described.

A positioning device 10 in the eighth embodiment has the same configuration as that in the fifth embodiment, except for the auxiliary positioning unit 30.

Thus, the following explanation is given to the auxiliary positioning unit 30.

FIG. 18A is a sectional view of the auxiliary positioning unit 30 in the eighth embodiment, taken along a line N-N in FIG. 18B. FIG. 18B is a sectional view of the auxiliary positioning unit 30 corresponding to a view taken along the line B-B in FIG. 1. FIG. 18C is an enlarged view of a part X in FIG. 18A.

The auxiliary positioning unit 30 includes an insert shaft G31, a tapered ring G32, a base block G34, a piston G35, and others.

The insert shaft G31 is constituted of a leading end part G31a and a shaft part G31b formed coaxially with the leading end part G31a having a trapezoidal vertical section.

The tapered ring G32 is a circular tapered component having a nearly C-shaped cross section attached to a lower portion of the leading end part G31a of the insert shaft G31. The tapered ring G32 is therefore allowed to expand and contract in a radial direction.

The tapered ring G32 is formed with two sliding surfaces G32a. These sliding surfaces G32a are parallel with the center straight line CL and opposed to each other and respectively located at 90° from the slit of the tapered ring G32.

The base block G34 is formed with a tapered protrusion G34a and a base fitting part G34b that is fitted for positioning in a fitting hole formed in the reference block 11. The base fitting part G34b is formed, on both sides, with two holding smooth surfaces G34e parallel with the center straight line CL. These two holding smooth surfaces G34e are formed to protrude from the outer periphery of the tapered protrusion G34a and opposed to each other. The tapered protrusion G34a in the base block G34 is formed in a tapered shape expanding to the bottom. The holding smooth surfaces G34e contact with the sliding surfaces G32a.

The tapered protrusion G34a is provided with a pin G33 in parallel with the center straight line CL to hold the tapered ring G32 against rotation.

The base fitting part G34b is internally formed with a cylindrical sliding surface G34c on which the piston G35 slides. The upper end of the piston G35 threadedly engages the insert shaft G31. When oil is supplied to an oil feed passage G34d formed in the base block G34, the piston G35 is moved downward.

The piston G35 is formed in a columnar shape and is provided, in the outer periphery, with an O-ring which is slidable on the cylindrical sliding surface G34c and serves as a seal.

When the auxiliary positioning unit 30 configured as above is supplied, as with the auxiliary positioning unit 30 in the first embodiment, with oil through the second supply passage 11c, applying oil pressure to the oil feed passage G34d, the piston G35 is moved downward from a position in FIG. 18B. The insert shaft G31 threadedly engaging the piston G35 is moved downward in association with downward movement of the piston G35. As a result, the tapered ring G32 provided in the insert shaft G31 is expanded in diameter along the holding smooth surface G34e of the base block G34.

When the tapered ring G32 is expanded in diameter, the outer surface of the tapered ring G32 comes to press against the inner surface of the auxiliary positioning hole 17 of the work 15. By outwardly expanding the diameter, the tapered ring G32 can eliminate the clearance between the main positioning hole 16 and the auxiliary positioning unit 30.

Since the auxiliary positioning unit 30 is provided with the sliding surfaces G32a and the tapered protrusion G34a, the insert shaft G31 and the tapered ring G32 serving as the auxiliary positioning insert part of the auxiliary positioning unit 30 can be moved in parallel toward the main positioning unit 20 in accordance with the hole-to-hole P of the work 15.

The positioning device 10 configured as above in the eighth embodiment can provide the following operations and effects.

The effects of the eighth embodiment are basically the same as those in the first embodiment. By using the positioning device 10 in the eighth embodiment, the work 15 can be accurately positioned in place relative to the main positioning unit 20. This is because the auxiliary positioning unit 30 can be adjusted along the center straight line CL to correct a deviation in the θ direction.

When the hole 18 to be machined in the work 15 is designed with reference to the main positioning hole 16, the deviation in the θ direction can be restricted by the auxiliary positioning unit 30 with reference to the main positioning unit 20 of the positioning device 10, so that the hole 18 can be machined in the work 15.

Differently from other embodiments, the tapered ring G32 has the sliding surfaces G32a and the base block G34 has the holding smooth surfaces G34e so that the sliding surfaces G32a and the holding smooth surfaces G34e slide on each other to move in parallel toward the main positioning unit 20 located on the center straight line CL.

Specifically, the smooth surfaces are directly formed in the tapered ring G32, so that downsizing of the components can be achieved and the number of components can be reduced.

The configuration disclosed in Patent Literature 5 can have the same function as above; however it has a complicated structure, low rigidity, and an increased number of components, and hence accuracy control would be difficult.

As described in the eighth embodiment, when the smooth surfaces are integrally formed in the tapered ring G32, the tapered ring G32 can have two functions, i.e., a sliding function and an expanding and contracting function. This contributes to a reduction in the number of components and downsizing of components.

Furthermore, since the pin G33 is placed on the center straight line CL, the tapered ring G32 is allowed to slide without interference.

The tapered ring G32 is symmetric with respect to the sliding direction and therefore can be uniformly deformed, resulting in high positioning accuracy.

The eighth embodiment as explained above can provide the following configurations, operations, and effects.

(8-1) In the positioning method of the work 15, corresponding to the invention described in (7), provided with the main positioning unit 20 and the auxiliary positioning unit 30 placed to protrude on the reference plane 11*a*, to determine the position of the work 15 by inserting the main positioning unit 20 and the auxiliary positioning unit 30 placed on the reference plane 11*a* into the main positioning hole 16 and the auxiliary positioning hole 17 formed in the work 15, the main positioning unit 20 includes the main positioning insert part having the circular outer peripheral shape to be inserted into the main positioning hole 16, the auxiliary positioning unit 30 includes the base block G34 formed with two opposing holding smooth surfaces G34*e* parallel with the center straight line CL joining the main positioning unit 20 and the auxiliary positioning unit 30, and the insert shaft G31 and the tapered ring G32 having the circular outer peripheral shape to be inserted into the auxiliary positioning hole 17 and including, in the inner surface, the sliding surfaces G32*a* which contact with the holding smooth surfaces G34*e* of the base block G34. When the work is to be positioned in place, the main positioning insert part of the main positioning unit 20 is inserted into the main positioning hole 16, and the insert shaft G31 and the tapered ring G32 of the auxiliary positioning unit 30 are guided by the holding smooth surfaces G34*e* and moved on the center straight line CL to absorb a pitch error between the main positioning hole 16 and the auxiliary positioning hole 17, so that the insert shaft G31 and the tapered ring G32 are inserted into the auxiliary positioning hole 17.

Accordingly, the auxiliary positioning unit 30 can be moved on the center straight line CL joining the auxiliary positioning unit 30 and the main positioning unit 20. It is therefore possible to absorb the pitch error of the hole-to-hole P between the main positioning hole 16 and the auxiliary positioning hole 17 of the work 15 without imposing an unnecessary burden on the main positioning unit 20.

Furthermore, the insert shaft G31 and the tapered ring G32 of the auxiliary positioning unit 30 internally include no sliding mechanism and therefore can have a simple internal structure. Thus, the insertion part with a small diameter can be realized while maintaining rigidity.

(8-2) In the positioning method of the work 15, corresponding to the invention described in (14), provided with the main positioning unit 20 and the auxiliary positioning unit 30 placed to protrude on the reference plane 11*a*, to determine the position of the work 15 by inserting the main positioning unit 20 and the auxiliary positioning unit 30 placed on the reference plane 11*a* into the main positioning hole 16 and the auxiliary positioning hole 17 formed in the work 15, the main positioning unit 20 includes the main positioning insert part having the circular outer peripheral shape to be inserted into the main positioning hole 16, the auxiliary positioning unit 30 includes the base block G34 formed with two opposing holding smooth surfaces G34*e* parallel with the center straight line CL joining the main positioning unit 20 and the auxiliary positioning unit 30, and the insert shaft G31 and the tapered ring G32 having the circular outer periphery to be inserted into the auxiliary positioning hole 17 and including, in the inner surface, the sliding surfaces G32*a* which contact with the holding smooth surfaces G34*e* of the base block G34.

Accordingly, the positioning device 10 capable of providing the same effects as in the positioning method described in (8-1) can be provided.

The present invention is explained along the embodiments, but it not limited thereto and may be embodied in other specific forms without departing from the essential characteristics thereof.

For instance, the materials used in the first to eighth embodiments are not particularly limited and may be appropriately changed as needed. Their shapes also may be changed appropriately without departing from the scope.

INDUSTRIAL APPLICABILITY

When a work is to be machined by a machine tool, the present invention can be utilized for positioning the work with respect to the machine tool.

The invention claimed is:

1. A work positioning method comprising a main positioning means and an auxiliary positioning means placed to protrude on a reference plane to determine a position of a work by inserting the main positioning means into a main positioning hole formed in the work and inserting the auxiliary positioning means into an auxiliary positioning hole formed in the work, wherein the main positioning means includes a main positioning insert part having a circular outer peripheral shape to be inserted in the main positioning hole, the auxiliary positioning means includes:
　　a base block member formed with at least two first smooth surfaces opposing each other and parallel with a straight line joining the main positioning means and the auxiliary positioning means;
　　a sliding part formed with second smooth surfaces in parallel with the straight line and in correspondence with the first smooth surfaces of the base block; and
　　an auxiliary positioning insert part provided above the sliding part, the auxiliary positioning insert part having a circular outer peripheral shape to be inserted into the auxiliary positioning hole, wherein when the work is to be positioned, the main positioning insert part of the main positioning means is inserted into the main positioning hole, and the sliding part of the auxiliary positioning means is guided by the first smooth surfaces to move on the straight line to absorb a pitch error between the main positioning hole and the auxiliary positioning hole, and the auxiliary positioning insert part is inserted into the auxiliary positioning hole, wherein when the auxiliary positioning insert part is inserted into the auxiliary positioning hole to position the work, the sliding part is not inserted in the auxiliary positioning hole.

2. The work positioning method according to claim 1, wherein the auxiliary positioning means comprises:
　an inner-diameter holding member which will contact with an inner surface of the auxiliary positioning hole; and
　a diameter adjusting part provided with a tapered surface contacting with the inner-diameter holding member, wherein while the auxiliary positioning insert part is inserted in the auxiliary positioning hole of the work, the diameter adjusting part or the inner-diameter holding member is moved in parallel in an axis direction of the auxiliary positioning means to cause the inner-diameter holding member to contact with and press against the inner surface of the auxiliary positioning hole.

3. The work positioning method according to claim 2, wherein
the inner-diameter holding member will contact with the inner surface of the auxiliary positioning hole at three or more points.

4. The work positioning method according to claim 1, wherein
the sliding part including the second smooth surfaces is formed in a slide block placed in the base block member, and
the slide block holds an insert part block including the auxiliary positioning insert part.

5. The work positioning method according to claim 1, wherein
an air supply passage is connected to the sliding part to prevent foreign substances from entering between the first smooth surface and the second smooth surface.

6. The work positioning method according to claim 1, wherein a distance between the second smooth surfaces in a direction perpendicular to the straight line is greater than a diameter of the circular outer shape of the auxiliary positioning insert part.

7. A work positioning method comprising a main positioning means and an auxiliary positioning means placed to protrude on a reference plane to determine a position of the work by inserting the main positioning means into a main positioning hole formed in the work and inserting the auxiliary positioning means into an auxiliary positioning hole formed in the work,
wherein the main positioning means includes a main positioning insert part having a circular outer peripheral shape to be inserted in the main positioning hole, the auxiliary positioning means includes:
a base block member formed, on a protrusion, with at least two first smooth surfaces opposing each other and parallel with a straight line joining the main positioning means and the auxiliary positioning means; and
an auxiliary positioning insert part having a circular outer peripheral shape to be inserted into the auxiliary positioning hole,
wherein the auxiliary positioning insert part is attached to cover the protrusion of the base block member, the auxiliary positioning insert part being formed, in an inner surface, with second smooth surfaces contacting with the first smooth surfaces of the base block member,
wherein when the work is to be positioned,
the main positioning insert part of the main positioning means is inserted into the main positioning hole, and
the auxiliary positioning insert part of the auxiliary positioning means is guided by the first smooth surfaces to move on the straight line to absorb a pitch error between the main positioning hole and the auxiliary positioning hole, and the auxiliary positioning insert part is inserted into the auxiliary positioning hole,
wherein a distance between the second smooth surfaces in a direction perpendicular to the straight line is greater than a diameter of the circular outer shape of the auxiliary positioning insert part.

8. A work positioning device comprising, on a reference plane, a main positioning means to be inserted into a main positioning hole formed in a work and an auxiliary positioning means to be inserted into an auxiliary positioning hole formed in the work,
wherein
the main positioning means includes a main positioning insert part having a circular outer peripheral shape to be formed in the main positioning hole,
the auxiliary positioning means includes:
a base block member formed with at least two first smooth surfaces opposing each other and parallel with a straight line joining the main positioning means and the auxiliary positioning means;
a sliding part provided with second smooth surfaces formed in correspondence with the first smooth surfaces of the base block member and in parallel with the straight line, the sliding part being guided by the first smooth surfaces to move on the straight line; and
an auxiliary positioning insert part provided above the sliding part, the auxiliary positioning insert part having a circular outer peripheral shape to be inserted into the auxiliary positioning hole,
wherein when the auxiliary positioning insert part is inserted into the auxiliary positioning hole to position the work, the sliding part is not inserted in the auxiliary positioning hole.

9. The work positioning device according to claim 8, wherein the auxiliary positioning means comprises:
an inner-diameter holding member which will contact with an inner surface of the auxiliary positioning hole; and
a diameter adjusting part provided with a tapered surface contacting with the inner-diameter holding member, and
wherein while the auxiliary positioning insert part is inserted in the auxiliary positioning hole of the work, the diameter adjusting part or the inner-diameter holding member is moved in parallel in an axis direction of the auxiliary positioning means to cause the inner-diameter holding member to contact with and press against the inner surface of the auxiliary positioning hole.

10. The work positioning device according to claim 9, wherein
the inner-diameter holding member will contact with the inner surface of the auxiliary positioning hole at three or more points.

11. The work positioning device according to claim 8, wherein
the sliding part including the second smooth surfaces is formed in a slide block placed in the base block member, and
the slide block holds the insert part block including the auxiliary positioning insert part.

12. The work positioning device according to claim 8, wherein
an air supply passage is connected to the sliding part to prevent foreign substances from entering between the first smooth surface and the second smooth surface.

13. The work positioning device according to claim 8, wherein a distance between the second smooth surfaces in a direction perpendicular to the straight line is greater than a diameter of the circular outer shape of the auxiliary positioning insert part.

14. A work positioning device comprising, on a reference plane, a main positioning means to be inserted into a main positioning hole formed in a work and an auxiliary positioning means to be inserted into an auxiliary positioning hole formed in the work,
wherein
the main positioning means includes a main positioning insert part having a circular outer peripheral shape to be formed in the main positioning hole,
the auxiliary positioning means includes:

a base block member formed, formed on a protrusion, with at least two first smooth surfaces opposing each other and parallel with a straight line joining the main positioning means and the auxiliary positioning means; and an auxiliary positioning insert part having a circular outer peripheral shape and being inserted into the auxiliary positioning hole, wherein the auxiliary positioning insert part is attached to cover the protrusion of the base block member, the auxiliary positioning insert part being formed, in an inner surface, with second smooth surfaces contacting with the first smooth surfaces of the base block member, and the auxiliary positioning insert part can be guided by the first smooth surfaces to move on the straight line when the auxiliary positioning insert part is inserted in the auxiliary positioning hole, wherein a distance between the second smooth surfaces in a direction perpendicular to the straight line is greater than a diameter of the circular outer shape of the auxiliary positioning insert part.

* * * * *